(12) United States Patent
Yu et al.

(10) Patent No.: US 12,492,195 B2
(45) Date of Patent: Dec. 9, 2025

(54) PREPARATION METHOD FOR AND CRYSTAL FORM OF 3-ARYLOXY-3-FIVE-MEMBERED HETEROARYL-PROPYLAMINE COMPOUND

(71) Applicants: Zhangzhou Pien Tze Huang Pharmaceutical Co., Ltd., Fujian (CN); Shanghai Leado Pharmatech Co. Ltd., Shanghai (CN)

(72) Inventors: Juan Yu, Fujian (CN); Youxin Wang, Shanghai (CN); Tingting Yin, Fujian (CN); Jinxiang Zeng, Fujian (CN); Lingling Zhang, Shanghai (CN); Qiang Ding, Shanghai (CN)

(73) Assignees: ZHANGZHOU PIEN TZE HUANG PHARMACEUTICAL CO., LTD., Fujian (CN); SHANGHAI LEADO PHARMATECH CO. LTD., Shanghai (CN)

( * ) Notice: Subject to any disclaimer, the term of this patent is extended or adjusted under 35 U.S.C. 154(b) by 694 days.

(21) Appl. No.: 17/799,487

(22) PCT Filed: Feb. 9, 2021

(86) PCT No.: PCT/CN2021/076337
§ 371 (c)(1),
(2) Date: Aug. 12, 2022

(87) PCT Pub. No.: WO2021/160134
PCT Pub. Date: Aug. 19, 2021

(65) Prior Publication Data
US 2023/0339920 A1     Oct. 26, 2023

(30) Foreign Application Priority Data

Feb. 14, 2020  (CN) .......................... 202010093694.3

(51) Int. Cl.
*C07D 409/12* (2006.01)
(52) U.S. Cl.
CPC ........ *C07D 409/12* (2013.01); *C07B 2200/13* (2013.01)
(58) Field of Classification Search
CPC .................................................. C07D 409/12
See application file for complete search history.

(56) References Cited

U.S. PATENT DOCUMENTS

| 12,139,476 B2 * | 11/2024 | Wang ...................... A61P 29/00 |
| 2022/0119375 A1 | 4/2022 | Wang et al. |
| 2022/0213075 A1 | 7/2022 | Wang et al. |

FOREIGN PATENT DOCUMENTS

| CN | 102850335 A | 1/2013 |
| CN | 107625762 A | 1/2018 |
| CN | 107840845 A | 3/2018 |
| CN | 108947989 A | 12/2018 |
| CN | 109748914 A | 5/2019 |
| JP | 2022-532746 A | 7/2022 |
| JP | 7283669 B2 | 5/2023 |
| WO | 2010075353 A1 | 7/2010 |
| WO | 2011128370 A1 | 10/2011 |
| WO | 2018115064 A1 | 6/2018 |
| WO | 2018115069 A1 | 6/2018 |
| WO | 2020035040 A1 | 2/2020 |
| WO | 2020035070 A1 | 2/2020 |
| WO | 2020228789 A1 | 11/2020 |

OTHER PUBLICATIONS

Bartlett "Exploiting Chemical Diversity for Drug Discovery" Edited by Paul A Bartlett and Michael Entzeroth, The Royal Society of Chemistry, 2006, pp. 113-118.*
"Find ETDs Home » Thesis Resources » Find ETDs" Online: "https://ndltd.org/thesis-resources/find-etds/" Accessed Jan. 31, 2023.*
Irwin "ZINC—A Free Database of Commercially Available Compounds for Virtual Screening" J. Chem. Inf. Model. 2005, 45, 177-182.*
Kim "PubChem in 2021: new data content and improved web interfaces" Nucleic Acids Research, 2021, vol. 49, Database issue Published online Nov. 5, 2020.*
STN Registry/Zregistry (CAS Registrysm) Sep. 2016 2 pages.*
Chaplan et al., "Quantitative assessment of tactile allodynia in the rat paw," Journal of Neuroscience Methods, vol. 53, pp. 55-63 (1994) (cited in the specification).
Office Action issued Oct. 31, 2023 in JP 2022-549204 (English translation only).
Extended European Search Report issued Feb. 6, 2024 in EP Application No. EP21754062.4.
Int'l Search Report issued May 11, 2021 in Int'l Application No. PCT/CN2021/076337.

* cited by examiner

*Primary Examiner* — Nizal S Chandrakumar
(74) *Attorney, Agent, or Firm* — Panitch Schwarze Belisario & Nadel LLP

(57) ABSTRACT

Provided are a compound as represented by formula I, a preparation method therefor, and a hydrochloride crystal form A thereof. The compound as represented by formula I and the hydrochloride crystal form A thereof have excellent inhibitory effects on transient receptor potential (TRP) channels, and have good therapeutic effects on TRP channel-associated diseases.

15 Claims, 18 Drawing Sheets

PREPARATION METHOD FOR AND CRYSTAL FORM OF 3-ARYLOXY-3-FIVE-MEMBERED HETEROARYL-PROPYLAMINE COMPOUND

CROSS-REFERENCE TO RELATED APPLICATIONS

This application is a Section 371 of International Application No. PCT/CN2021/076337, filed Feb. 9, 2021, which was published in the Chinese language on Aug. 19, 2021 under International Publication No. WO 2021/160134 A1, which claims priority under 35 U.S.C. § 119(b) to Chinese Application No. 202010093694.3, filed Feb. 14, 2020, the disclosures of which are incorporated herein by reference in their entireties.

FIELD OF THE INVENTION

The present invention relates to the field of medicinal chemistry and pharmacotherapy. Specifically, the present invention relates to a preparation method for and crystal form of 3-aryloxy-3-five-membered heteroaryl propylamine compound.

BACKGROUND OF THE INVENTION

Pain is known as the fifth vital sign and is a warning sign of body tissues damage. Pain is one of the most common reasons for patients to seek medical treatment. According to the duration time, it is divided into acute pain (which has rapid occurrence, short duration or continuous state) and chronic pain (which has slow occurrence or is transformed from acute pain, has long duration or intermittent occurrence, and no obvious damage can be found for many chronic pains). Acute pain is mostly nociceptive pain caused by tissue trauma, comprising postoperative pain, trauma, post-burn pain, obstetric pain, angina, biliary colic, renal colic and other visceral pain, fracture pain, toothache, cancer pain, etc. Surgery pain and post-traumatic pain are the most common acute pains in clinical practice and the most urgent ones need for treatment. Chronic pain mainly comprises neuropathic pain, painful osteoarthritis, chronic low back pain and angiogenic pain, etc. Trigeminal neuralgia, diabetic pain, sciatica or postherpetic neuralgia are the main types of neuropathic pain. The global prevalence of neuropathic pain is about 10% with high incidence and large patient population. In the United States, 10%-30% of people suffer from chronic pain, resulting in an annual social expenditure of about 635 billion dollars, which exceeds the total cost of cancer and heart disease. Chronic pain has complex causes and is a refractory disease. Only less than 50% of patients can achieve effective analgesia via drug treatment. It is estimated that the total market scale of neuralgia drugs in China will be close to 26 billion RMB by 2026, and the market scale of ion channel neuralgia drugs will exceed 20 billion RMB.

Traditional analgesic drugs mainly comprise opioids and non-steroidal anti-inflammatory drugs. Opioids have strong analgesic effect, but long-term use of opioids can easily lead to tolerance, dependence and addiction, and opioids have adverse effects such as respiratory depression and central sedation, etc. Non-steroidal anti-inflammatory drugs only exert a moderate analgesic effect, but also have adverse effects such as gastrointestinal bleeding and cardiotoxicity, etc. The National Security Council recently released a report on preventable death, showing that the number of death caused by opioid overdose exceeded the number of death caused by car accident for the first time in American history. According to the Council's analysis of accidental death data in 2017, 1 of 96 Americans died from opioid overdose, and the number of fatalities in a car accident is 1 of 103 Americans. The abuse of opioids has caused severe social crisis in the United States today, so the market needs analgesic drugs with new mechanism.

TRPA1 is a member of the TRP ion channel superfamily and the only member of the TRPA subfamily. It is a non-selective cation channel and is permeable to $Na^+$, $K^+$, $Ca^{2+}$ and $Mg^{2+}$. TRPA1 is mainly distributed on the primary sensory neurons of the dorsal root nerve (DRG), trigeminal nerve (TG) and vagus nerve (VG). From the distribution of the human system, TRPA1 is highly expressed in the peripheral nervous system, respiratory system, gastrointestinal system and urinary system. When these organs and tissues have abnormal functions, the expression and function of TRPA1 channels are usually abnormal simultaneously. TRPA1 can convert cold stimulation, chemical stimulation and mechanical stimulation into inward currents, trigger a series of physiological functions, and participate in the formation of various pain sensations. Inflammatory pain is common problem of certain chronic diseases, and there is still no effective treatment method in clinical practice. Animal experimental studies have shown that TRPA1 is involved in inflammatory response and plays an important role in inflammatory pain. The use of TRPA1 specific blockers can significantly reduce the inflammatory pain response in rats. From the current research, TRPA1 plays an important role in the occurrence of asthma and cough. Compounds that induce asthma and cough, either cellular endogenous factors or exogenous factors, can activate TRPA1. TRPA1 antagonists can reduce asthma symptoms and block airway hyperresponsiveness. It is confirmed that TRPA1 participates in the regulation of visceral hypersensitivity and plays an important role in visceral pain through different animal models for visceral hypersensitivity, such as colitis, colorectal dilation or stress. Neurogenic pain is a pain syndrome caused by central or peripheral nervous system damage or disease, mainly manifested as hyperalgesia, allodynia, and spontaneous pain, etc. In recent years, more and more studies have shown that TRPA1 channels play an important role in different neurogenic pain, such as diabetic neuropathy and neuropathy caused by chemotherapy drugs. Recent studies have also shown that TRPA1 also has a mediating role in toothache, migraine and other pains. The administration of TRPA1 antagonists can significantly alleviate the pain symptoms.

TRPA1 is widely distributed and expressed in the human system. In addition to the above physiological functions involved in TRPA1, the development of TRPA1 inhibitor indications reported so far also involves inflammatory bowel disease, chronic obstructive pulmonary disease, antitussive, antipruritic, allergic rhinitis, ear disease, anti-diabetic, urinary incontinence, etc. TRPA1 is a proven new target for the treatment of many diseases.

Therefore, considering the current unmet clinical needs for pain treatment and the many problems of the existing therapeutic drugs, there is an urgent need in the art to develop therapeutic drug targeting TRP (especially TRPA1) to improve the therapeutic effect of diseases.

SUMMARY OF THE INVENTION

The object of the present invention is to provide a compound with novel structure targeting TRP channel (especially TRPA1 target), preparation method therefor, crystal form and use thereof.

In the first aspect of the present invention, it provides a method for preparing a compound of formula I, and the method comprises the step of:

(1) reacting a compound of formula a with a compound of formula b in the presence of the first catalyst and the first basic reagent in the first solvent to obtain the compound of formula I;

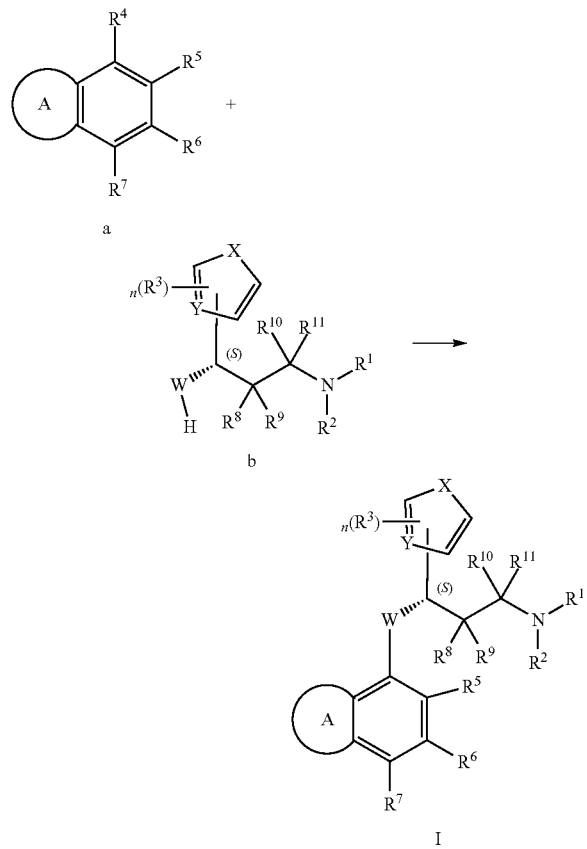

wherein:
ring A is a substituted or unsubstituted 4-12-membered carbocyclic ring, a substituted or unsubstituted 4-12-membered heterocyclic ring, a substituted or unsubstituted 5-12-membered heteroaromatic ring, or a substituted or unsubstituted $C_6$-$C_{12}$ aromatic ring;

$R^1$ and $R^2$ are each independently hydrogen, substituted or unsubstituted $C_1$-$C_{12}$ alkyl, substituted or unsubstituted $C_3$-$C_{12}$ cycloalkyl, substituted or unsubstituted 5-12 membered heteroaryl, or substituted or unsubstituted $C_6$-$C_{12}$ aryl;

X and Y are each independently carbon atom, oxygen atom, sulfur atom or nitrogen atom; $R^3$ is hydrogen, halogen, substituted or unsubstituted $C_1$-$C_{12}$ alkyl, substituted or unsubstituted $C_3$-$C_{12}$ cycloalkyl, substituted or unsubstituted 5-12 membered heteroaryl, or substituted or unsubstituted $C_6$-$C_{12}$ aryl;

$R^4$ is halogen;

$R^5$, $R^6$, $R^7$, $R^8$, $R^9$, $R^{10}$ and $R^{11}$ are each independently hydrogen, substituted or unsubstituted $C_1$-$C_{12}$ alkyl, substituted or unsubstituted $C_3$-$C_{12}$ cycloalkyl, substituted or unsubstituted 5-12 membered heteroaryl, or substituted or unsubstituted $C_6$-$C_{12}$ aryl;

W is O or S;

n is 1, 2 or 3;

wherein, any one of the "substituted" means that 1-4 (preferably 1, 2, 3 or 4) hydrogen atoms on the group are each independently substituted by a substituent selected from the group consisting of $C_1$-$C_6$ alkyl, $C_3$-$C_7$ cycloalkyl, $C_1$-$C_3$ haloalkyl, halogen, nitro, cyano, amino, hydroxyl, =O, $C_1$-$C_4$ carboxyl, $C_2$-$C_4$ ester group, $C_2$-$C_4$ amide group, $C_1$-$C_6$ alkoxyl, $C_1$-$C_6$ haloalkoxy, benzyl, $C_6$-$C_{12}$ aryl, 5-10-membered heteroaryl;

wherein, the heterocyclic ring, heteroaromatic ring and heteroaryl each independently have 1-3 (preferably 1, 2 or 3) heteroatoms selected from N, O and S.

In another preferred embodiment, ring A is a substituted or unsubstituted 5-10-membered carbocyclic ring, a substituted or unsubstituted 5-10-membered heterocyclic ring, a substituted or unsubstituted 5-12-membered heteroaromatic ring, or a substituted or unsubstituted $C_6$-$C_{12}$ aromatic ring.

In another preferred embodiment, ring A is a substituted or unsubstituted 5-10-membered carbocyclic ring, a substituted or unsubstituted 5-10-membered heterocyclic ring, or a substituted or unsubstituted 5-12-membered heteroaromatic ring.

In another preferred embodiment, ring A is not a benzene ring.

In another preferred embodiment, ring A is a substituted or unsubstituted 5-7 membered carbocyclic ring, a substituted or unsubstituted 5-7 membered heterocyclic ring, or a substituted or unsubstituted 5-7 membered heteroaromatic ring.

In another preferred embodiment, ring A is a substituted or unsubstituted 5-7 membered carbocyclic ring or 5-7 membered heteroaromatic ring.

In another preferred embodiment, ring A is a substituted or unsubstituted 5-membered carbocyclic ring, a substituted or unsubstituted 6-membered carbocyclic ring, or a substituted or unsubstituted furan ring.

In another preferred embodiment, ring A is a 5-membered carbocyclic ring, a 6-membered carbocyclic ring, or a furan ring.

In another preferred embodiment, ring A is

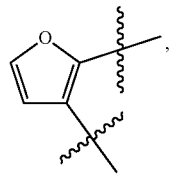 [SMILES: *c1ccoc1*]

or

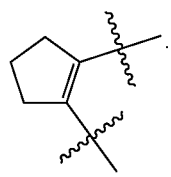 [SMILES: *C1=C(*)CCC1]

In another preferred embodiment, the connection structure of ring A and the adjacent benzene ring is:

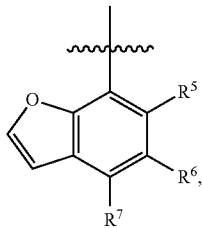

or

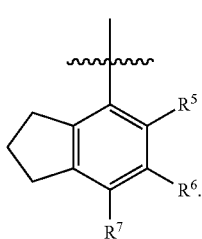

In another preferred embodiment, at least one of X and Y is heteroatom.

In another preferred embodiment, Y is a carbon atom or a nitrogen atom.

In another preferred embodiment, X is S or O.

In another preferred embodiment, X is S.

In another preferred embodiment, Y is a carbon atom.

In another preferred embodiment, $R^1$ and $R^2$ are each independently hydrogen, substituted or unsubstituted $C_1$-$C_8$ alkyl, substituted or unsubstituted $C_3$-$C_8$ cycloalkyl, substituted or unsubstituted 5-10 membered heteroaryl, or substituted or unsubstituted $C_6$-$C_{12}$ aryl.

In another preferred embodiment, $R^1$ and $R^2$ are each independently hydrogen, substituted or unsubstituted $C_1$-$C_6$ alkyl, or substituted or unsubstituted $C_3$-$C_7$ cycloalkyl.

In another preferred embodiment, $R^1$ and $R^2$ are each independently hydrogen or substituted or unsubstituted $C_1$-$C_3$ alkyl.

In another preferred embodiment, $R^1$ and $R^2$ are each independently hydrogen, methyl or ethyl.

In another preferred embodiment, $R^3$ is hydrogen, halogen, substituted or unsubstituted $C_1$-$C_6$ alkyl, substituted or unsubstituted $C_3$-$C_{10}$ cycloalkyl, substituted or unsubstituted 5-12 membered heteroaryl, or substituted or unsubstituted $C_6$-$C_{12}$ aryl.

In another preferred embodiment, $R^3$ is hydrogen, halogen, substituted or unsubstituted $C_1$-$C_6$ alkyl, or substituted or unsubstituted $C_3$-$C_7$ cycloalkyl.

In another preferred embodiment, $R^3$ is hydrogen, halogen, or substituted or unsubstituted $C_1$-$C_6$ alkyl.

In another preferred embodiment. $R^3$ is hydrogen, halogen, or substituted or unsubstituted $C_1$-$C_4$ alkyl.

In another preferred embodiment, $R^3$ is hydrogen atom, chlorine atom or methyl.

In another preferred embodiment, the halogen is F, Cl, Br or I.

In another preferred embodiment, $R^4$ is F, Cl, Br or I.

In another preferred embodiment, $R^5$, $R^6$, $R^7$, $R^8$, $R^9$, $R^{10}$ and $R^{11}$ are each independently hydrogen, substituted or unsubstituted $C_1$-$C_{10}$ alkyl, substituted or unsubstituted $C_3$-$C_8$ cycloalkyl, substituted or unsubstituted 5-10 membered heteroaryl, or substituted or unsubstituted $C_6$-$C_{12}$ aryl.

In another preferred embodiment, $R^5$, $R^6$, $R^7$, $R^8$, $R^9$, $R^{10}$ and $R^{11}$ are each independently hydrogen, substituted or unsubstituted $C_1$-$C_6$ alkyl, or substituted or unsubstituted $C_3$-$C_7$ cycloalkyl.

In another preferred embodiment, $R^5$, $R^6$, $R^7$, $R^8$. $R^9$, $R^{10}$ and $R^{11}$ are each independently hydrogen.

In another preferred embodiment, W is O or S.

In another preferred embodiment, W is O.

In another preferred embodiment, n is 1 or 2.

In another preferred embodiment, n is 1.

In another preferred embodiment, when n is greater than or equal to 2, each $R^3$ is the same or different.

In another preferred embodiment, any one of the "substituted" means that 1-4 (preferably 1, 2, 3 or 4) hydrogen atoms on the group are independently substituted by a substituent selected from the group consisting of $C_1$-$C_6$ alkyl, $C_3$-$C_7$ cycloalkyl, $C_1$-$C_3$ haloalkyl, halogen, nitro, cyano, amino, hydroxyl, =O, $C_1$-$C_4$ carboxyl, $C_2$-$C_4$ ester group, $C_2$-$C_4$ amide group, $C_1$-$C_6$ alkoxyl, $C_1$-$C_6$ haloalkoxy, benzyl, 6-membered aryl, or 5-membered or 6-membered heteroaryl (preferably $C_5$ heteroaryl).

In another preferred embodiment, any one of the "substituted" means that 1-4 (preferably 1, 2, 3 or 4) hydrogen atoms on the group are independently substituted by a substituent selected from the group consisting of $C_1$-$C_6$ alkyl, $C_3$-$C_7$ cycloalkyl, $C_1$-$C_3$ haloalkyl, halogen, nitro, cyano, hydroxyl, $C_1$-$C_4$ carboxyl, $C_2$-$C_4$ ester group, $C_2$-$C_4$ amide group, $C_1$-$C_6$ alkoxyl, $C_1$-$C_6$ haloalkoxy, benzyl, 6-membered aryl, or 5-membered or 6-membered heteroaryl (preferably $C_5$ heteroaryl).

In another preferred embodiment, the

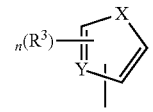

structure is

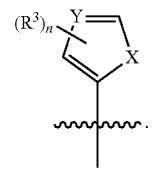

In another preferred embodiment, the compound of formula a has a structure of formula a-1:

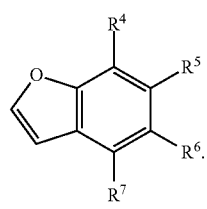

a-1

In another preferred embodiment, the compound of formula b has a structure of formula b-1:
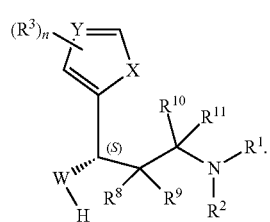
b-1
In another preferred embodiment, the compound of formula I has a structure of formula I-A:
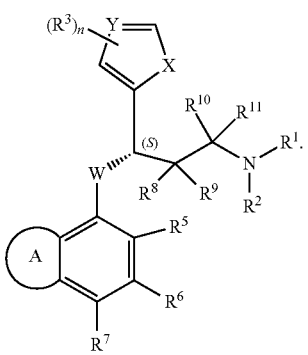
I-A
In another preferred embodiment, the compound of formula I is selected from the group consisting of:
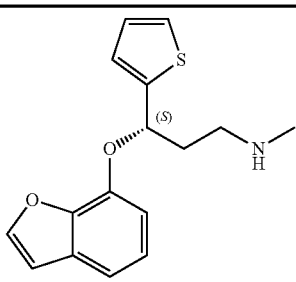
I$_C$-1
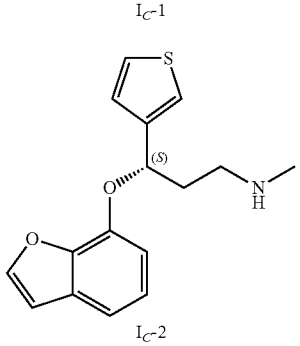
I$_C$-2
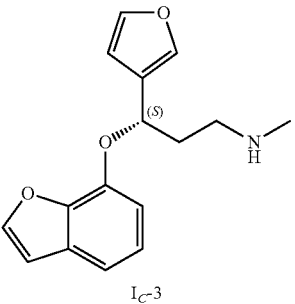
I$_C$-3
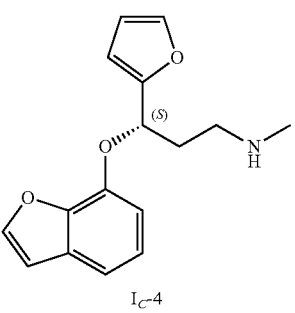
I$_C$-4
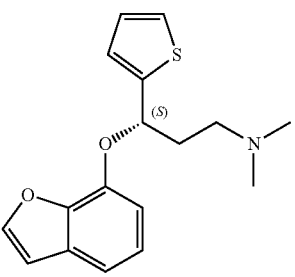
I$_C$-8
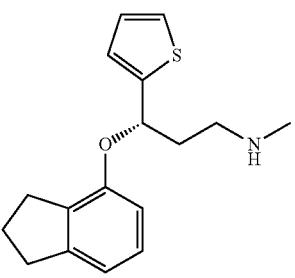 [SMILES: CNCC[C@H](Oc1cccc2c1CCC2)c1cccs1]
I$_C$-10
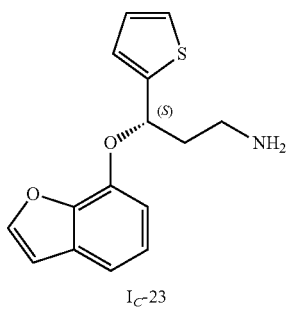
I$_C$-23

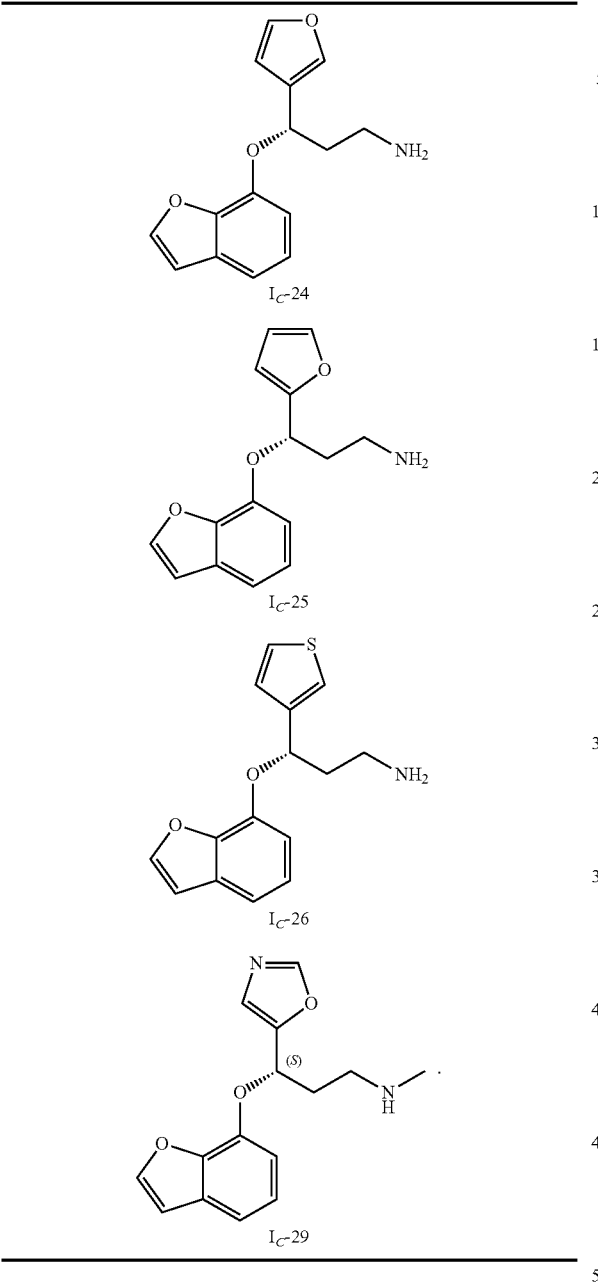
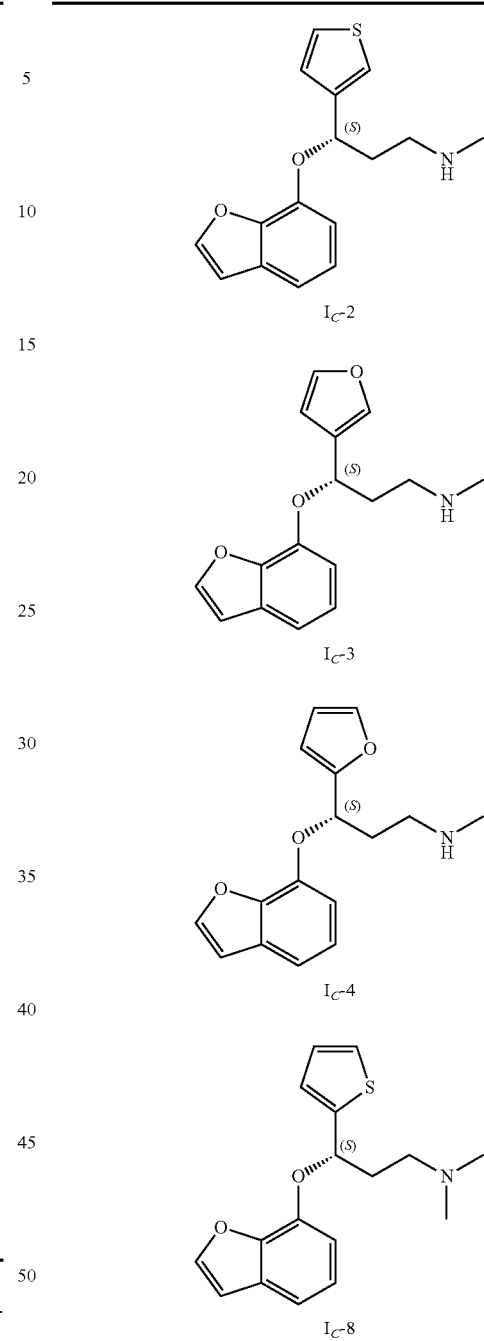
In another preferred embodiment, the compound of formula I is selected from the group consisting of:
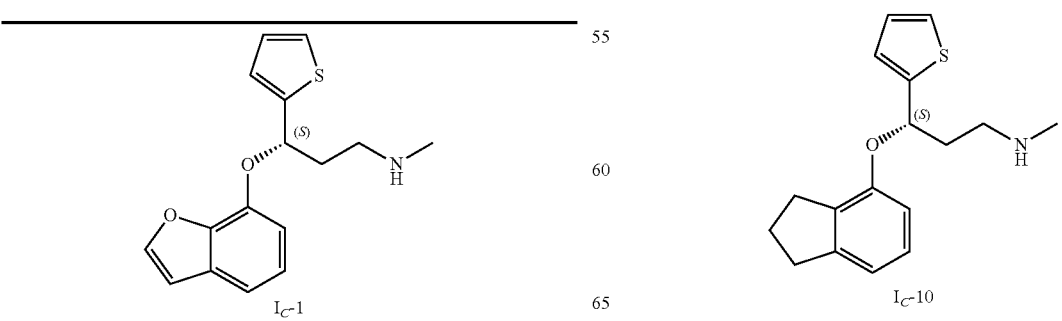

-continued

[Structure I_C-29: oxazole-CH(S)(O-benzofuran-7-yl)-CH2-CH2-NH-CH3]

I_C-29

In another preferred embodiment, the first solvent is selected from the group consisting of dimethyl sulfoxide, toluene, DMF, and a combination thereof.

In another preferred embodiment, the first solvent is dimethyl sulfoxide.

In another preferred embodiment, the first catalyst is selected from the group consisting of halide salt, tetrabutylammonium bromide, 4-dimethylaminopyridine, dibenzo-18 crown-6, pyridine, and a combination thereof.

In another preferred embodiment, the halide salt is selected from the group consisting of potassium fluoride, potassium chloride, potassium bromide, potassium iodide, sodium fluoride, sodium chloride, sodium bromide, sodium iodide, and a combination thereof.

In another preferred embodiment, the first catalyst includes potassium iodide.

In another preferred embodiment, the first basic reagent is selected from the group consisting of inorganic bases, organic bases, and a combination thereof.

In another preferred embodiment, the first basic reagent is selected from the group consisting of sodium hydrogen, hydroxide, and a combination thereof.

In another preferred embodiment, the hydroxide is selected from the group consisting of sodium hydroxide, potassium hydroxide, and a combination thereof.

In another preferred embodiment, the first basic reagent includes hydroxide.

In another preferred embodiment, the first basic reagent includes sodium hydroxide.

In another preferred embodiment, in the step (1), the reaction temperature is 30-90° C., preferably 30-80° C., more preferably 40-70° C., and most preferably 50-60° C.

In another preferred embodiment, in the step (1), the reaction time is 10-48 h, preferably 16-40 h, more preferably 20-35 h, and most preferably 22-25 h.

In another preferred embodiment, the molar ratio of the compound of formula a to the compound of formula b is 1:1-3, preferably 1:1-2, more preferably 1:1.2-1.7.

In another preferred embodiment, the molar ratio of the compound of formula a to the first basic reagent is 1:2.5-10, preferably 1:3-8, more preferably 1:4-6.

In another preferred embodiment, the molar ratio of the compound of formula b to the first basic reagent is 1-3:2.5-10, preferably 1-2:3-8, more preferably 1.2-1.7:4-6.

In another preferred embodiment, the molar ratio of the first catalyst to the first basic reagent is 1:5-70, preferably 1:10-60, more preferably 1:15-50, more preferably 1:20-50, more preferably 1:25-40, most preferably 1:28-36.

In another preferred embodiment, the molar ratio of the first catalyst to the compound of formula a is 1:1-50, preferably 1:2-40, more preferably 1:3-30, more preferably 1:5-25, more preferably 1:5-20, most preferably 1:5-15.

In another preferred embodiment, in the step (1), the reaction is carried out under normal pressure (e.g., 1 atm).

In another preferred embodiment, in the step (1), the reaction is carried out under the protection of $N_2$.

In another preferred embodiment, the step (1) includes the steps:

the compound of formula a is dissolved in the first solvent, the compound of formula b and the first catalyst are added, the first basic reagent is added after lowering the temperature, then the temperature rise and the reaction is carried out to obtain the compound of formula I.

In another preferred embodiment, after lowering the temperature, the temperature is 5-30° C. (preferably 10-20° C.).

In another preferred embodiment, the temperature after the temperature rise is 30-90° C., preferably 30-80° C., more preferably 40-70° C., and most preferably 50-60° C.

In another preferred embodiment, in the step (1), after the reaction is completed, water and ethyl acetate are added to the reaction solution for extraction, the organic phases are collected, and the compound of formula I is obtained by separation.

In another preferred embodiment, after the organic phase is washed with acid aqueous solution, the compound of formula I is obtained by separation.

In another preferred embodiment, the acid aqueous solution is oxalic acid aqueous solution.

In the second aspect of the present invention, it provides a method for preparing a compound of formula I-1, and the method comprises the steps of:

(1) reacting a compound of formula a with a compound of formula b in the presence of the first catalyst and the first basic reagent in the first solvent to obtain the compound of formula I;

[Structure a: ring A fused benzene with substituents $R^4$, $R^5$, $R^6$, $R^7$]

a

[Structure b: heterocycle with X, Y, n($R^3$), W, H, (S) center, $R^{10}$, $R^{11}$, $R^8$, $R^9$, N($R^1$)($R^2$)]

b

-continued

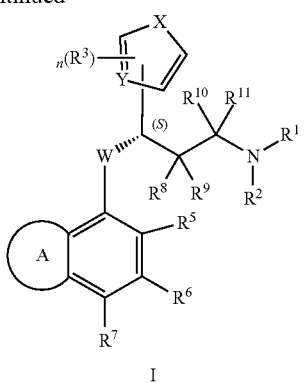
I

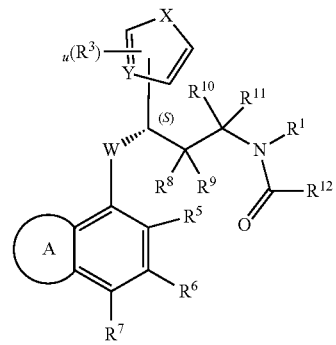 
I-a (2) reacting the compound of formula I with a N-demethylation reagent represented by formula c in the presence of the second basic reagent in the second solvent to obtain a compound of formula I-a;

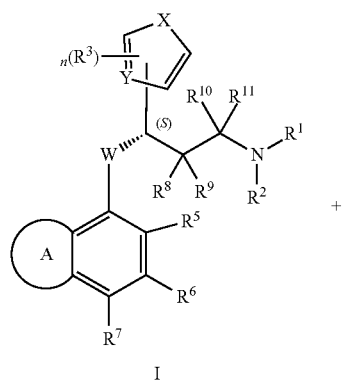
I

+

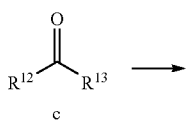
c

⟶

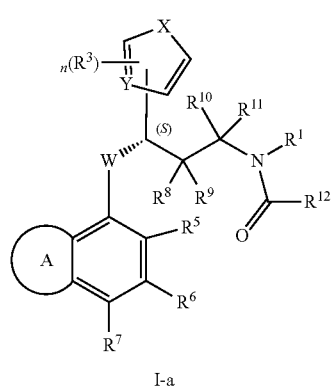
I-a (3) subjecting the compound of formula I-a to the hydrolysis reaction in the presence of the third basic reagent in the third solvent to obtain the compound of formula I-1;

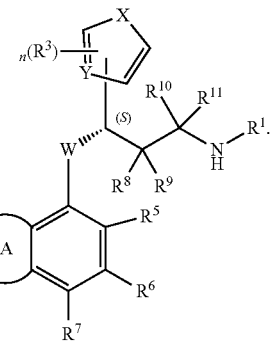
I-1 wherein:

ring A is a substituted or unsubstituted 4-12-membered carbocyclic ring, a substituted or unsubstituted 4-12-membered heterocyclic ring, a substituted or unsubstituted 5-12-membered heteroaromatic ring, or a substituted or unsubstituted $C_6$-$C_{12}$ aromatic ring;

$R^1$ and $R^2$ are each independently substituted or unsubstituted $C_1$-$C_6$ alkyl, or substituted or unsubstituted $C_3$-$C_7$ cycloalkyl;

X and Y are each independently carbon atom, oxygen atom, sulfur atom or nitrogen atom;

$R^3$ is hydrogen, halogen, substituted or unsubstituted $C_1$-$C_{12}$ alkyl, substituted or unsubstituted $C_3$-$C_{12}$ cycloalkyl, substituted or unsubstituted 5-12 membered heteroaryl, or substituted or unsubstituted $C_6$-$C_{12}$ aryl;

$R^4$ is halogen;

$R^5$, $R^6$, $R^7$, $R^8$, $R^9$, $R^{10}$ and $R^{11}$ are each independently hydrogen, substituted or unsubstituted $C_1$-$C_{12}$ alkyl, substituted or unsubstituted $C_3$-$C_{12}$ cycloalkyl, substituted or unsubstituted 5-12 membered heteroaryl, or substituted or unsubstituted $C_6$-$C_{12}$ aryl;

$R^{12}$ is substituted or unsubstituted $C_1$-$C_6$ alkyl, substituted or unsubstituted $C_3$-$C_{12}$ cycloalkyl, substituted or unsubstituted $C_6$-$C_{16}$ aryl, substituted or unsubstituted 5-16-membered heteroaryl, substituted or unsubstituted $C_1$-$C_6$ alkyl-W-, substituted or unsubstituted $C_3$-$C_{12}$ cycloalkyl-W-, substituted or unsubstituted $C_6$-$C_{16}$ aryl-W-, or substituted or unsubstituted 5-16 membered heteroaryl-W—;

$R^{13}$ is halogen;

W is O or S;

n is 1, 2 or 3;

wherein. any one of the "substituted" means that 1-4 (preferably 1, 2, 3 or 4) hydrogen atoms on the group are each independently substituted by a substituent selected from the group consisting of $C_1$-$C_6$ alkyl, $C_3$-$C_7$ cycloalkyl, $C_1$-$C_3$ haloalkyl, halogen, nitro, cyano, amino, hydroxyl, =O, $C_1$-$C_4$ carboxyl, $C_2$-$C_4$ ester group, $C_2$-$C_4$ amide group, $C_1$-$C_6$ alkoxyl, $C_1$-$C_6$ haloalkoxy, benzyl, $C_6$-$C_{12}$ aryl, 5-10-membered heteroaryl;

wherein, the heterocyclic ring, heteroaromatic ring and heteroaryl each independently have 1-3 (preferably 1, 2 or 3) heteroatoms selected from N, O and S.

In another preferred embodiment, ring A, X, Y, W, n, $R^1$, $R^2$, $R^3$, $R^4$, $R^5$, $R^6$, $R^7$, $R^8$, $R^9$, $R^{10}$ and $R^{11}$ are each independently as described in the first aspect of the present invention.

In another preferred embodiment, the first solvent, the first catalyst and the first basic reagent are each independently as described in the first aspect of the present invention.

In another preferred embodiment, the compound of formula a, the compound of formula b and the compound of formula I are each independently as described in the first aspect of the present invention.

In another preferred embodiment, the step (1) is as described in the first aspect of the present invention.

In another preferred embodiment, the second solvent is selected from the group consisting of dimethyl sulfoxide, toluene, DMF, and a combination thereof.

In another preferred embodiment, the second solvent is toluene.

In another preferred embodiment, the second basic reagent is selected from the group consisting of triethanolamine (TEA), 1,8-diazabicycloundec-7-ene (DBU), N,N-diisopropylethylamine (DIEA), sodium carbonate, and a combination thereof.

In another preferred embodiment, the second basic reagent includes N,N-diisopropylethylamine (DIEA).

In another preferred embodiment, in the step (2), the reaction temperature is 20-80° C., preferably 30-70° C., more preferably 30-60° C., more preferably 40-50° C., most preferably 40-45° C.

In another preferred embodiment, in the step (2), the reaction time is 2-16 h, preferably 2-10 h, more preferably 2-6 h, and most preferably 3-5 h.

In another preferred embodiment, the N-demethylation reagent represented by formula c includes phenyl chloroformate.

In another preferred embodiment, in the step (2), the molar ratio of the compound of formula I to the second basic reagent is 1:0.2-10, preferably 1:0.5-8, more preferably 1:0.8-5, more preferably 1:1-3, most preferably 1:1-2.

In another preferred embodiment, in the step (2), the molar ratio of the compound of formula I to the compound of formula c is 1:0.2-10, preferably 1:0.5-8, more preferably 1:0.8-5, more preferably 1:1-3, more preferably 1:1.1-2.5, and most preferably 1:1-2.

In another preferred embodiment, in the step (2), the molar ratio of the second basic reagent to the compound of formula c is 0.8-5:0.8-5, preferably 1-3:1-3, more preferably 1-2:1.1-2.5, and most preferably 1-2:1.1-2.

In another preferred embodiment, in the step (2), the reaction is carried out under normal pressure (e.g., 1 atm).

In another preferred embodiment, in the step (2), the reaction is carried out under the protection of $N_2$.

In another preferred embodiment, the step (2) includes the steps:

the compound of formula I and the second basic reagent are dissolved in the second solution, the N-demethylation reagent represented by formula c is added after lowering the temperature, then the temperature rise and the reaction is carried out to obtain the compound of formula I-a.

In another preferred embodiment, after lowering the temperature, the temperature is 10-40° C., preferably 20-30° C.

In another preferred embodiment, the temperature after the temperature rise is 20-80° C., preferably 30-70° C. more preferably 30-60° C., more preferably 40-50° C., and most preferably 40-45° C.

In another preferred embodiment, in the step (2), after the reaction is completed, water and ethyl acetate are added to the reaction solution for extraction, the organic phases are collected, and concentrated to obtain the compound of formula I-a.

In another preferred embodiment, the compound of formula I-a has a structure of formula I-a-1:

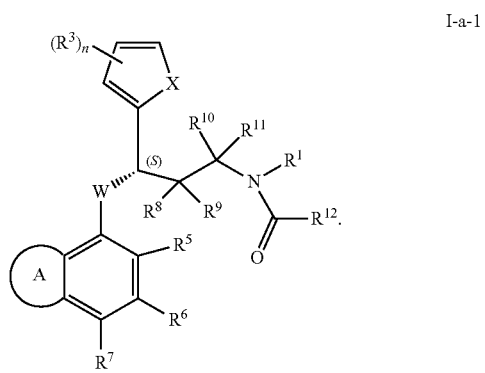

I-a-1

In another preferred embodiment, the third solvent is selected from the group consisting of dimethyl sulfoxide, toluene, DMF, and a combination thereof.

In another preferred embodiment, the third solvent is dimethyl sulfoxide.

In another preferred embodiment, the third basic reagent is selected from the group consisting of inorganic bases, organic bases, and a combination thereof.

In another preferred embodiment, the third basic reagent is selected from the group consisting of potassium tert-butoxide, potassium carbonate, hydroxide, and a combination thereof.

In another preferred embodiment, the hydroxide is selected from the group consisting of sodium hydroxide, potassium hydroxide, and a combination thereof.

In another preferred embodiment, the third basic reagent includes hydroxide.

In another preferred embodiment, the third basic reagent includes sodium hydroxide.

In another preferred embodiment, in the step (3), the reaction temperature is 20-100° C., preferably 30-90° C., more preferably 40-80° C., more preferably 50-70° C., most preferably 60-65° C.

In another preferred embodiment, in the step (3), the reaction time is 5-16 h, preferably 5-10 h, more preferably 7-10 h.

In another preferred embodiment, in the step (3), the molar ratio of the compound of formula I-a to the third basic reagent is 1:1-20, preferably 1:2-15, more preferably 1:2-10, more preferably 1:3.5-8, most preferably 1:6.

In another preferred embodiment, in the step (3), after the reaction is completed, water and ethyl acetate are added to the reaction solution for extraction, the organic phases are collected, and the compound of formula I is obtained by separation.

In another preferred embodiment, after the organic phase is washed with acid aqueous solution, the compound of formula I is obtained by separation.

In another preferred embodiment, the acid aqueous solution is oxalic acid aqueous solution.

In another preferred embodiment, the compound of formula I-1 has a structure of formula I-1-1:

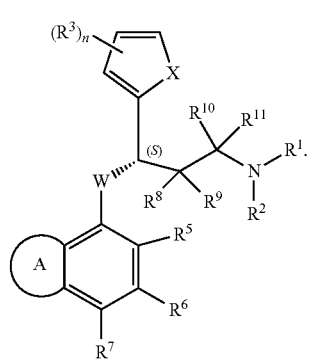

I-1-1

In another preferred embodiment, the method comprises the steps of:

(1) reacting a compound of formula i with a compound of formula ii in the presence of the first catalyst and the first basic reagent in the first solvent to obtain the compound of formula

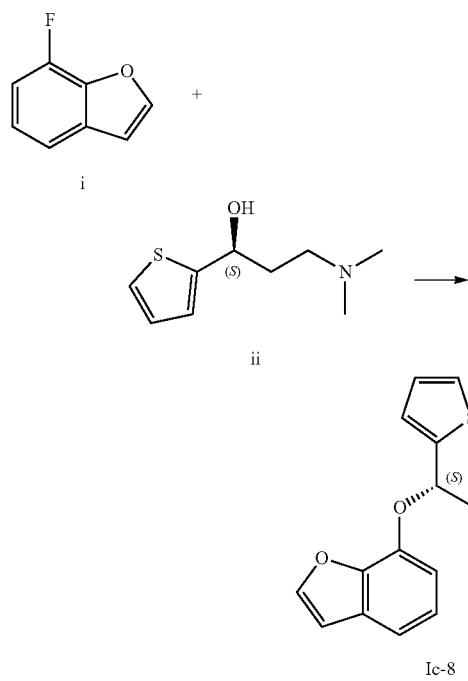

(2) reacting the compound of formula Ic-8 with phenyl chloroformate in the presence of the second basic reagent in the second solvent to obtain a compound of formula iii;

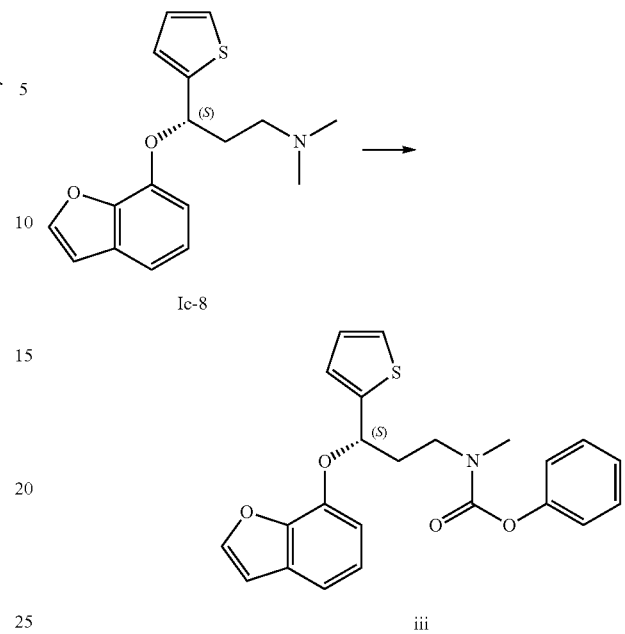

(3) subjecting the compound of formula iii to the hydrolysis reaction in the presence of the third basic reagent in the third solvent to obtain the compound of formula Ic-1;

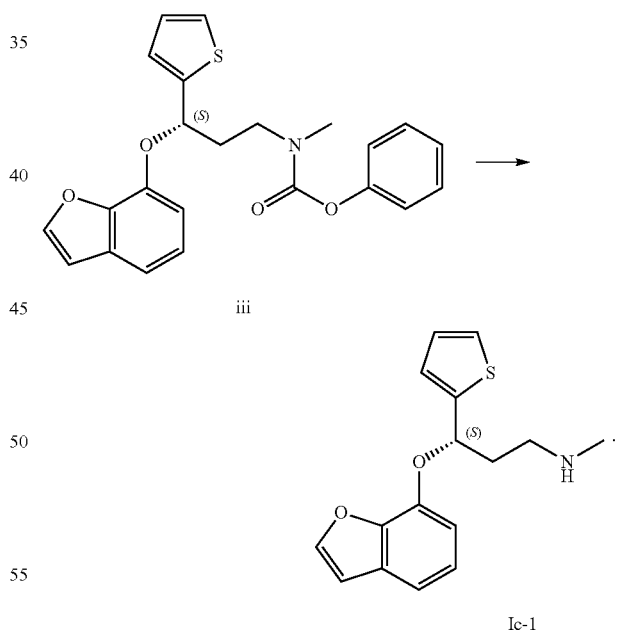

In the third aspect of the present invention, it provides a method for preparing a compound of formula I-a, and the method comprises the step of:

(2) reacting a compound of formula I with a N-demethylation reagent represented by formula c in the presence of the second basic reagent in the second solvent to obtain the compound of formula I-a;

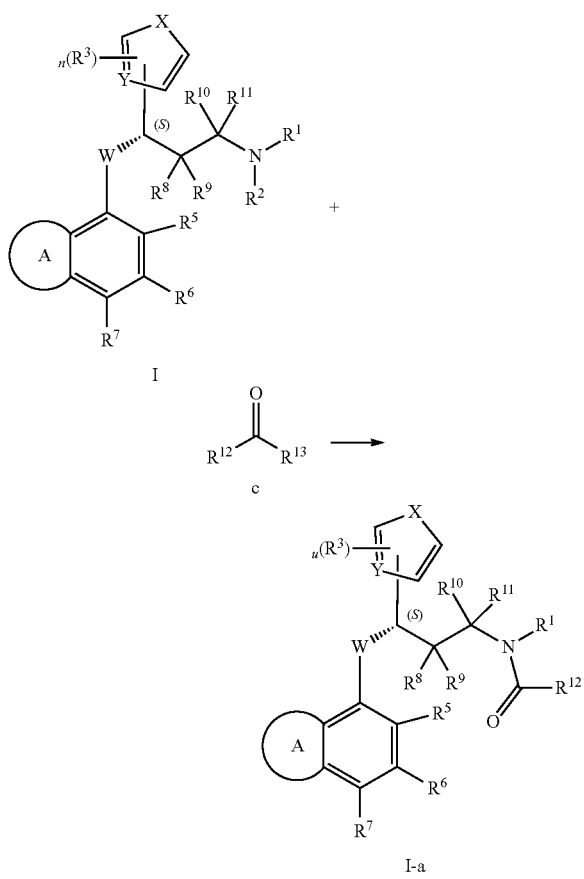

I-a wherein:
ring A is a substituted or unsubstituted 4-12-membered carbocyclic ring, a substituted or unsubstituted 4-12-membered heterocyclic ring, a substituted or unsubstituted 5-12-membered heteroaromatic ring, or a substituted or unsubstituted $C_6$-$C_{12}$ aromatic ring;

$R^1$ and $R^2$ are each independently substituted or unsubstituted $C_1$-$C_6$ alkyl, or substituted or unsubstituted $C_3$-$C_7$ cycloalkyl;

X and Y are each independently carbon atom, oxygen atom, sulfur atom or nitrogen atom;

$R^3$ is hydrogen, halogen, substituted or unsubstituted $C_1$-$C_{12}$ alkyl, substituted or unsubstituted $C_3$-$C_{12}$ cycloalkyl, substituted or unsubstituted 5-12 membered heteroaryl, or substituted or unsubstituted $C_6$-$C_{12}$ aryl;

$R^5$, $R^6$, $R^7$, $R^8$, $R^9$, $R^{10}$ and $R^{11}$ are each independently hydrogen, substituted or unsubstituted $C_1$-$C_{12}$ alkyl, substituted or unsubstituted $C_3$-$C_{12}$ cycloalkyl, substituted or unsubstituted 5-12 membered heteroaryl, or substituted or unsubstituted $C_6$-$C_{12}$ aryl;

$R^{12}$ is substituted or unsubstituted $C_1$-$C_6$ alkyl, substituted or unsubstituted $C_3$-$C_{12}$ cycloalkyl, substituted or unsubstituted $C_6$-$C_{16}$ aryl, substituted or unsubstituted 5-16-membered heteroaryl, substituted or unsubstituted $C_1$-$C_6$ alkyl-W-, substituted or unsubstituted $C_3$-$C_{12}$ cycloalkyl-W-, substituted or unsubstituted $C_6$-$C_{16}$ aryl-W-, or substituted or unsubstituted 5-16 membered heteroaryl-W—;

$R^{13}$ is halogen;
W is O or S;
n is 1, 2 or 3:

wherein, any one of the "substituted" means that 1-4 (preferably 1, 2, 3 or 4) hydrogen atoms on the group are each independently substituted by a substituent selected from the group consisting of $C_1$-$C_6$ alkyl, $C_3$-$C_7$ cycloalkyl, $C_1$-$C_3$ haloalkyl, halogen, nitro, cyano, amino, hydroxyl, =O, $C_1$-$C_4$ carboxyl, $C_2$-$C_4$ ester group, $C_2$-$C_4$ amide group, $C_1$-$C_6$ alkoxyl, $C_1$-$C_6$ haloalkoxy, benzyl, $C_6$-$C_{12}$ aryl, 5-10-membered heteroaryl;

wherein, the heterocyclic ring, heteroaromatic ring and heteroaryl each independently have 1-3 (preferably 1, 2 or 3) heteroatoms selected from N, O and S.

In another preferred embodiment, ring A, X, Y, W, n, $R^1$, $R^2$, $R^3$, $R^5$, $R^6$, $R^7$, $R^8$, $R^9$, $R^{10}$ and $R^{11}$ are each independently as described in the first aspect of the present invention.

In another preferred embodiment, the second solvent, the second catalyst and the N-demethylation reagent represented by formula c are independently as described in the second aspect of the present invention.

In another preferred embodiment, the step (2) is as described in the second aspect of the present invention.

In another preferred embodiment, the compound of formula I, the compound of formula c and the compound of formula I-a are each independently as described in the second aspect of the present invention.

In the fourth aspect of the present invention, it provides a salt of a compound of formula I,

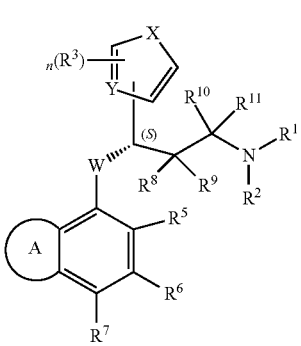

I wherein:
ring A is a substituted or unsubstituted 5-7-membered carbocyclic ring, a substituted or unsubstituted 5-7-membered heterocyclic ring, or a substituted or unsubstituted 5-7-membered heteroaromatic ring;

$R^1$ and $R^2$ are each independently hydrogen, substituted or unsubstituted $C_1$-$C_6$ alkyl, or substituted or unsubstituted $C_3$-$C_7$ cycloalkyl;

X and Y are each independently carbon atom, oxygen atom, sulfur atom or nitrogen atom;

W is O or S;

$R^3$ is hydrogen, halogen, substituted or unsubstituted $C_1$-$C_6$ alkyl, substituted or unsubstituted $C_3$-$C_7$ cycloalkyl;

$R^5$, $R^6$, $R^7$, $R^8$, $R^9$, $R^{10}$ and $R^{11}$ are each independently hydrogen, substituted or unsubstituted $C_1$-$C_6$ alkyl, or substituted or unsubstituted $C_3$-$C_7$ cycloalkyl;

n is 1, 2 or 3;

wherein, any one of the "substituted" means that 1-4 (preferably 1, 2, 3 or 4) hydrogen atoms on the group are each independently substituted by a substituent selected from the group consisting of $C_1$-$C_6$ alkyl, C₃-C₇ cycloalkyl, C₁-C₃ haloalkyl, halogen, nitro, cyano, amino, hydroxyl, =O, C₁-C₄ carboxyl, C₂-C₄ ester group, C₂-C₄ amide group, C₁-C₆ alkoxyl, C₁-C₆ haloalkoxy, benzyl, 6-membered aryl, or 5- or 6-membered heteroaryl (preferably C₅ heteroaryl);

the heterocyclic ring, heteroaromatic ring and heteroaryl each independently have 1-3 (preferably 1, 2 or 3) heteroatoms selected from N, O and S.

In another preferred embodiment, ring A, X, Y, W, n, R¹, R², R³, R⁵, R⁶, R⁷, R⁸, R⁹, R¹⁰ and R¹¹ are each independently as described in the first aspect of the present invention.

In another preferred embodiment, the compound of formula I has a structure shown in formula I-B:

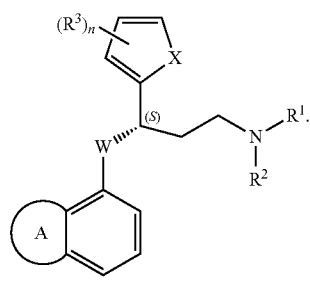

I-B

In another preferred embodiment, the compound of formula I has a structure shown in formula I-D:

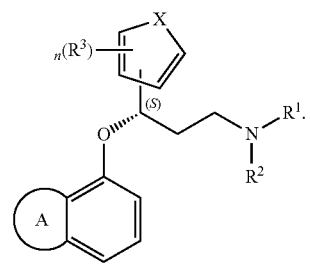

I-D

In another preferred embodiment, the compound of formula I is selected from the group consisting of:

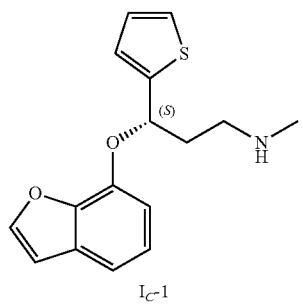

I_C-1

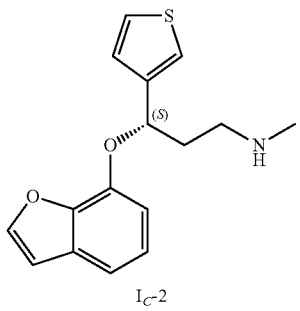

I_C-2

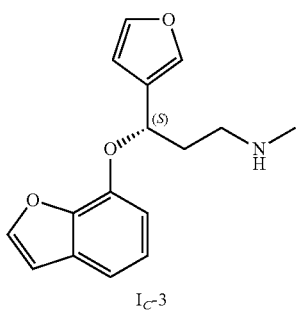

I_C-3

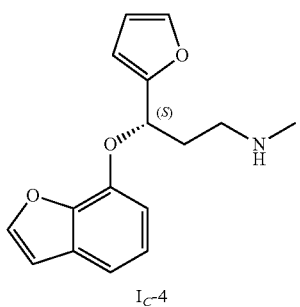

I_C-4

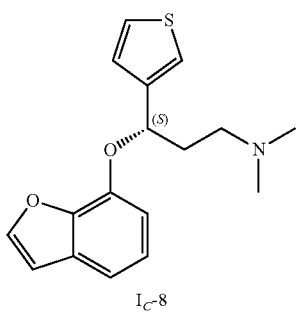

I_C-8

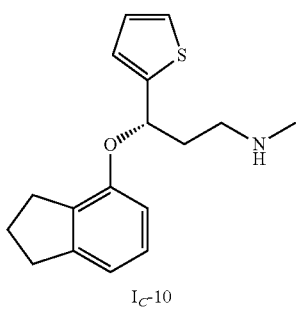

I_C-10

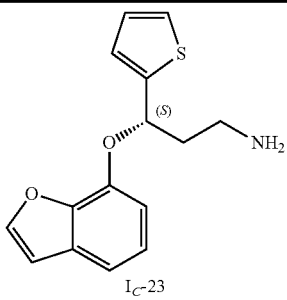

I<sub>C</sub>-23

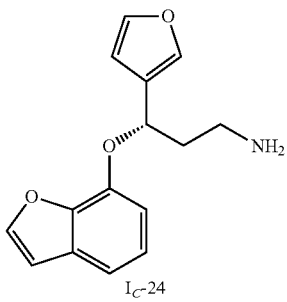

I<sub>C</sub>-24

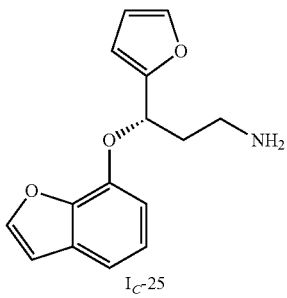

I<sub>C</sub>-25

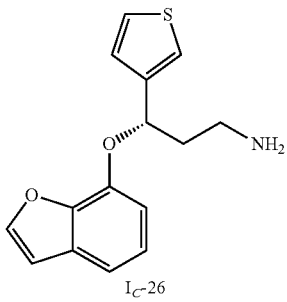

I<sub>C</sub>-26

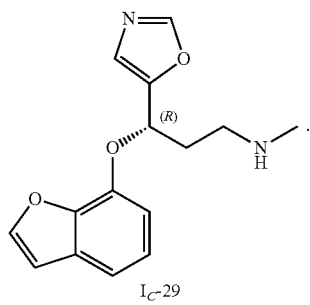

I<sub>C</sub>-29

In another preferred embodiment, the salt of the compound of formula I is a salt formed by the compound of formula I and the acid selected from the group consisting of hydrochloric acid, mucic acid, D-glucuronic acid, hydrobromic acid, hydrofluoric acid, sulfuric acid, nitric acid, phosphoric acid, formic acid, acetic acid, propionic acid, oxalic acid, malonic acid, succinic acid, fumaric acid, maleic acid, lactic acid, malic acid, tartaric acid, citric acid, picric acid, methanesulfonic acid, benzenemethanesulfonic acid, benzenesulfonic acid, aspartic acid, glutamic acid, and a combination thereof.

In another preferred embodiment, the salt of the compound of formula I is selected from the group consisting of hydrochloride salt, maleate salt, oxalate salt, mucate salt, fumarate salt, D-glucuronate salt, and a combination thereof.

In the fifth aspect of the present invention, it provides a hydrochloride salt of a compound of formula Ic-1 or a crystal form A thereof,

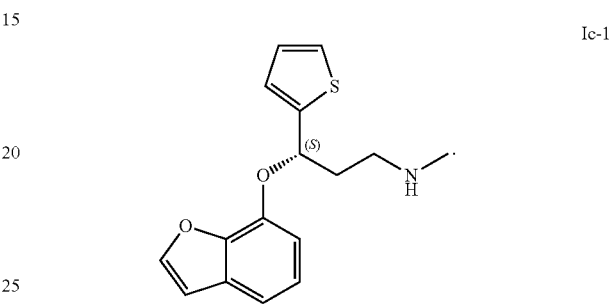

Ic-1

In another preferred embodiment, in the crystal form A of the hydrochloride salt of the compound Ic-1, the molecular molar ratio of the compound of formula Ic-1 to hydrochloric acid is 4:1, 3:1, 2:1, 1:1, 1:2, 1:3 or 4:1.

In another preferred embodiment, the crystal form A of the hydrochloride salt of the compound of formula Ic-1 is an anhydrous crystal form.

In another preferred embodiment, the X-ray powder diffraction pattern of the crystal form A of the hydrochloride salt has characteristic peaks at 2θ angles of 18.27±0.2°, 21.27±0.2°, and 22.89±0.2°.

In another preferred embodiment, the crystal form A of the hydrochloride salt also has characteristic peaks at one or more 2θ values selected from the group consisting of 16.85±0.2°, 22.20±0.2°, and 23.86±0.2°.

In another preferred embodiment, the crystal form A of the hydrochloride salt also has characteristic peaks at one or more 2θ values selected from the group consisting of 10.09±0.2°, 25.40±0.2°, and 28.18±0.2°.

In another preferred embodiment, the crystal form A of the hydrochloride salt also has characteristic peaks at one or more 2θ values selected from the group consisting of 10.09±0.2°, 16.85±0.2°, 22.20±0.2°, 23.86±0.2°, 25.40±0.2°, and 28.18±0.2°.

In another preferred embodiment, the crystal form A of the hydrochloride salt also has characteristic peaks at one or more 2θ values selected from the group consisting of 11.25±0.2°, 21.84±0.2°, 26.76±0.2°, 28.75±0.2°, and 32.57±0.2°.

In another preferred embodiment, the crystal form A of the hydrochloride salt has characteristic peaks at one or more 2θ values selected from the group consisting of 10.09±0.2°, 11.25±0.2°, 16.85±0.2°, 18.27±0.2°, 21.27±0.2°, 21.84±0.2°, 22.20±0.2°, 22.89±0.2°, 23.86±0.2°, 25.40±0.2°, 26.76±0.2°. 28.18±0.2°, 28.75±0.2°, and 32.57±0.2°.

In another preferred embodiment, the X-ray powder diffraction pattern of the crystal form A of the hydrochloride salt has characteristic peaks and peak intensities at one or more 2θ values selected from the group consisting of:

| 2θ value | d value | relative intensity % |
| --- | --- | --- |
| 10.09 | 8.76 | 52.42 |
| 11.25 | 7.87 | 12.51 |
| 16.85 | 5.26 | 75.73 |
| 18.27 | 4.86 | 100.00 |
| 21.27 | 4.18 | 82.46 |
| 21.84 | 4.07 | 31.52 |
| 22.20 | 4.00 | 71.08 |
| 22.89 | 3.88 | 83.32 |
| 23.86 | 3.73 | 57.43 |
| 25.40 | 3.51 | 39.30 |
| 26.76 | 3.33 | 25.94 |
| 28.18 | 3.17 | 36.31 |
| 28.75 | 3.11 | 25.68 |
| 32.57 | 2.75 | 10.18 |

In another preferred embodiment, the crystal form A of the hydrochloride salt has characteristic peaks of X-ray powder diffraction substantially as shown in FIG. 8.

In another preferred embodiment, the differential scanning calorimetry (DSC) pattern of the crystal form A of the hydrochloride salt begins to appear endothermic peak upon being heated to 141.8±5° C. (preferably ±4° C., ±3° C., ±2° C. or +1° C.).

In another preferred embodiment, the differential scanning calorimetry (DSC) pattern of the crystal form A of the hydrochloride salt is substantially as shown in FIG. 9.

In another preferred embodiment, the thermogravimetric analysis (TGA) pattern of the crystal form A of the hydrochloride salt has a weight loss of about 1.1±0.5% (preferably ±0.4%, ±0.3%, 0.2%, or 0.1%) upon being heated to 120° C.

In another preferred embodiment, the thermogravimetric analysis (TGA) pattern of the crystal form A of the hydrochloride salt is substantially as shown in FIG. 9.

In the sixth aspect of the present invention, it provides a method for preparing the crystal form A of the hydrochloride salt of the compound of formula Ic-1 according to the fifth aspect of the present invention, and the method comprises the steps of:

(a) after the compound of formula Ic-1 is mixed with the first organic solvent, hydrochloric acid is added dropwise at 5-15° C.; the pH of the system is adjusted to 6-8, the reaction is carried out and a solid is precipitated; the crystal form A of the hydrochloride salt of the compound of formula Ic-1 is obtained by filtration.

In another preferred embodiment, in the step (a), the first organic solvent includes ethyl acetate.

In another preferred embodiment, in the step (a), the hydrochloric acid is concentrated hydrochloric acid.

In another preferred embodiment, in the step (a), the pH of the system is 6.5-7.5, preferably 7.0.

In another preferred embodiment, in the step (a), the reaction time is 3-8 min, preferably 5 min.

In another preferred embodiment, in the step (a), the reaction is carried out under stirring conditions.

In another preferred embodiment, in the step (a), the hydrochloric acid is slowly added.

In another preferred embodiment, in the step (a), the weight-to-volume ratio (kg:L) of the compound of formula Ic-1 to the first organic solvent is 0.05-2:1-20, preferably 0.05-1:1-10, more preferably 0.1-0.5:2-7.

In another preferred embodiment, in the step (a), after the solid is precipitated, the crystal form A of the hydrochloride salt of the compound of formula Ic-1 is obtained by drying at 40-45° C.

In the seventh aspect of the present invention, it provides a maleate salt of a compound of formula Ic-1 or a crystal form B thereof,

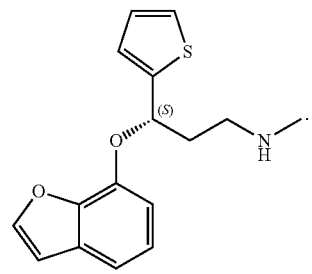

Ic-1

In another preferred embodiment, in the crystal form B of the maleate salt of the compound Ic-1, the molecular molar ratio of the compound of formula Ic-1 to maleic acid is 4:1, 3:1, 2:1, 1:1, 1:2, 1:3 or 4:1.

In another preferred embodiment, the crystal form B of the maleate salt of the compound Ic-1 is an anhydrous crystal form.

In another preferred embodiment, the X-ray powder diffraction pattern of the crystal form B of the maleate salt has characteristic peaks at 2θ angles of 19.23±0.2°, 24.04±0.2°, and 24.70±0.2°.

In another preferred embodiment, the crystal form B of the maleate salt also has characteristic peaks at one or more 2θ values selected from the group consisting of 11.83±0.2°, 19.56±0.2°, and 28.15±0.2°.

In another preferred embodiment, the crystal form B of the maleate salt also has characteristic peaks at one or more 2θ values selected from the group consisting of 9.70±0.2°, 18.23±0.2°, and 24.93±0.2°.

In another preferred embodiment, the crystal form B of the maleate salt also has characteristic peaks at one or more 2θ values selected from the group consisting of 9.70±0.2°, 11.83±0.2°, 18.23±0.2°, 19.56±0.2°, 24.93±0.2°, and 28.15±0.2°.

In another preferred embodiment, the crystal form B of the maleate salt also has characteristic peaks at one or more 2θ values selected from the group consisting of 15.22±0.2°, 16.30±0.2°, 18.82±0.2°, 21.15±0.2°, 21.83±0.2°, 23.60±0.2°, 26.35±0.2°, 28.94±0.2°, 32.59±0.2°, 33.31±0.2°, 34.74±0.2°, 35.94±0.2°, and 38.18.

In another preferred embodiment, the crystal form B of the maleate salt has characteristic peaks at one or more 2θ values selected from the group consisting of 9.70±0.2°, 11.83±0.2°, 15.22±0.2°, 16.30±0.2°, 18.23±0.2°, 18.82±0.2°, 19.23±0.2°, 19.56±0.2°, 21.15±0.2°, 21.83±0.2°, 23.60±0.2°, 24.04±0.2°, 24.70±0.2°, 24.93±0.2°, 26.35±0.2°, 28.15±0.2°, 28.94±0.2°, 32.59±0.2°, 33.31±0.2°, 34.74±0.2°, 35.94±0.2°, and 38.18±0.2°.

In another preferred embodiment, the X-ray powder diffraction pattern of the crystal form B of the maleate salt has characteristic peaks and peak intensities at one or more 2θ values selected from the group consisting of:

| 2θ | d value | relative intensity % |
| --- | --- | --- |
| 9.70 | 9.12 | 15.51 |
| 11.83 | 7.48 | 18.79 |
| 15.22 | 5.82 | 10.21 |
| 16.30 | 5.44 | 13.25 |
| 18.23 | 4.87 | 14.69 |
| 18.82 | 4.72 | 11.41 |
| 19.23 | 4.61 | 72.02 |

-continued

| 2θ | d value | relative intensity % |
|---|---|---|
| 19.56 | 4.54 | 37.68 |
| 21.15 | 4.20 | 8.57 |
| 21.83 | 4.07 | 1.84 |
| 23.60 | 3.77 | 12.70 |
| 24.04 | 3.70 | 100.00 |
| 24.70 | 3.60 | 42.79 |
| 24.93 | 3.57 | 15.64 |
| 26.35 | 3.38 | 12.47 |
| 28.15 | 3.17 | 24.14 |
| 28.94 | 3.09 | 9.61 |
| 32.59 | 2.75 | 3.74 |
| 33.31 | 2.69 | 3.29 |
| 34.74 | 2.58 | 2.77 |
| 35.94 | 2.50 | 1.13 |
| 38.18 | 2.36 | 1.62. |

In another preferred embodiment, the crystal form B of the maleate salt has characteristic peaks of X-ray powder diffraction substantially as shown in FIG. 11.

In another preferred embodiment, the differential scanning calorimetry (DSC) pattern of the crystal form B of the maleate salt begins to appear endothermic peak upon being heated to 105.8±5° C. (preferably ±4° C., ±3° C., ±2° C. or ±1° C.).

In another preferred embodiment, the differential scanning calorimetry (DSC) pattern of the crystal form B of the maleate salt is substantially as shown in FIG. 12.

In another preferred embodiment, the thermogravimetric analysis (TGA) pattern of the crystal form B of the maleate salt has a weight loss of about 0.8±0.5% (preferably ±0.4%, +0.3%, 0.2%, or 0.1%) upon being heated to 80° C.

In another preferred embodiment, the thermogravimetric analysis (TGA) pattern of the crystal form B of the maleate salt is substantially as shown in FIG. 12.

In the eighth aspect of the present invention, it provides a method for preparing the crystal form B of the maleate salt of the compound of formula Ic-1 as described in the seventh aspect of the present invention, and the method comprises the steps of:
(b) after the compound of formula Ic-1, maleic acid and the second organic solvent are mixed, the reaction is carried out and a solid is precipitated, and the crystal form B of the maleate salt of the compound of formula Ic-1 is obtained by filtration.

In another preferred embodiment, in the step (b), the second organic solvent includes ethyl acetate.

In another preferred embodiment, in the step (b), the reaction time is 4-10 days, preferably 5-7 days.

In another preferred embodiment, in the step (b), the reaction is carried out under stirring conditions.

In another preferred embodiment, the rotating speed of the stirring is 700-800 rpm.

In another preferred embodiment, in the step (b), the reaction temperature is room temperature.

In another preferred embodiment, in the step (b), the weight-to-volume ratio (kg:ml) of the compound of formula Ic-1 to the second organic solvent is 0.05-2:1-10, preferably 0.05-1:1-30, more preferably 0.1-0.5:1-20.

In another preferred embodiment, in the step (b), the weight ratio of the compound of formula Ic-1 to maleic acid is 0.05-2:0.05-0.3, preferably 0.05-1:0.05-0.2, more preferably 0.1-0.5:0.08-0.16.

In another preferred embodiment, in the step (b), after the solid is precipitated, the crystal form B of maleate salt of the compound of formula Ic-1 is obtained by vacuum drying at room temperature.

In the ninth aspect of the present invention, it provides an oxalate salt of a compound of formula Ic-1 or a crystal form C thereof,

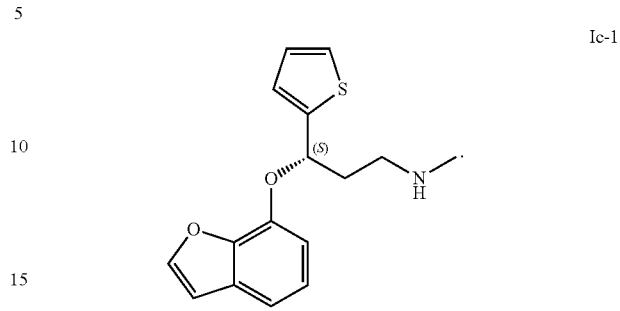

Ic-1

In another preferred embodiment, in the crystal form C of the oxalate salt of the compound Ic-1, the molecular molar ratio of the compound of formula Ic-1 to oxalic acid is 4:1, 3:1, 2:1, 1:1, 1:2, 1:3 or 4:1.

In another preferred embodiment, the crystal form C of the oxalate salt of the compound Ic-1 is an anhydrous crystal form.

In another preferred embodiment, the X-ray powder diffraction pattern of the crystal form C of the oxalate salt has characteristic peaks at 2θ angles of 14.64±0.2°, 22.05±0.2°, and 25.61 0.2°.

In another preferred embodiment, the crystal form C of the oxalate salt also has characteristic peaks at one or more 2θ values selected from the group consisting of 16.36±0.2°, 20.90±0.2°, and 23.43±0.2°.

In another preferred embodiment, the crystal form C of the oxalate salt also has characteristic peaks at one or more 2θ values selected from the group consisting of 15.27±0.2°, 16.07±0.2°, and 19.52±0.2°.

In another preferred embodiment, the crystal form C of the oxalate salt also has characteristic peaks at one or more 2θ values selected from the group consisting of 15.27±0.2°, 16.07±0.2°, 16.36±0.2°, 17.63±0.2°, 19.52±0.2°, 20.90±0.2°, and 23.43±0.2°.

In another preferred embodiment, the crystal form C of the oxalate salt has characteristic peaks at one or more 2θ values selected from the group consisting of 14.64±0.2°, 15.27±0.2°, 16.07±0.2°, 16.36±0.2°, 17.63±0.2°, 19.52±0.2°, 20.90±0.2°, 22.05±0.2°, 23.43±0.2°, and 25.61 0.2°.

In another preferred embodiment, the X-ray powder diffraction pattern of the crystal form C of the oxalate salt has characteristic peaks and peak intensities at one or more 2θ values selected from the group consisting of:

| 2θ | d value | relative intensity % |
|---|---|---|
| 14.64 | 6.05 | 24.38 |
| 15.27 | 5.80 | 10.02 |
| 16.07 | 5.52 | 11.65 |
| 16.36 | 5.42 | 19.89 |
| 17.63 | 5.03 | 2.55 |
| 19.52 | 4.55 | 10.17 |
| 20.90 | 4.25 | 12.83 |
| 22.05 | 4.03 | 100.00 |
| 23.43 | 3.80 | 16.77 |
| 25.61 | 3.48 | 23.51. |

In another preferred embodiment, the crystal form C of the oxalate salt has characteristic peaks of X-ray powder diffraction substantially as shown in FIG. 15.

In another preferred embodiment, the differential scanning calorimetry (DSC) pattern of the crystal form C of the oxalate salt begins to appear endothermic peak upon being heated to 152.2±5° C. (preferably ±4° C., ±3° C., ±2° C., or ° C.).

In another preferred embodiment, the differential scanning calorimetry (DSC) pattern of the crystal form C of the oxalate salt is substantially as shown in FIG. 16.

In another preferred embodiment, the thermogravimetric analysis (TGA) pattern of the crystal form C of the oxalate salt has a weight loss of about 1.0±0.5% (preferably ±0.4%, ±0.3%, 0.2% or 0.1%) upon being heated to 100° C.

In another preferred embodiment, the thermogravimetric analysis (TGA) pattern of the crystal form C of the oxalate salt is substantially as shown in FIG. 16.

In the tenth aspect of the present invention, it provides a method for preparing the crystal form C of the oxalate salt of the compound of formula Ic-1 described in the ninth aspect of the present invention, and the method comprises the steps of:
(c) after the compound of formula Ic-1, oxalic acid and the third organic solvent are mixed, the reaction is carried out and a solid is precipitated, and the crystal form C of the oxalate salt of the compound of formula Ic-1 is obtained by filtration.

In another preferred embodiment, in the step (c), the third organic solvent includes ethyl acetate.

In another preferred embodiment, in the step (c), the reaction time is 4-10 days, preferably 5-7 days.

In another preferred embodiment, in the step (c), the reaction is carried out under stirring conditions.

In another preferred embodiment, the rotating speed of the stirring is 700-800 rpm.

In another preferred embodiment, in the step (c), the reaction temperature is room temperature.

In another preferred embodiment, in the step (c), the weight-to-volume ratio (kg:ml) of the compound of formula Ic-1 to the third organic solvent is 0.05-2:1-10, preferably 0.05-1:1-30, more preferably 0.1-0.5:1-20.

In another preferred embodiment, in the step (c), the weight ratio of the compound of formula Ic-1 and oxalic acid is 0.05-2:0.05-0.3, preferably 0.08-1:0.05-0.2, more preferably 0.1-0.5:0.06-0.13.

In another preferred embodiment, in the step (c), after the solid is precipitated, the crystal form C of the oxalate salt of the compound of formula Ic-1 is obtained by vacuum drying at room temperature.

In the eleventh aspect of the present invention, it provides a mucate salt of a compound of formula Ic-1 or a crystal form D thereof,

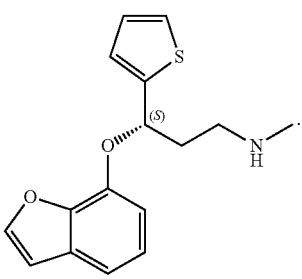

Ic-1

In another preferred embodiment, in the crystal form D of the mucate salt of the compound Ic-1, the molecular molar ratio of the compound of formula Ic-1 to mucic acid is 4:1, 3:1, 2:1, 1:1, 1:2, 1:3 or 4:1.

In another preferred embodiment, the crystal form D of the mucate salt of the compound Ic-1 is an anhydrous crystal form.

In another preferred embodiment, the X-ray powder diffraction pattern of the crystal form D of the mucate salt has characteristic peaks at 2θ angles of 3.79±0.2°, 11.28±0.2°, and 19.48±0.2°.

In another preferred embodiment, the crystal form D of the mucate salt also has characteristic peaks at one or more 2θ values selected from the group consisting of 15.81±0.2°, 20.98±0.2°, and 23.91±0.2°.

In another preferred embodiment, the crystal form D of the mucate salt also has characteristic peaks at one or more 2θ values selected from the group consisting of 16.97±0.2°, 25.88±0.2°, and 28.40±0.2°.

In another preferred embodiment, the crystal form D of the mucate salt also has characteristic peaks at one or more 2θ values selected from the group consisting of 15.81 0.2°, 16.97±0.2°, 20.98±0.2°, 23.91±0.2°, 25.88±0.2°, and 28.40±0.2°, In another preferred embodiment, the crystal form D of the mucate salt also has characteristic peaks at one or more 2θ values selected from the group consisting of 14.21±0.2°, 17.71±0.2°, 27.16±0.2°, 29.49±0.2°, 30.74±0.2°, 32.33±0.2°, 34.50±0.2°, 35.42±0.2°, and 36.16±0.2°.

In another preferred embodiment, the crystal form D of the mucate salt has characteristic peaks at one or more 2θ values selected from the group consisting of 3.79±0.2°, 11.28±0.2°, 14.21±0.2°, 15.81±0.2°, 16.97±0.2°, 17.71±0.2°, 19.48±0.2°, 20.98±0.2°, 23.91±0.2°, 25.88±0.2°, 27.16±0.2°, 28.40±0.2°, 29.49±0.2°, 30.74±0.2°, 32.33±0.2°, 34.50±0.2°, 35.42±0.2°, and 36.16±0.2°.

In another preferred embodiment, the X-ray powder diffraction pattern of the crystal form D of the mucate salt has characteristic peaks and peak intensities at one or more 2θ values selected from the group consisting of:

| 2θ | d value | relative intensity % |
|---|---|---|
| 3.79 | 23.30 | 40.31 |
| 11.28 | 7.84 | 100.00 |
| 14.21 | 6.23 | 3.82 |
| 15.81 | 5.61 | 39.14 |
| 16.97 | 5.23 | 14.93 |
| 17.71 | 5.01 | 8.72 |
| 19.48 | 4.56 | 87.36 |
| 20.98 | 4.23 | 18.69 |
| 23.91 | 3.72 | 21.51 |
| 25.88 | 3.44 | 10.60 |
| 27.16 | 3.28 | 3.35 |
| 28.40 | 3.14 | 10.06 |
| 29.49 | 3.03 | 5.70 |
| 30.74 | 2.91 | 6.11 |
| 32.33 | 2.77 | 3.19 |
| 34.50 | 2.60 | 3.87 |
| 35.42 | 2.53 | 3.41 |
| 36.16 | 2.48 | 2.23. |

In another preferred embodiment, the crystal form D of the mucate salt has X-ray powder diffraction characteristic peaks substantially as shown in FIG. 18.

In another preferred embodiment, the differential scanning calorimetry (DSC) pattern of the crystal form D of the mucate salt begins to appear endothermic peak upon being heated to 140.9±5° C. (preferably ±4° C., ±3° C., ±2° C. or +1° C.).

In another preferred embodiment, the differential scanning calorimetry (DSC) pattern of the crystal form D of the mucate salt is substantially as shown in FIG. 19.

In another preferred embodiment, the thermogravimetric analysis (TGA) pattern of the crystal form D of the mucate salt has a weight loss of about 1.45±0.5% (preferably ±0.4%, ±0.3%, 0.2% or 0.1%) upon being heated to 100° C.

In another preferred embodiment, the thermogravimetric analysis (TGA) diagram of the crystal form D of the mucate salt is substantially as shown in FIG. 19.

In the twelfth aspect of the present invention, it provides a method for preparing the crystal form D of the mucate salt of the compound of formula Ic-1 described in the eleventh aspect of the present invention, and the method comprises the steps of:

(d) after the compound of formula Ic-1, the mucic acid and the fourth organic solvent are mixed, the reaction is carried out and a solid is precipitated, and the crystal form D of the mucate salt of the compound of formula Ic-1 is obtained by filtration.

In another preferred embodiment, in the step (d), the fourth organic solvent includes ethyl acetate.

In another preferred embodiment, in the step (d), the reaction temperature is 40-60° C.

In another preferred embodiment, in the step (d), the reaction time is 1-3 days, preferably 1.5-2.5 days.

In another preferred embodiment, in the step (d), the weight-to-volume ratio (mg:ml) of mucic acid to the compound of formula Ic-1 is 1-20:0.1-1.5, preferably 1-15:0.1-1, more preferably 5-10:0.2-0.8.

In another preferred embodiment, in the step (d), in the mixed system, the concentration of the compound of formula Ic-1 in the fourth solvent is 20-60 mg/mL, preferably 30-50 mg/mL, more preferably 35-45 mg/mL.

In another preferred embodiment, in the step (d), after the solid is precipitated, the crystal form D of the mucate salt of the compound of formula Ic-1 is obtained by vacuum drying at room temperature.

In the thirteenth aspect of the present invention, it provides a fumarate salt of a compound of formula Ic-1 or a crystal form E thereof,

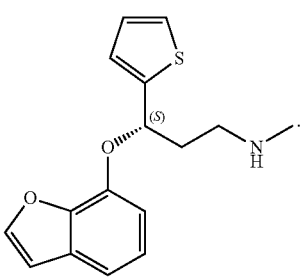
Ic-1

In another preferred embodiment, in the crystal form E of the fumarate salt of compound Ic-1, the molecular molar ratio of the compound of formula Ic-1 to fumaric acid is 4:1, 3:1, 2:1, 1:1, 1:2, 1:3 or 4:1.

In another preferred embodiment, the crystal form E of the fumarate salt of the compound of Ic-1 is an anhydrous crystal form.

In another preferred embodiment, the X-ray powder diffraction pattern of the crystal form E of the fumarate salt has characteristic peaks at 2θ angles of 14.17±0.2°, 18.95±0.2°, and 23.76±0.2°.

In another preferred embodiment, the crystal form E of the fumarate salt also has characteristic peaks at one or more 2θ values selected from the group consisting of 4.7±0.2°, 22.75±0.2°, and 26.93±0.2°.

In another preferred embodiment, the crystal form E of the fumarate salt also has characteristic peaks at one or more 2θ values selected from the group consisting of 13.34±0.2°, 15.63±0.2°, and 28.69±0.2°.

In another preferred embodiment, the crystal form E of the fumarate salt also has characteristic peaks at one or more 2θ values selected from the group consisting of 4.7±0.2°, 13.34±0.2°, 15.63±0.2°, 22.75±0.2°, 26.93±0.2°, and 28.69±0.2°.

In another preferred embodiment, the crystal form E of the fumarate salt also has characteristic peaks at one or more 2θ values selected from the group consisting of 9.41±0.2°, 17.62±0.2°, 25.66±0.2°, and 31.34±0.2°.

In another preferred embodiment, the crystal form E of the fumarate salt has characteristic peaks at one or more 2θ values selected from the group consisting of 4.7±0.2°, 9.41±0.2°, 13.34±0.2°, 14.17±0.2°, 15.63±0.2°, 17.62, 18.95±0.2°, 22.75±0.2°, 23.76±0.2°, 25.66±0.2°, 26.93±0.2°, 28.69±0.2°, and 31.34±0.2°.

In another preferred embodiment, the X-ray powder diffraction pattern of the crystal form E of the fumarate salt has characteristic peaks and peak intensities at one or more 2θ values selected from the group consisting of:

| 2θ | d value | relative intensity % |
| --- | --- | --- |
| 4.70 | 18.82 | 9.14 |
| 9.41 | 9.40 | 5.61 |
| 13.34 | 6.64 | 7.80 |
| 14.17 | 6.25 | 28.48 |
| 15.63 | 5.67 | 6.40 |
| 17.62 | 5.03 | 2.92 |
| 18.95 | 4.68 | 44.00 |
| 22.75 | 3.91 | 10.62 |
| 23.76 | 3.74 | 100.00 |
| 25.66 | 3.47 | 5.88 |
| 26.93 | 3.31 | 14.03 |
| 28.69 | 3.11 | 6.48 |
| 31.34 | 2.85 | 2.76. |

In another preferred embodiment, the crystal form E of the fumarate salt has characteristic peaks of X-ray powder diffraction substantially as shown in FIG. 21.

In another preferred embodiment, the differential scanning calorimetry (DSC) pattern of the crystal form E of the fumarate salt begins to appear endothermic peak upon being heated to 76.5±5° C. (preferably ±4° C., ±3° C., ±2° C. or ±1° C.).

In another preferred embodiment, the differential scanning calorimetry (DSC) pattern of the crystal form E of the fumarate salt is substantially as shown in FIG. 22.

In another preferred embodiment, the thermogravimetric analysis (TGA) pattern of the crystal form E of the fumarate salt has a weight loss of about 2.17±0.5% (preferably ±0.4%, ±0.3%, 0.2% or 0.1%) upon being heated to 80° C.

In another preferred embodiment, the thermogravimetric analysis (TGA) pattern of the crystal form E of the fumarate salt is substantially as shown in FIG. 22.

In the fourteenth aspect of the present invention, it provides a method for preparing the crystal form E of the fumarate salt of the compound of formula Ic-1 described in the thirteenth aspect of the present invention, and the method comprises the steps of:

(e) after the compound of formula Ic-1, fumaric acid and the fifth organic solvent are mixed, the reaction is carried out and a solid is precipitated, and the crystal form E of the fumarate salt of the compound of formula Ic-1 is obtained by filtration.

In another preferred embodiment, in the step (e), the fifth organic solvent includes ethyl acetate.

In another preferred embodiment, in the step (e), after mixing, the mixture is stirred at room temperature for 3-5 days.

In another preferred embodiment, in the step (e), the reaction temperature is room temperature, In another preferred embodiment, in the step (e), the weight-to-volume ratio (mg:ml) of fumaric acid to the compound of formula Ic-1 is 1-20:0.1-1.5, preferably 1-15: 0.1-1, more preferably 5-10:0.2-0.8.

In another preferred embodiment, in the step (e), in the mixed system, the concentration of the compound of formula Ic-1 in the fifth solvent is 20-60 mg/mL, preferably 30-50 mg/mL, more preferably 35-45 mg/mL.

In another preferred embodiment, in the step (e), after the solid is precipitated, the crystal form E of the fumarate salt of the compound of formula Ic-1 is obtained by vacuum drying at room temperature.

In the fifteenth aspect of the present invention, it provides a D-glucuronate salt of a compound of formula Ic-1 or a crystal form F thereof,

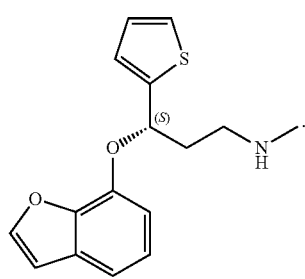

Ic-1

In another preferred embodiment, in the crystal form F of the D-glucuronate salt, the molecular molar ratio of the compound of formula Ic-1 to D-glucuronic acid is 4:1, 3:1, 2:1, 1:1, 1:2, 1:3 or 4:1.

In another preferred embodiment, the crystal form F of the D-glucuronate salt of the compound Ic-1 is an anhydrous crystal form.

In another preferred embodiment, the X-ray powder diffraction pattern of the crystal form F of the D-glucuronate salt has characteristic peaks at 2θ angles of 4.77±0.2°, 16.13±0.2°, and 19.53±0.2°.

In another preferred embodiment, the crystal form F of the D-glucuronate salt also has characteristic peaks at one or more 2θ values selected from the group consisting of 8.34±0.2°, 17.54±0.2°, and 20.06±0.2°.

In another preferred embodiment, the crystal form F of the D-glucuronate salt also has characteristic peaks at one or more 2θ values selected from the group consisting of 10.87±0.2°, 21.25±0.2°, and 25.93±0.2°.

In another preferred embodiment, the crystal form F of the D-glucuronate salt also has characteristic peaks at one or more 2θ values selected from the group consisting of 8.34±0.2°, 10.87±0.2°, 17.54±0.2°, 20.06±0.2°, 21.25±0.2°, 23.42±0.2°, and 25.93±0.2°.

In another preferred embodiment, the crystal form F of the D-glucuronate salt also has characteristic peaks at one or more 2θ values selected from the group consisting of 4.77±0.2°, 8.34±0.2°, 10.87±0.2°, 16.13±0.2°, 17.54±0.2°, 19.53±0.2°, 20.06±0.2°, 21.25±0.2°, 23.42±0.2°, and 25.93±0.2°.

In another preferred embodiment, the X-ray powder diffraction pattern of the crystal form F of the D-glucuronate salt has characteristic peaks and peak intensities at one or more 2θ values selected from the group consisting of:

| 2θ | d value | relative intensity % |
| --- | --- | --- |
| 4.77 | 18.52 | 100.00 |
| 8.34 | 10.60 | 54.57 |
| 10.87 | 8.14 | 46.79 |
| 16.13 | 5.49 | 97.98 |
| 17.54 | 5.06 | 55.33 |
| 19.53 | 4.55 | 74.17 |
| 20.06 | 4.43 | 60.75 |
| 21.25 | 4.18 | 44.80 |
| 23.42 | 3.80 | 29.68 |
| 25.93 | 3.44 | 31.65. |

In another preferred embodiment, the crystal form F of the D-glucuronate salt has characteristic peaks of X-ray powder diffraction substantially as shown in FIG. 24.

In another preferred embodiment, the differential scanning calorimetry (DSC) pattern of the crystal form F of the D-glucuronate salt begins to appear endothermic peak upon being heated to 119.1±5° C. (preferably ±4° C., ±3° C., ±2° C. or ±1° C.).

In another preferred embodiment, the differential scanning calorimetry (DSC) pattern of the crystal form F of the D-glucuronate salt is substantially as shown in FIG. 25.

In another preferred embodiment, the thermogravimetric analysis (TGA) pattern of the crystal form F of the D-glucuronate salt has a weight loss of about 2.71±0.5% (preferably ±0.4%, ±0.3%, 0.2% or 0.1%) upon being heated to 100° C.

In another preferred embodiment, the thermogravimetric analysis (TGA) pattern of the crystal form F of the D-glucuronate salt is substantially as shown in FIG. 25.

In the sixteenth aspect of the present invention, it provides a method for preparing the crystal form F of the D-glucuronate salt of the compound of formula Ic-1 described in the fifteenth aspect of the present invention, and the method comprises the steps of: (f) after the compound of formula Ic-1, D-glucuronic acid and the sixth organic solvent are mixed, the reaction is carried out and a solid is precipitated, and the crystal form F of the D-glucuronate salt of the compound of formula Ic-1 is obtained by filtration.

In another preferred embodiment, in the step (f), the sixth organic solvent includes acetonitrile.

In another preferred embodiment, in the step (f), after mixing, the mixture is stirred at room temperature for 3-5 days.

In another preferred embodiment, in the step (f), the reaction temperature is room temperature, In another preferred embodiment, in the step (f), the weight-to-volume ratio (mg:ml) of D-glucuronic acid to the compound of formula Ic-1 is 5-30:0.1-2, preferably 5-20: 0.1-1, more preferably 10-16:0.2-0.7.

In another preferred embodiment, in the step (f), in the mixed system, the concentration of the compound of formula Ic-1 in the fifth solvent is 20-60 mg/mL, preferably 30-50 mg/mL, more preferably 35-45 mg/mL.

In another preferred embodiment, in the step (f), after the solid is precipitated, the crystal form F of the D-glucuronate salt of the compound of formula Ic-1 is obtained by vacuum drying at room temperature.

In the seventeenth aspect of the present invention, it provides a pharmaceutical composition, and the composition comprises the crystal form A of hydrochloride salt of the compound of formula Ic-1 as described in the fifth aspect of the present invention, the crystal form B of the maleate salt of the compound of formula Ic-1 as described in the seventh aspect of the present invention, the crystal form C of the oxalate salt of the compound of formula Ic-1 as described in the ninth aspect of the present invention, the crystal form D of the mucate salt of the compound of formula Ic-1 as described in the eleventh aspect of the present invention, the crystal form E of the fumarate salt of the compound of formula Ic-1 as described in the thirteenth aspect of the present invention, or the crystal form F of the D-glucuronate salt of the compound of formula Ic-1 as described in the fifteenth aspect of the present invention; and pharmaceutically acceptable carriers.

In the eighteenth aspect of the present invention, it provides a use of the crystal form A of hydrochloride salt of the compound of formula Ic-1 as described in the fifth aspect of the present invention, the crystal form B of maleate salt of the compound of formula Ic-1 as described in the seventh aspect of the present invention, the crystal form C of the oxalate salt of the compound of formula Ic-1 as described in the ninth aspect of the present invention, the crystal form D of the mucate salt of the compound of formula Ic-1 as described in the eleventh aspect of the present invention, the crystal form E of the fumarate salt of the compound of formula Ic-1 as described in the thirteenth aspect of the present invention, or the crystal form F of the D-glucuronate salt of the compound of formula Ic-1 as described in the fifteenth aspect of the present invention for (a) preparing transient receptor potential channel protein (TRP) inhibitors; and/or (b) manufacturing a medicament for preventing and/or treating diseases related to transient receptor potential channel protein (TRP).

In another preferred embodiment, the transient receptor potential channel protein (TRP) is TRPAL.

In another preferred embodiment, the disease related to transient receptor potential channel protein (TRP) is selected from the group consisting of pain, epilepsy, inflammation, respiratory disorder, pruritus, urinary tract disorder, inflammatory bowel disease, and combinations thereof.

In another preferred embodiment, the pain is acute pain or chronic pain.

In another preferred embodiment, the pain is selected from the group consisting of acute inflammatory pain, chronic inflammatory pain, visceral pain, neurogenic pain, fibromyalgia, headache, neuralgia, pain caused by cancer, and a combination thereof.

In another preferred embodiment, the pain is inflammatory pain.

In another preferred embodiment, the inflammatory pain is acute inflammatory pain or chronic inflammatory pain.

In another preferred embodiment, the headache is migraine or muscular tension pain.

In another preferred embodiment, the neuralgia is trigeminal neuralgia, diabetic pain or postherpetic neuralgia.

In another preferred embodiment, the pain is selected from the group consisting of acute pain, fibromyalgia, visceral pain, inflammatory pain, neuralgia, and a combination thereof.

In another preferred embodiment, the pain is fibromyalgia.

In the nineteenth aspect of the present invention, it provides a non-therapeutic and non-diagnostic in vitro method for inhibiting the activity of transient receptor potential channel protein, comprising the steps of: contacting the transient receptor potential channel proteins or cells expressing the proteins with the crystal form A of hydrochloride salt of the compound of formula Ic-1 as described in the fifth aspect of the present invention, the crystal form B of maleate salt of the compound of formula Ic-1 as described in the seventh aspect of the present invention, the crystal form C of the oxalate salt of the compound of formula Ic-1 as described in the ninth aspect of the present invention, the crystal form D of the mucate salt of the compound of formula Ic-1 as described in the eleventh aspect of the present invention, the crystal form E of the fumarate salt of the compound of formula Ic-1 as described in the thirteenth aspect of the present invention, or the crystal form F of the D-glucuronate salt of the compound of formula Ic-1 as described in the fifteenth aspect of the present invention, thereby inhibiting the activity of the transient receptor potential channel protein.

In the twentieth aspect of the present invention, it provides a method for inhibiting transient receptor potential channel protein or preventing and/or treating diseases related to transient receptor potential channel protein (TRP), comprising the steps of: administering the crystal form A of hydrochloride salt of the compound of formula Ic-1 as described in the fifth aspect of the present invention, the crystal form B of maleate salt of the compound of formula Ic-1 as described in the seventh aspect of the present invention, the crystal form C of the oxalate salt of the compound of formula Ic-1 as described in the ninth aspect of the present invention, the crystal form D of the mucate salt of the compound of formula Ic-1 as described in the eleventh aspect of the present invention, the crystal form E of the fumarate salt of the compound of formula Ic-1 as described in the thirteenth aspect of the present invention, or the crystal form F of the D-glucuronate salt of the compound of formula Ic-1 as described in the fifteenth aspect of the present invention to a subject in need thereof, thereby preventing and/or treating diseases related to transient receptor potential channel protein (TRP).

In another preferred embodiment, the subject includes humans and non-human mammals (rodents, rabbits, monkeys, livestock, dogs, cats, etc.).

It should be understood that within the scope of the present invention, the above-described technical features of the present invention and the technical features described in detail below (e.g., examples) may be combined with each other to constitute a new or preferred technical solution. Limited by space, it will not be repeated here.

DETAILED DESCRIPTION OF THE INVENTION

Figure 1A:
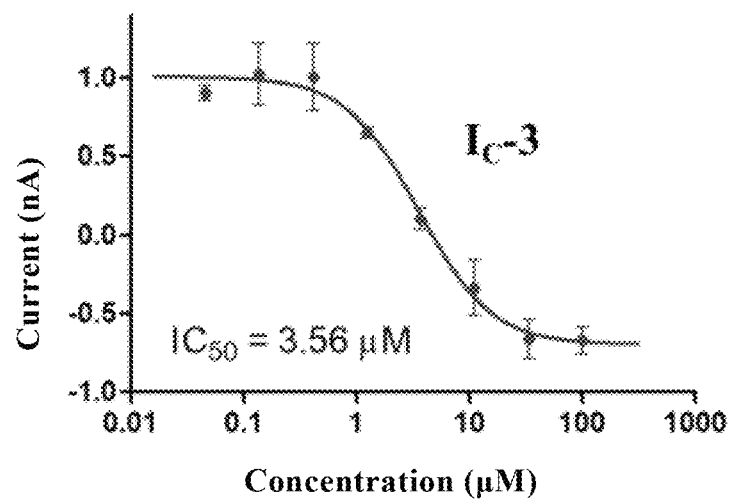
FIGS. 1A-1E are the dose-effect relationship curves of the compounds Ic-3, Ic-4, Ic-8, Ic-23 and Ic-24 of the present invention inhibiting the activity of TRPA1.
Figure 1B:
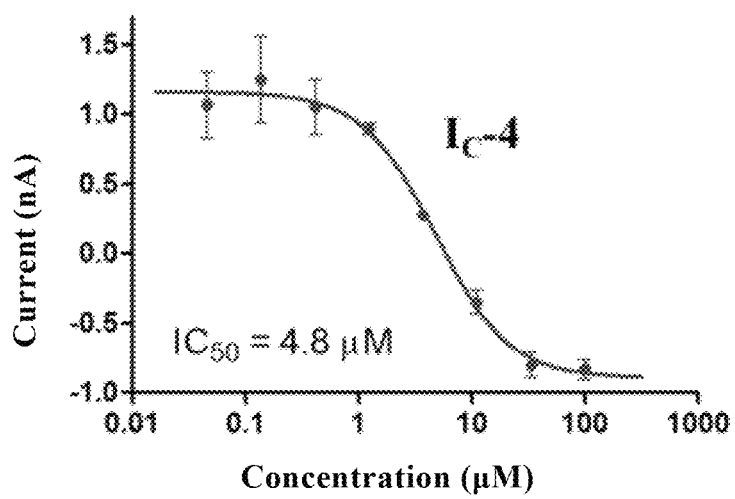
Figure 1C:
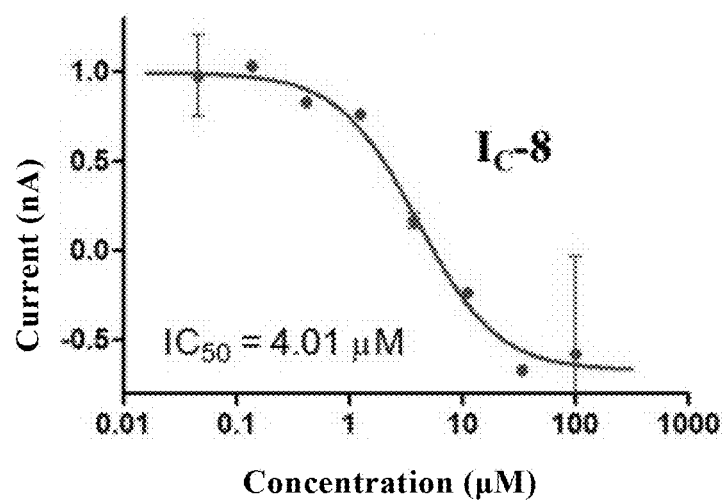
Figure 1D:
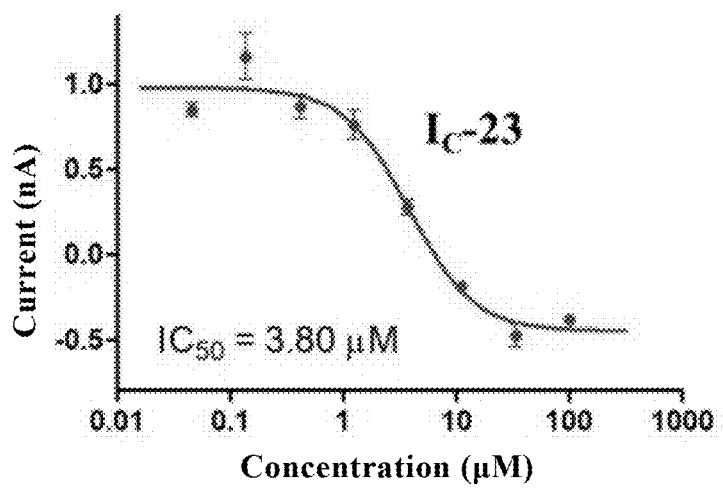
Figure 1E:
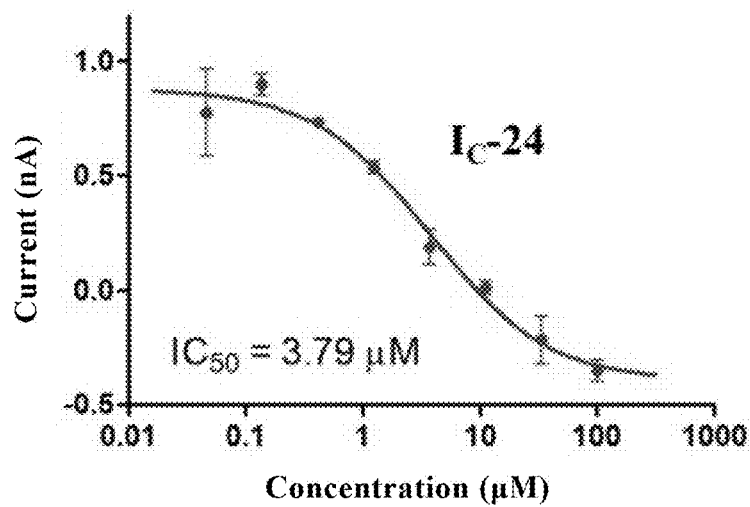

Through extensive and in-depth research, the present inventors have unexpectedly developed a compound, or a pharmaceutically acceptable salt thereof, and a preparation method and a salt crystal form thereof for the first time, and the compound has a structure of formula I. Experiments show that the compounds of the present invention have significant inhibitory effect on TRP channel. The compounds of the present invention can effectively treat pain related to TRP (especially TRPA1) targets and the like. The present invention has been completed on this basis.

Terms

As used herein, the terms "include," "comprise" and "contain" are used interchangeably to include not only closed definitions, but also semi-closed, and open definitions. In other words, the term includes "consist of" and "substantially consist of".

As used herein, "$R_1$", "$R^1$" and "R1" have the same meaning and can be replaced with each other, and other similar definitions have the same meaning.

As used herein, the term "$C_1$-$C_{12}$ alkyl", "$C_1$-$C_8$ alkyl", "$C_1$-$C_6$ alkyl", "$C_1$-$C_4$ alkyl" or "$C_1$-$C_3$ alkyl" refers to the linear or branched alkyl having 1 to 12, 1 to 8, 1 to 6, 1 to 4 or 1 to 3 carbon atoms, such as methyl, ethyl, propyl, isopropyl, butyl, isobutyl, sec-butyl, tert-butyl, or the like.

As used herein, the term "$C_1$-$C_6$ alkoxy" refers to the linear or branched alkoxy having 1-6 carbon atoms, such as methoxy, ethoxy, propoxy, isopropoxy, butoxy, isobutoxy, sec-butoxy, tert-butoxy, pentyloxy, hexyloxy, or the like.

As used herein, the term "$C_6$-$C_{12}$ benzo aliphatic cyclic group" refers to a group having 6-12 carbon atoms, including indanyl, tetrahydronaphthyl or dihydronaphthyl and the like.

As used herein, the term "$C_3$-$C_2$ cycloalkyl" or "$C_3$-$C_7$ cycloalkyl" refers to the cycloalkyl (including monocyclic, dicyclic or polycyclic system) having 3-12 or 3-7 carbon atoms, such as cyclopropyl, cyclobutyl, methylcyclobutyl, cyclopentyl, cycloheptyl, or the like.

As used herein, the term "$C_2$-$C_6$ ester" refers to the group having the structure of $C_1$-$C_5$ alkyl-COO— or —COO—$C_1$-$C_8$ alkyl in which the alkyl can be linear or branched, such as $CH_3COO$—, $C_2H_5COO$—, $C_3H_5COO$—, $(CH_3)_2CHCOO$—, —$COOCH_3$, —$COOC_2H_5$, —$COOC_3H_8$, or the like.

As used herein, the term "$C_2$-$C_4$ amide" refers to the group having structure of $C_1$-$C_3$ alkyl-CO—NH— or —CO—NH—$C_1$-$C_3$ alkyl in which the alkyl can be linear or branched, such as $CH_3$—CO—NH—, $C_2H_5$—CO—NH—, $C_3H_5$—CO—NH—, —$COOCH_3$, —CO—NH—$C_2H_8$, —CO—NH—$C_3H_8$, or the like.

As used herein, the term "$C_2$-$C_4$ acyl" refers to the group having structure of $C_1$-$C_3$ alkyl-CO— in which the alkyl can be linear or branched, such as $CH_3$—CO—, $C_2H_5$—CO—, $C_3H$—CO—, or the like.

As used herein, the term "$C_3$-$C_7$ heterocycloalkyl" refers to the monocyclic or polycyclic heterocycle (preferably monocyclic heterocycle) having 3-7 ring carbon atoms and 1-3 heteroatoms (preferably contains one nitrogen atom, that is, the nitrogen atom adjacent to both $R^1$ and $R^2$), such as piperidinyl, tetrahydropyrrolyl, or the like.

As used herein, the term "4-12-membered carbocyclic ring", "5-10-membered carbocyclic ring" or "5-7-membered carbocyclic ring" refers to any stable 4, 5, 6, 7, 8, 9, 10, 11 or 12-membered monocyclic, bicyclic, or polycyclic rings, and the carbocyclic ring may be saturated, partially unsaturated, or unsaturated ring, but cannot be aromatic ring. Examples of the carbocyclic rings include, but are not limited to, cyclopropane ring, cyclobutane ring, cyclobutene ring, cyclopentane ring, cyclopentene ring, cyclohexane ring, cyclohexene ring, cycloheptane ring, cycloheptene ring, adamantane ring, cyclooctane ring, cyclooctene ring, cyclooctadiene ring, bicyclo[3.3.0]octane, bicyclo[4.3.0]nonane, bicyclo[4.4.0]decane, bicyclo[2.2.2]octane, fluorenyl, indane ring.

As used herein, the term "heterocyclic ring" refers to any stable monocyclic, bicyclic or polycyclic rings (such as 5-, 6- or 7-membered), the heterocyclic ring contains one or more (preferably 1 to 3) heteroatoms selected from N, O and S. The heterocyclic ring can be a saturated, partially unsaturated, or unsaturated ring, but cannot be an aromatic ring. The number of members preceding the heterocyclic ring refers to the number of ring atoms, e.g., a 4-12 membered heterocyclic ring has 4-12 ring atoms.

As used herein, the term "heteroaromatic ring" refers to the aromatic heterocyclic ring system having one to more (preferably 1, 2 or 3) heteroatoms selected from N, O and S. The number of members preceding the heteroaromatic ring refers to the number of ring atoms, e.g., the 5-7 membered heteroaromatic ring has 5-7 ring atoms. It should be understood that when multiple heteroatoms are contained, the heteroatoms may be the same, partially the same, or completely different. For example, examples of 5-membered heteroaromatic rings include (but are not limited to) pyrrole ring, furan ring, thiophene ring, imidazole ring, oxazole ring, thiazole ring, and examples of 6-membered heteroaromatic rings include (but are not limited to) pyridine ring, pyrazine ring, pyridazine ring, pyrimidine ring, or the like.

As used herein, the term "$C_1$-$C_6$ haloalkyl" and "$C_1$-$C_3$ haloalkyl" refer to the linear or branched alkyl having 1 to 6 and 1 to 3 carbon atoms in which one or more hydrogen atoms are substituted by halogen groups, such as monochloromethyl, dichloroethyl, trichloropropyl, or the like.

As used herein, the term "$C_1$-$C_6$ haloalkoxy" refers to the straight or branched alkoxy having 1-6 carbon atoms in which one or more hydrogen atoms are substituted by halogen groups, such as monochloromethoxy, dichlorooxy, or the like.

As used herein, the term "$C_1$-$C_4$ carboxy" refers to the group having structure of $C_1$-$C_3$ alkyl-COOH in which the alkyl can be linear or branched, such as $CH_3COOH$, $C_2H_5COOH$, $C_3H_5COOH$, $(CH_3)_2CHCOOH$, or the like.

As used herein, the term "$C_6$-$C_{12}$ aryl" refers to the monocyclic or bicyclic aromatic hydrocarbon group having 6 to 12 carbon atoms in the ring moiety, such as phenyl, naphthyl, biphenyl, or the like.

As used herein, the term "aromatic ring" refers to the aromatic ring system. The number of carbons preceding the aromatic ring refers to the number of ring atoms, for example "$C_6$-$C_{12}$ aromatic ring" refers to a monocyclic or bicyclic aromatic ring having 6 to 12 carbon atoms in the ring moiety, typically $C_6$-$C_{12}$ aromatic ring is benzene ring or naphthalene ring.

As used herein, the term "heteroaryl" refers to the optionally substituted aromatic group, e.g., which is 5 to 7 membered monocyclic ring system having a ring containing at least one heteroatom and at least one carbon atom. The number of members preceding the heteroaryl refers to the number of ring atoms, for example, 5-12-membered heteroaryl group refers to the heteroaryl group having 5-12 ring atoms, including (but not limited to) pyrrolyl, thienyl, pyridyl, pyridazinyl, pyrimidinyl, pyrazinyl, furyl, imidazolyl, thiazolyl, oxazolyl, triazolyl, or the like.

As used herein, the term "halogen" refers to F, Cl, Br and I.

As used herein, the term "substituted" means that the hydrogen atom on the group is substituted by a non-hydrogen atom group, but the valence requirements must be met and a chemically stable compound is generated by the substitution. In the specification, it should be construed that all substituents are unsubstituted, unless expressly described as "substituted" herein.

As used herein,

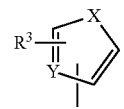

and

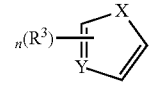

have the same meaning, and both represent an unsubstituted heteroaryl or a heteroaryl substituted with 1 to 5 (preferably 1 to 3) $R^3$ substituents.

As used herein, " " is the attachment site.

Also, it should be understood that in the present invention, substituents may be attached to the parent group or substrate at any atom, unless the attachment violates valence requirements; the hydrogen atom of the parent group or substrate may be on the same atom, or on different atoms.

As used herein, room temperature refers to 25±5° C.

As used herein, for a numerical range of P1 to P2, the range includes not only the endpoints P1 and P2, but also any numerical point between the endpoints P1 and P2. Furthermore, when both P1 and P2 are positive, for an integer n, its numerical range includes any integer value point between the endpoints P1 and P2. For example, for an integer n, when its numerical range is 1-10, it includes 1, 2, 3, 4, 5, 6, 7, 8, 9, and 10; the numerical range of 3-7 includes 3, 4, 5, 6 and 7. Typically, for groups, C3-C7 includes C3, C4, C5, C6, and C7.

Active Ingredient

As used herein. "compound of the present invention", "3-aryloxy-3-aryl-propylamine of the present invention", or "compound of formula I" are used interchangeably and refer to a compound having a structure of formula I, or a pharmaceutically acceptable salt thereof. It should be understood that the term also includes mixtures of the above components;

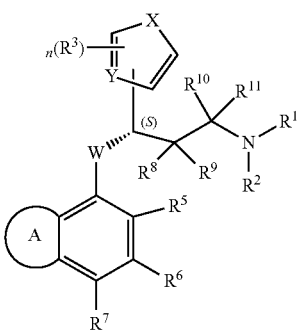

wherein:
ring A is a substituted or unsubstituted 4-12-membered carbocyclic ring, a substituted or unsubstituted 4-12-membered heterocyclic ring, a substituted or unsubstituted 5-12-membered heteroaromatic ring, or a substituted or unsubstituted $C_6$-$C_{12}$ aromatic ring;

$R^1$ and $R^2$ are each independently hydrogen, substituted or unsubstituted $C_1$-$C_{12}$ alkyl, substituted or unsubstituted $C_3$-$C_{12}$ cycloalkyl, substituted or unsubstituted 5-12 membered heteroaryl, or substituted or unsubstituted $C_6$-$C_{12}$ aryl;

X and Y are each independently carbon atom, oxygen atom, sulfur atom or nitrogen atom;

$R^3$ is hydrogen, halogen, substituted or unsubstituted $C_1$-$C_{12}$ alkyl, substituted or unsubstituted $C_3$-$C_{12}$ cycloalkyl, substituted or unsubstituted 5-12 membered heteroaryl, or substituted or unsubstituted $C_6$-$C_{12}$ aryl;

$R^5$, $R^6$, $R^7$, $R^8$, $R^9$, $R^{10}$ and $R^{11}$ are each independently hydrogen, substituted or unsubstituted $C_1$-$C_{12}$ alkyl, substituted or unsubstituted $C_3$-$C_{12}$ cycloalkyl, substituted or unsubstituted 5-12 membered heteroaryl, or substituted or unsubstituted $C_6$-$C_{12}$ aryl;

W is O or S:
n is 1, 2 or 3;

wherein, any one of the "substituted" means that 1-4 (preferably 1, 2, 3 or 4) hydrogen atoms on the group are each independently substituted by a substituent selected from the group consisting of $C_1$-$C_6$ alkyl, $C_3$-$C_7$ cycloalkyl, $C_1$-$C_{12}$ haloalkyl, halogen, nitro, cyano, amino, hydroxyl, =O, $C_1$-$C_4$ carboxyl, $C_2$-$C_4$ ester group, $C_2$-$C_4$ amide group, $C_1$-$C_6$ alkoxyl, $C_1$-$C_6$ haloalkoxy, benzyl, $C_6$-$C_{12}$ aryl, 5-10-membered heteroaryl;

wherein, the heterocyclic ring, heteroaromatic ring and heteroaryl each independently have 1-3 (preferably 1, 2 or 3) heteroatoms selected from N, O and S.

In another preferred embodiment, ring A, X, Y, W, n, $R^1$, $R^2$, $R^3$, $R^5$, $R^6$, $R^7$, $R^8$, $R^9$, $R^{10}$ and $R^{11}$ are each independently as described in the first aspect of the present invention.

The compound of the present invention not only has inhibitory effect on TRPA1, but also has a certain inhibitory effect on other members of the TRP family.

The term "pharmaceutically acceptable salt" refers to the salt suitable for use as a medicine formed by the compound of the present invention and an acid or a base. Pharmaceutically acceptable salts include inorganic salts and organic salts. A preferred class of salt is the salt formed by the compound of the present invention and an acid, and acids suitable for salt formation include (but are not limited to) hydrochloric acid, hydrobromic acid, hydrofluoric acid, sulfuric acid, nitric acid, phosphoric acid and other inorganic acids; formic acid, acetic acid, propionic acid, oxalic acid, malonic acid, succinic acid, fumaric acid, maleic acid, lactic acid, malic acid, tartaric acid, citric acid, picric acid, methanesulfonic acid, benzenemethanesulfonic acid, benzenesulfonic acid and other organic acids; and acidic amino acids such as aspartic acid and glutamic acid, etc. A preferred class of salt is the metal salt formed by the compound of the present invention and a base, suitable bases for salt formation include (but are not limited to) sodium hydroxide, potassium hydroxide, sodium carbonate, sodium bicarbonate, sodium phosphate and other inorganic bases; organic bases such as ammonia, triethylamine, diethylamine, etc.

The compound represented by formula I of the present invention can be converted into its pharmaceutically acceptable salt by conventional methods. For example, the corresponding acid solution can be added to the solution of the above compound, after the salt formation is complete, the corresponding salt of the compound of the present invention is obtained by removing the solvent under reduced pressure.

In another preferred embodiment, the compound of formula I is shown in Table I below:

TABLE 1

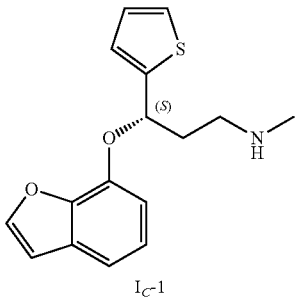

$I_{C}$-1

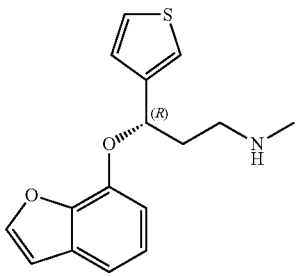

$I_{C}$-2

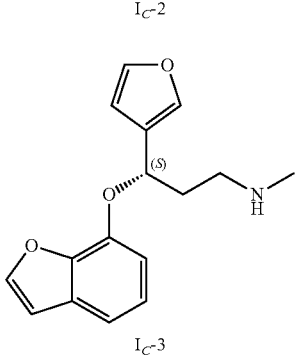

$I_{C}$-3

TABLE 1-continued

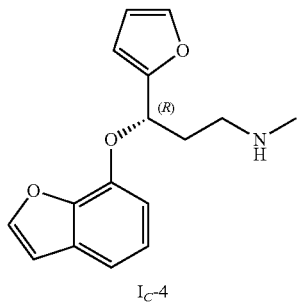

I$_C$-4

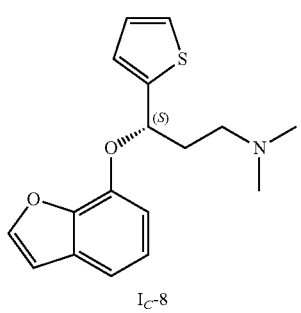

I$_C$-8

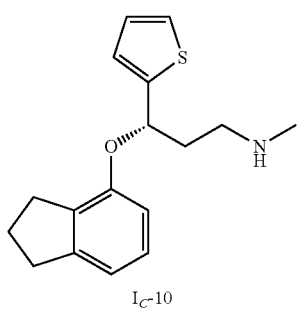

I$_C$-10

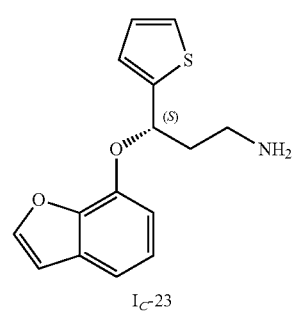

I$_C$-23

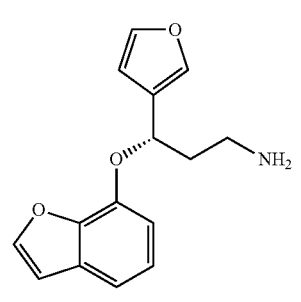

I$_C$-24

TABLE 1-continued

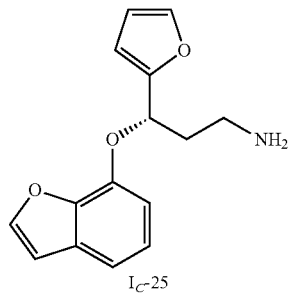

I$_C$-25

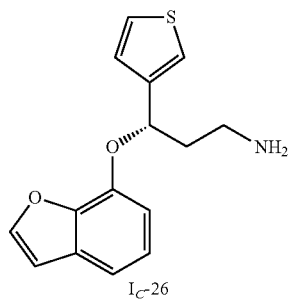

I$_C$-26

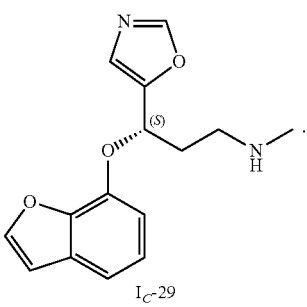

I$_C$-29

Preparation Method

The present invention provides a method for preparing a compound having the structure of formula I, or a pharmaceutically acceptable salt thereof, and the method comprises the step of:

(1) reacting the compound of formula a with the compound of formula b in the presence of the first catalyst and the first basic reagent in the first solvent to obtain the compound of formula I;

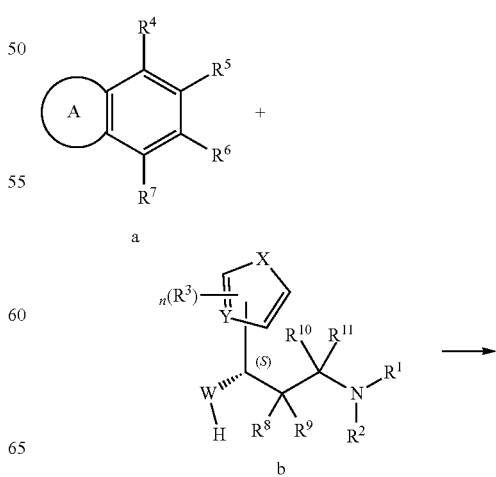

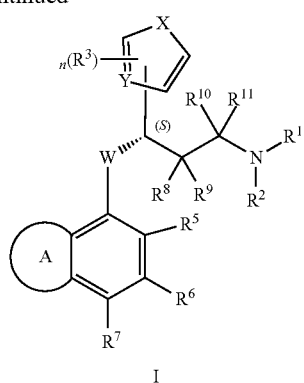

I wherein, each reaction parameter (e.g., the first solvent, the first catalyst and the first basic reagent) in the step (1) is as described in the first aspect of the present invention.

Preferably, the present invention provides a method for preparing a compound of formula Ic-1, and the method comprises the steps of:

(1) reacting the compound of formula i with the compound of formula ii in the presence of the first catalyst and the first basic reagent in the first solvent to obtain the compound of formula Ic-8;

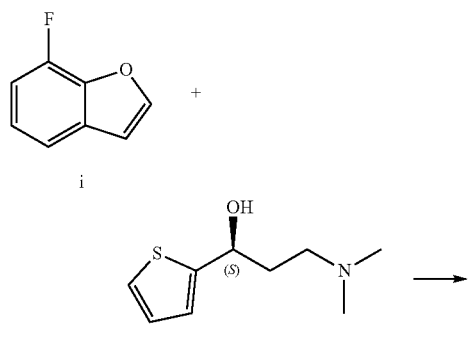

i ii

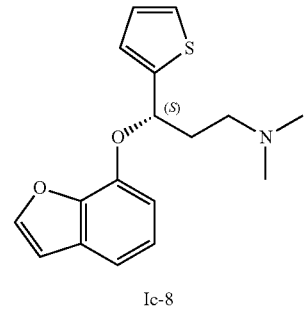

Ic-8

(2) reacting the compound of formula Ic-8 with phenyl chloroformate in the presence of the second basic reagent in the second solvent to obtain the compound of formula iii;

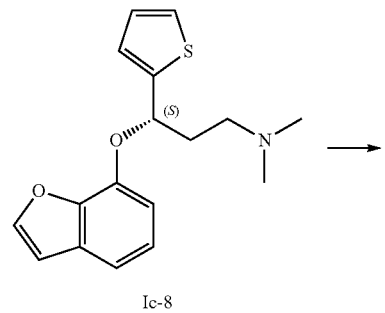

Ic-8

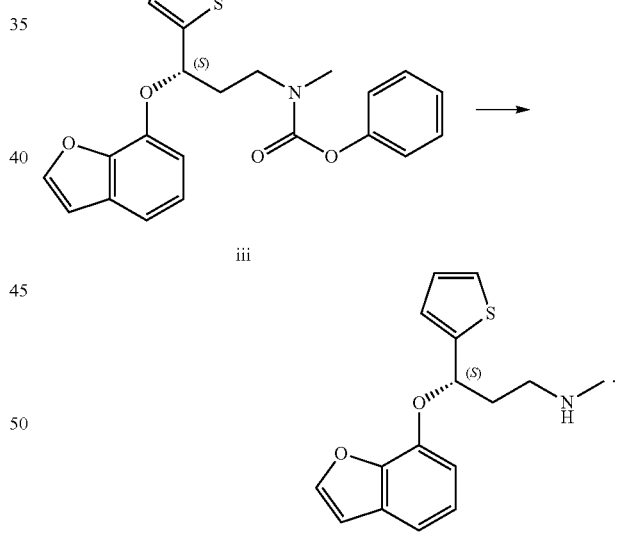

iii (3) subjecting the compound of formula iii to the hydrolysis reaction in the presence of the third basic reagent in the third solvent to obtain the compound of formula Ic-1;

iii

Ic-1 wherein, each reaction parameter (e.g., the first solvent, the first catalyst and the first basic reagent) in the step (1) is as described in the second aspect of the present invention.

Crystal Form

The present invention provides crystal forms of the salt of the compound of formula Ic-1.

As used herein, the terms "crystal form A of the hydrochloride salt of the compound Ic-1", "crystal form A of the hydrochloride salt" and "form A" are used interchangeably.

As used herein, the terms "crystal form B of the maleate salt of the compound Ic-1", "crystal form B of the maleate salt" and "form B" are used interchangeably.

As used herein, the terms "crystal form C of the oxalate salt of the compound Ic-1", "crystal form C of the oxalate salt" and "form C" are used interchangeably.

As used herein, the terms "crystal form D of the mucate salt of the compound Ic-1", "crystal form D of the mucate salt" and "form D" are used interchangeably.

As used herein, the terms "crystal form E of the fumarate salt of the compound Ic-1", "crystal form E of the fumarate salt" and "form E" are used interchangeably.

As used herein, the terms "crystal form F of the D-glucuronate salt of the compound Ic-1", "crystal form F of the D-glucuronate salt" and "form F" are used interchangeably.

Figure 8:
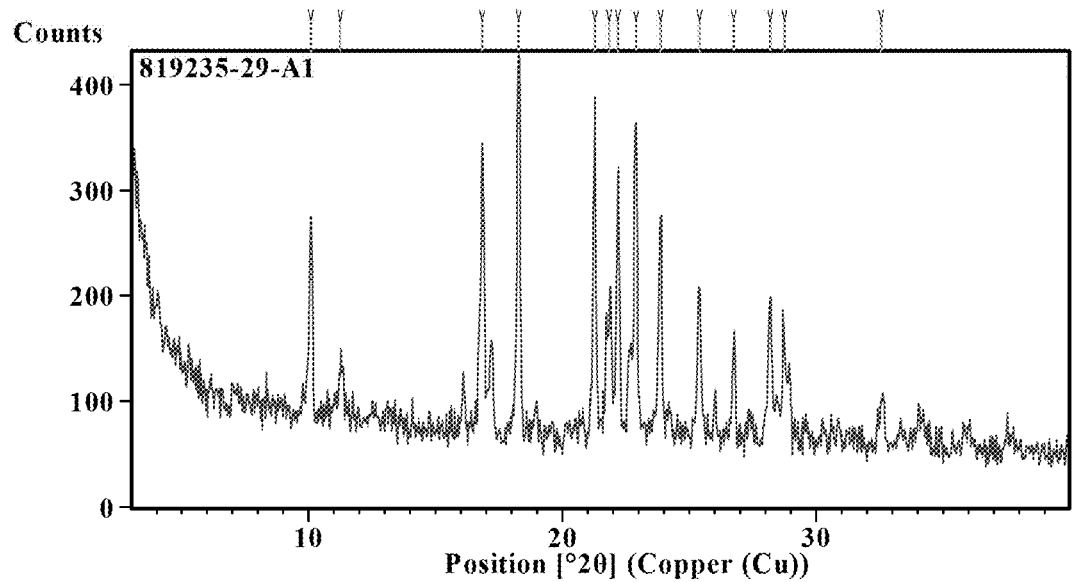
FIG. 8 is an XRPD pattern of the crystal form A of hydrochloride salt of the compound of formula Ic-1.

Typically, the present invention provides a crystal form A of the hydrochloride salt of the compound Ic-1, the crystal form A of the hydrochloride salt has characteristic peaks at one or more 2θ values selected from the group consisting of 10.09±0.2°, 11.25±0.2°, 16.85±0.2°, 18.27±0.2°, 21.27±0.2°, 21.84±0.2°, 22.20±0.2°, 22.89±0.2°, 23.86±0.2°, 25.40±0.2°, 26.76±0.2°, 28.18±0.2°, 28.75±0.2°, and 32.57±0.2°, In another preferred embodiment, the crystal form A of the hydrochloride salt has characteristic peaks of X-ray powder diffraction substantially as shown in FIG. 8.

In another preferred embodiment, the differential scanning calorimetry (DSC) pattern of the crystal form A of the hydrochloride salt begins to appear endothermic peak upon being heated to 141.8±5° C. (preferably ±4° C., ±3° C., ±2° C., or ±1° C.).

Figure 9:
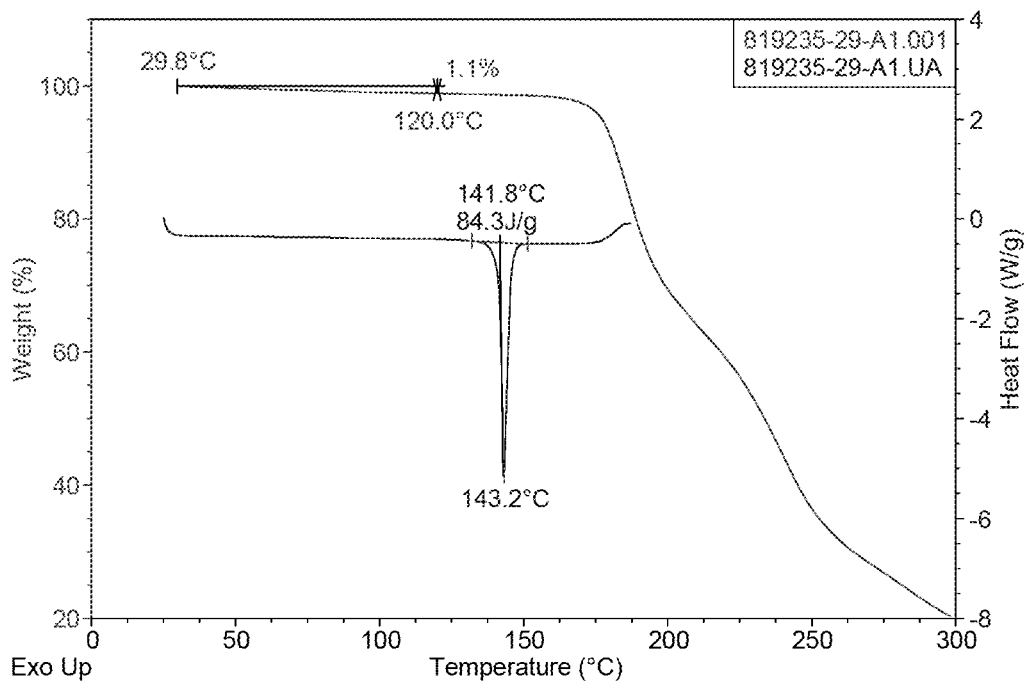
FIG. 9 is TGA/DSC patterns of the crystal form A of hydrochloride salt of the compound of formula Ic-1.

In another preferred embodiment, the differential scanning calorimetry (DSC) pattern of the crystal form A of the hydrochloride salt is substantially as shown in FIG. 9.

In another preferred embodiment, the thermogravimetric analysis (TGA) pattern of the crystal form A of the hydrochloride salt has a weight loss of about 1.1±0.5% (preferably ±0.4%, ±0.3%, 0.2%, or 0.1%) upon being heated to 120° C.

In another preferred embodiment, the thermogravimetric analysis (TGA) pattern of the crystal form A of the hydrochloride salt is substantially as shown in FIG. 9.

Typically, the present invention provides a crystal form B of the maleate salt of the compound Ic-1, the crystal form B of the maleate salt has characteristic peaks at one or more 2θ values selected from the group consisting of 9.70±0.2°, 11.83±0.2°, 15.22±0.2°, 16.30±0.2°, 18.23±0.2°, 18.82±0.2°, 19.23±0.2°, 19.56±0.2°. 21.15±0.2°. 21.83±0.2°, 23.60±0.2°, 24.04±0.2°, 24.70±0.2°, 24.93±0.2°, 26.35±0.2°, 28.15±0.2°, 28.94±0.2°, 32.59±0.2°, 33.31±0.2°, 34.74±0.2°, 35.94±0.2°, and 38.18±0.2°.

The structure of maleic acid is as follows,

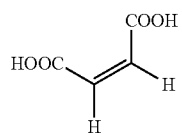

maleic acid.

Figure 11:
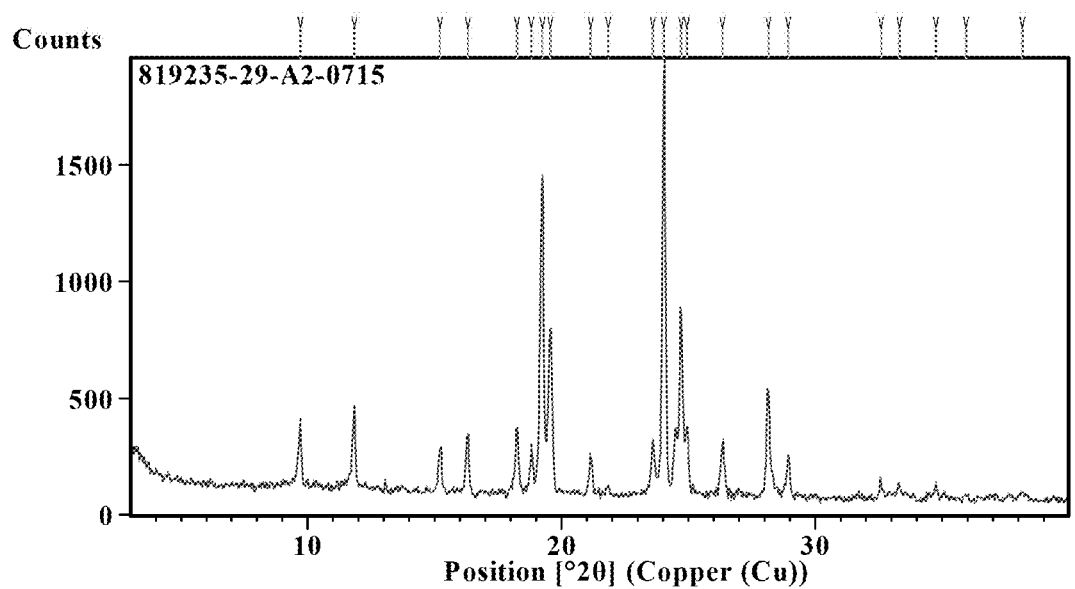
FIG. 11 is an XRPD pattern of the crystal form B of maleate salt of the compound of formula Ic-1.

In another preferred embodiment, the crystal form B of the maleate salt has characteristic peaks of X-ray powder diffraction substantially as shown in FIG. 11.

In another preferred embodiment, the differential scanning calorimetry (DSC) pattern of the crystal form B of the maleate salt begins to appear endothermic peak upon being heated to 105.8±5° C. (preferably ±4° C., ±3° C., ±2° C. or ±1° C.).

Figure 12:
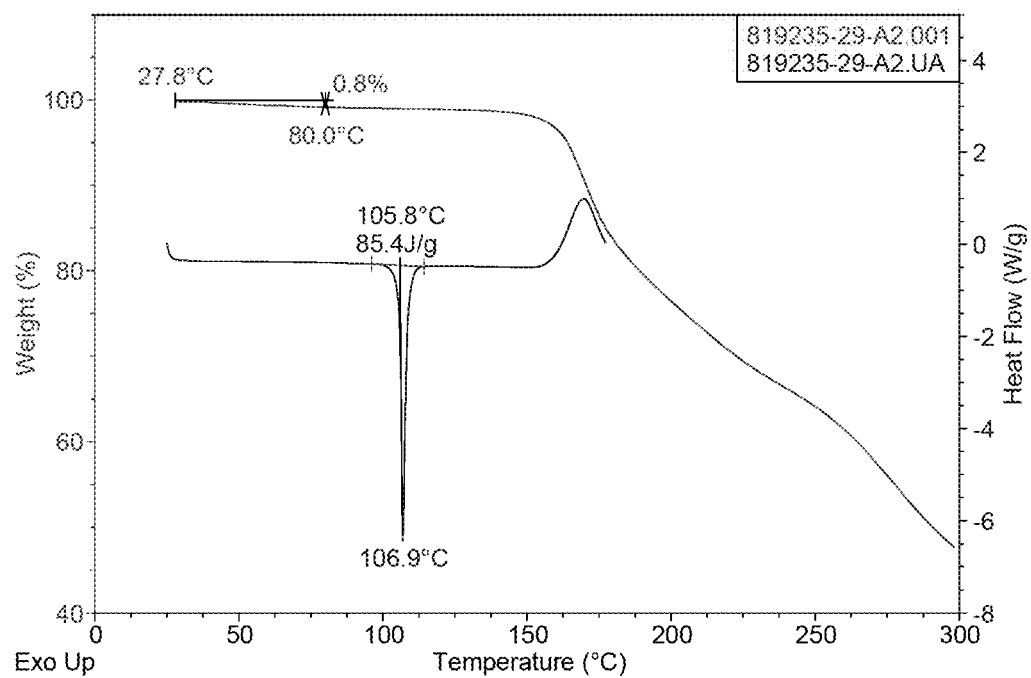
FIG. 12 is TGA/DSC patterns of the crystal form B of maleate salt of the compound of formula Ic-1.

In another preferred embodiment, the differential scanning calorimetry (DSC) pattern of the crystal form B of the maleate salt is substantially as shown in FIG. 12.

In another preferred embodiment, the thermogravimetric analysis (TGA) pattern of the crystal form B of the maleate salt has a weight loss of about 0.8±0.5% (preferably ±0.4%, ±0.3%, 0.2%, or 0.1%) upon being heated to 80° C.

In another preferred embodiment, the thermogravimetric analysis (TGA) pattern of the crystal form B of the maleate salt is substantially as shown in FIG. 12.

Typically, the present invention provides a crystal form C of the oxalate salt of the compound Ic-1, the crystal form C of the oxalate salt has characteristic peaks at one or more 2θ values selected from the group consisting of 14.64±0.2°, 15.27±0.2°, 16.07±0.2°, 16.36±0.2°, 17.63±0.2°, 19.52±0.2°, 20.90±0.2°, 22.05±0.2°, 23.43±0.2°, and 25.61±0.2°.

Oxalic acid, also known as ethanedioic acid has the following structure,

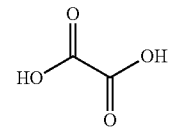

oxalic acid.

Figure 15:
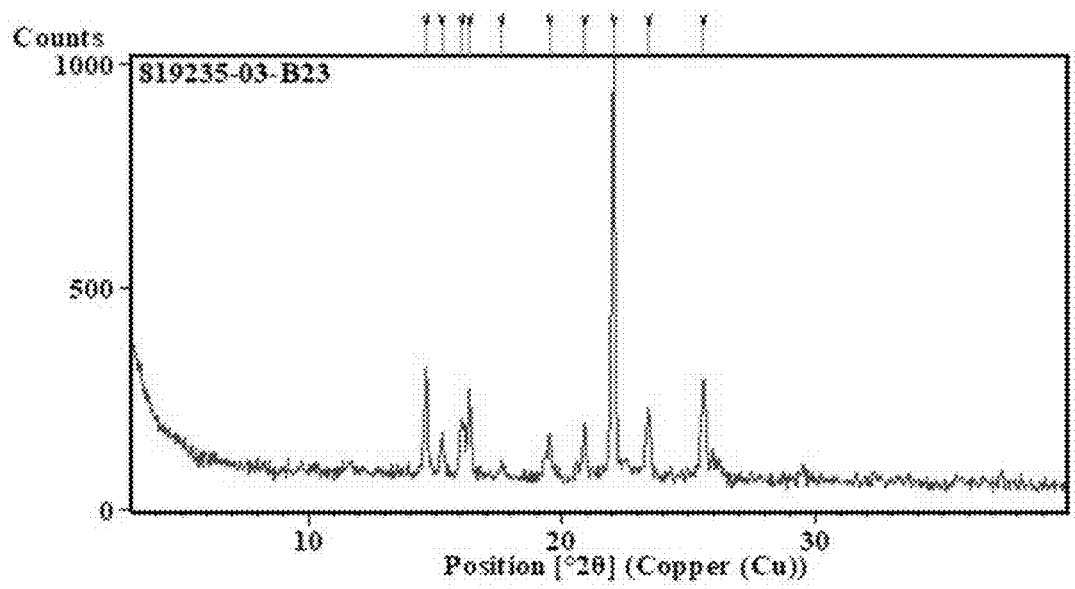
FIG. 15 is an XRPD pattern of the crystal form C of the oxalate salt of the compound of formula Ic-1.

In another preferred embodiment, the crystal form C of the oxalate salt has characteristic peaks of X-ray powder diffraction substantially as shown in FIG. 15.

In another preferred embodiment, the differential scanning calorimetry (DSC) pattern of the crystal form C of the oxalate salt begins to appear endothermic peak upon being heated to 152.2±5° C. (preferably ±4° C., ±3° C., ±2° C., or ±1° C.).

Figure 16:
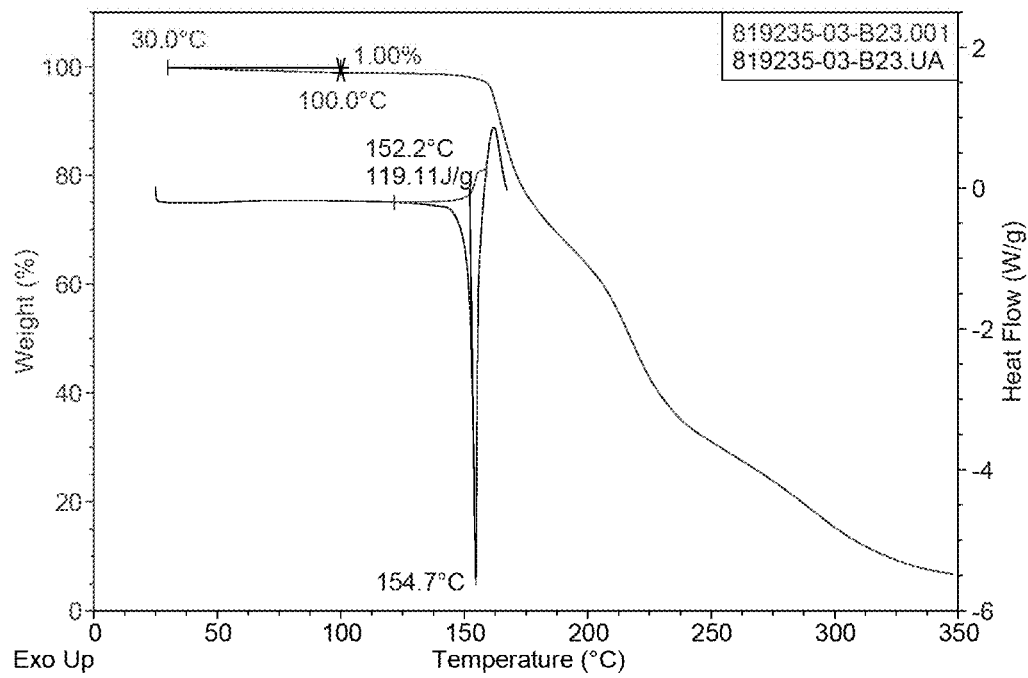
FIG. 16 is TGA/DSC patterns of the crystal form C of the oxalate salt of the compound of formula Ic-1.

In another preferred embodiment, the differential scanning calorimetry (DSC) pattern of the crystal form C of the oxalate salt is substantially as shown in FIG. 16.

In another preferred embodiment, the thermogravimetric analysis (TGA) pattern of the crystal form C of the oxalate salt has a weight loss of about 1.0±0.5% (preferably ±0.4%, ±0.3%, 0.2% or 0.1%) upon being heated to 100° C.

In another preferred embodiment, the thermogravimetric analysis (TGA) pattern of the crystal form C of the oxalate salt is substantially as shown in FIG. 16.

Typically, the present invention provides a crystal form D of the mucate salt of the compound Ic-1, in another preferred embodiment, the crystal form D of the mucate salt has characteristic peaks at one or more 2θ values selected from the group consisting of 3.79±0.2°, 11.28±0.2°, 14.21±0.2°, 15.81±0.2°, 16.97±0.2°, 17.71±0.2°, 19.48±0.2°, 20.98±0.2°, 23.91±0.2°, 25.88±0.2°, 27.16±0.2°, 28.40±0.2°. 29.49±0.2°. 30.74±0.2°, 32.33±0.2°, 34.50±0.2°, 35.42±0.2°, and 36.16±0.2°.

The structure of mucic acid is as follows,

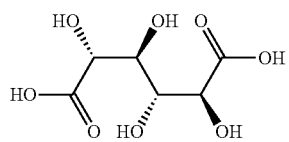

mucic acid.

Figure 18:
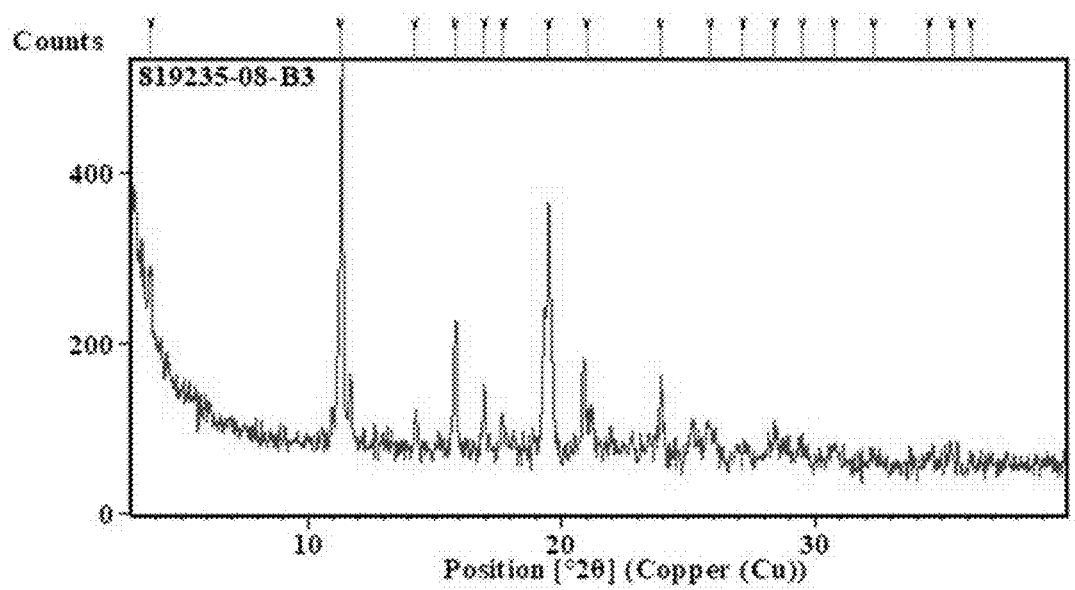
FIG. 18 is an XRPD pattern of the crystal form D of the mucate salt of the compound of formula Ic-1.

In another preferred embodiment, the crystal form D of the mucate salt has X-ray powder diffraction characteristic peaks substantially as shown in FIG. 18.

In another preferred embodiment, the differential scanning calorimetry (DSC) pattern of the crystal form D of the mucate salt begins to appear endothermic peak upon being heated to 140.9±5° C. (preferably ±4° C., ±3° C., ±2° C. or ±1° C.).

Figure 19:
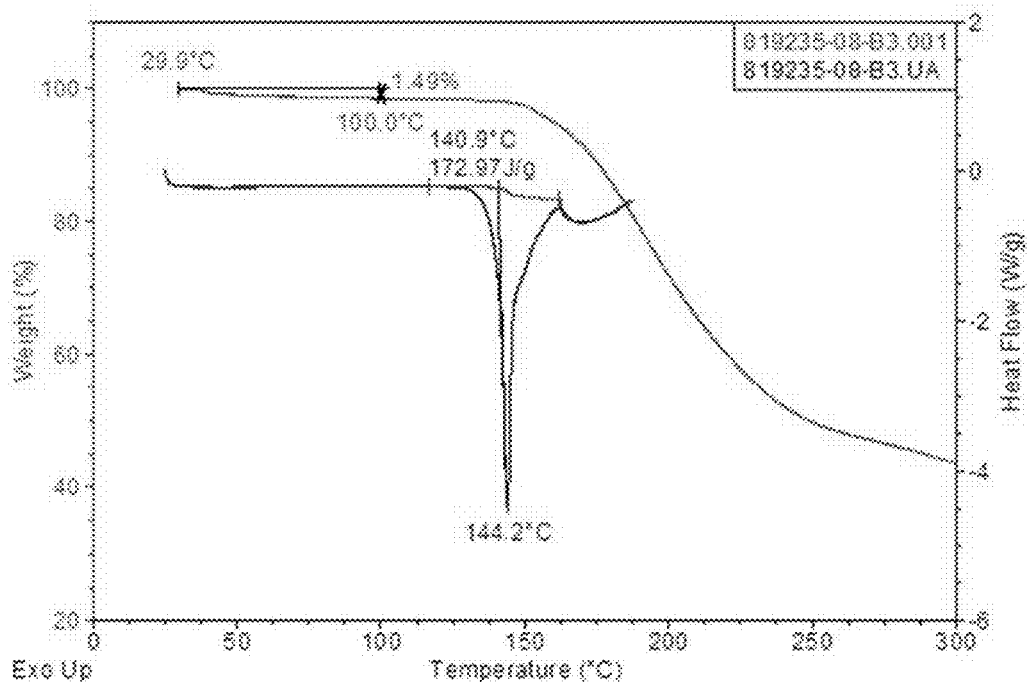
FIG. 19 is TGA/DSC patterns of the crystal form D of the mucate salt of the compound of formula Ic-1.

In another preferred embodiment, the differential scanning calorimetry (DSC) pattern of the crystal form D of the mucate salt is substantially as shown in FIG. 19.

In another preferred embodiment, the thermogravimetric analysis (TGA) pattern of the crystal form D of the mucate salt has a weight loss of about 1.45±0.5% (preferably ±0.4%, ±0.3%, 0.2% or 0.1%) upon being heated to 100° C.

In another preferred embodiment, the thermogravimetric analysis (TGA) pattern of the crystal form D of the mucate salt is substantially as shown in FIG. 19.

Typically, the present invention provides a crystal form E of the fumarate salt of the compound Ic-1, the crystal form E of the fumarate salt has characteristic peaks at one or more 2θ values selected from the group consisting of 4.7±0.2°, 9.41±0.2°, 13.34±0.2°, 14.17±0.2°, 15.63±0.2°, 17.62, 18.95±0.2°, 22.75±0.2°, 23.76±0.2°, 25.66±0.2°, 26.93±0.2°, 28.69±0.2°, and 31.34±0.2°.

The structure of fumaric acid is as follows,

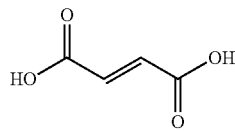

fumaric acid.

Figure 21:
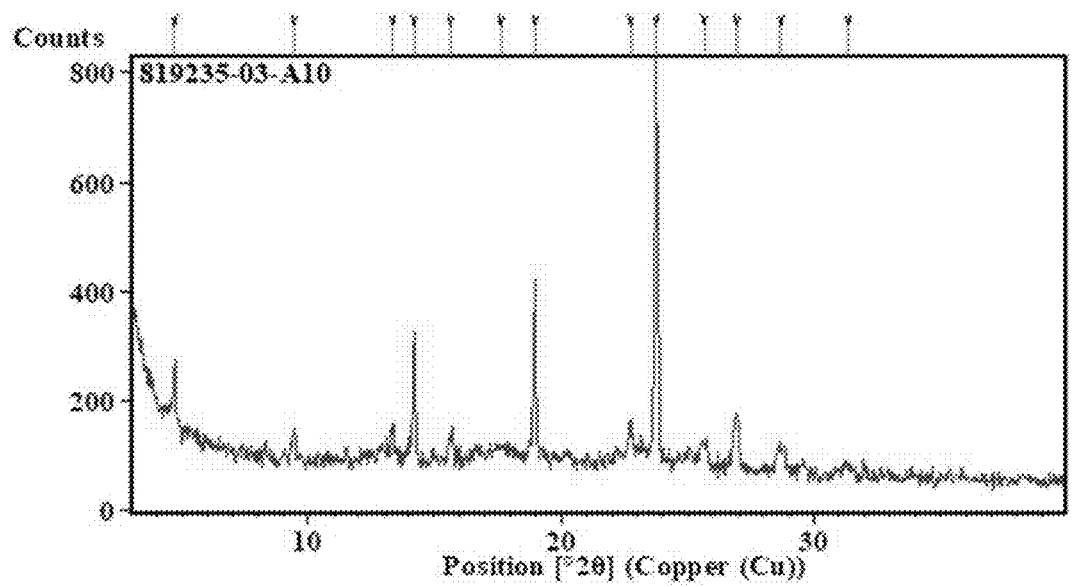
FIG. 21 is an XRPD pattern of the crystal form E of the fumarate salt of the compound of formula Ic-1.

In another preferred embodiment, the crystal form E of the fumarate salt has characteristic peaks of X-ray powder diffraction substantially as shown in FIG. 21.

In another preferred embodiment, the differential scanning calorimetry (DSC) pattern of the crystal form E of the fumarate salt begins to appear endothermic peak upon being heated to 76.5±5° C. (preferably ±4° C., ±3° C., ±2° C. or ±1° C.).

Figure 22:
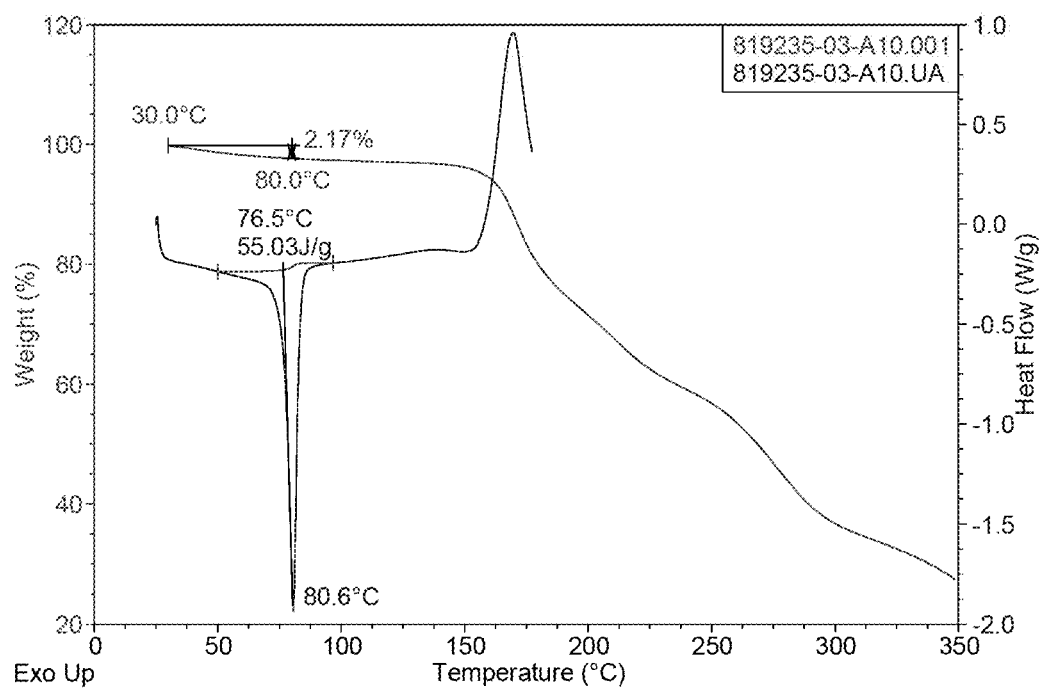
FIG. 22 is TGA/DSC patterns of the crystal form E of the fumarate salt of the compound of formula Ic-1.

In another preferred embodiment, the differential scanning calorimetry (DSC) pattern of the crystal form E of the fumarate salt is substantially as shown in FIG. 22.

In another preferred embodiment, the thermogravimetric analysis (TGA) pattern of the crystal form E of the fumarate salt has a weight loss of about 2.17±0.5% (preferably ±0.4%, ±0.3%, 0.2% or 0.1%) upon being heated to 80° C.

In another preferred embodiment, the thermogravimetric analysis (TGA) pattern of the crystal form E of the fumarate salt is substantially as shown in FIG. 22.

Typically, the present invention provides a crystal form F of the D-glucuronate salt of the compound Ic-1, the crystal form F of the D-glucuronate salt also has characteristic peaks at one or more 2θ values selected from the group consisting of 4.77±0.2°, 8.34±0.2°, 10.87±0.2°, 16.13±0.2°, 17.54±0.2°, 19.53±0.2°, 20.06±0.2°, 21.25±0.2°, 23.42±0.2°, and 25.93±0.2°.

The formula of D-glucuronic acid is as follows,

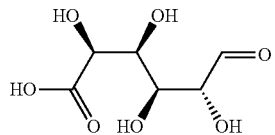

D-glucuronic acid.

Figure 24:
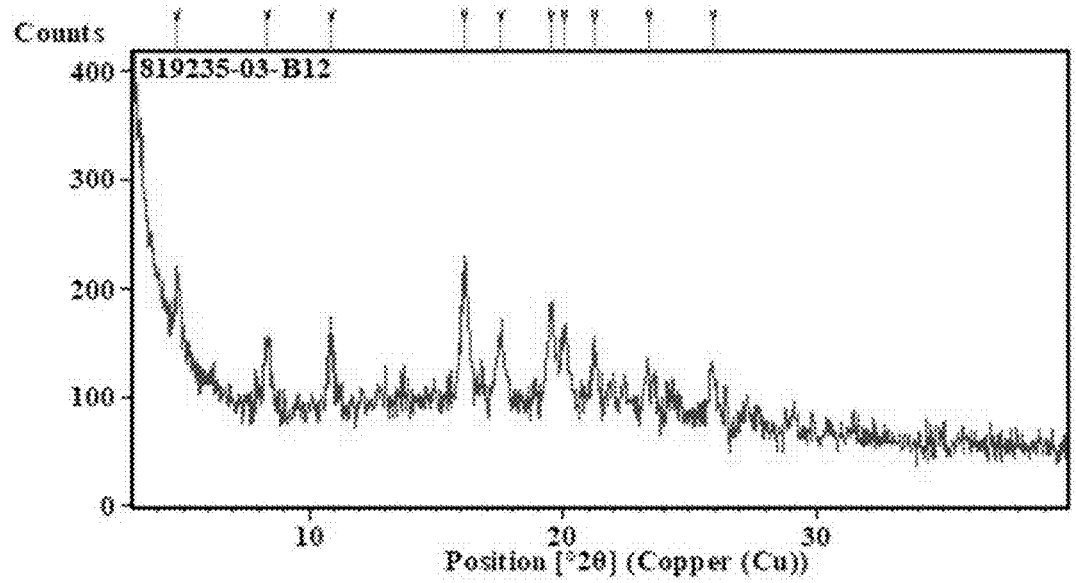
FIG. 24 is an XRPD pattern of the crystal form F of the D-glucuronate salt of the compound of formula Ic-1.

In another preferred embodiment, the crystal form F of the D-glucuronate salt has characteristic peaks of X-ray powder diffraction substantially as shown in FIG. 24.

In another preferred embodiment, the differential scanning calorimetry (DSC) pattern of the crystal form F of the D-glucuronate salt begins to appear endothermic peak upon being heated to 119.1±5° C. (preferably ±4° C., ±3° C., ±2° C. or ±1° C.).

Figure 25:
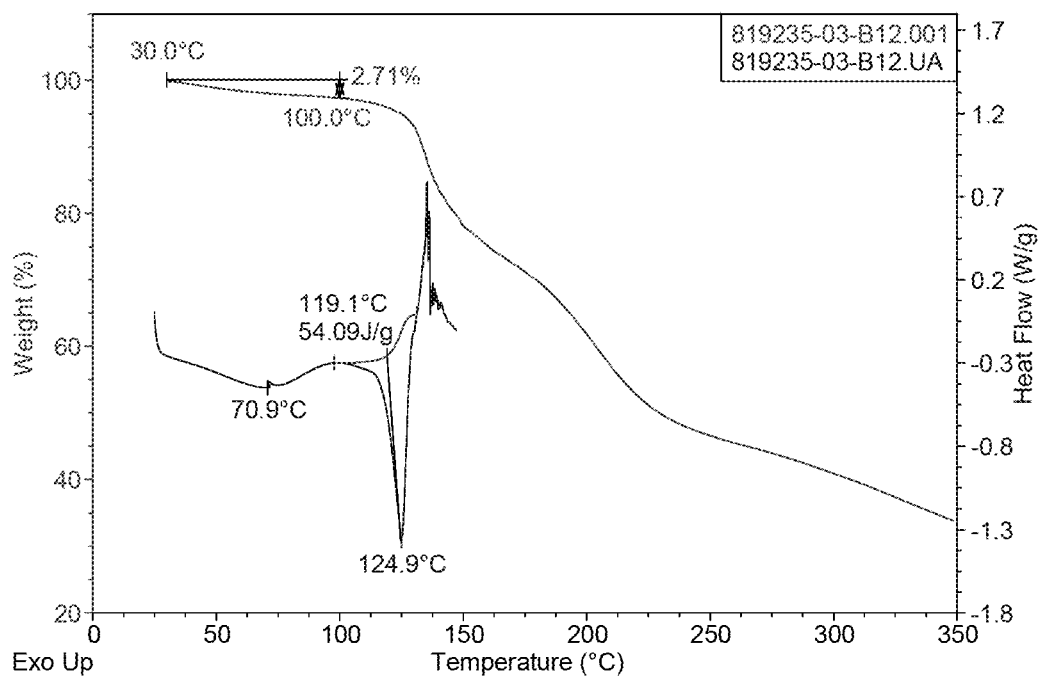
FIG. 25 is TGA/DSC patterns of the crystal form F of the D-glucuronate salt of the compound of formula Ic-1.

In another preferred embodiment, the differential scanning calorimetry (DSC) pattern of the crystal form F of the D-glucuronate salt is substantially as shown in FIG. 25.

In another preferred embodiment, the thermogravimetric analysis (TGA) pattern of the crystal form F of the D-glucuronate salt has a weight loss of about 2.71±0.5% (preferably ±0.4%, ±0.3%, 0.2% or 0.1%) upon being heated to 100° C.

In another preferred embodiment, the thermogravimetric analysis (TGA) pattern of the crystal form F of the D-glucuronate salt is substantially as shown in FIG. 25.

Transient Receptor Potential Channel Protein (TRP)

Transient receptor potential channel proteins are a protein superfamily consisted of important cation channels existing on the cell membrane. Transient receptor potential channel proteins include several subgroups, such as TRPA, TRPC, TRPM, TRPV, TRPML and TRPP subgroups.

Studies have found that TRPA1 channel protein is related to diseases such as pain, epilepsy, inflammation, respiratory disorder, pruritus, urinary tract disorder, inflammatory bowel disease and other diseases. TRPA1 is the target for treating pain, epilepsy, inflammation, respiratory disorder, pruritus, urinary tract disorder, inflammatory bowel disease and other diseases.

In one preferred embodiment of the present invention, the transient receptor potential channel protein (TRP) is TRPA1.

In another preferred embodiment, the disease related to transient receptor potential channel protein (TRP) includes (but is not limited to) pain, epilepsy, inflammation, respiratory disorder, pruritus, urinary tract disorder, inflammatory bowel disease, and combinations thereof.

Typically, the disease related to transient receptor potential channel protein (TRP) is pain.

In another preferred embodiment, the pain is acute pain or chronic pain.

In another preferred embodiment, the pain includes (but is not limited to) acute inflammatory pain, chronic inflammatory pain, visceral pain, neurogenic pain, fibromyalgia, headache, neuralgia, pain caused by cancer, and a combination thereof.

In another preferred embodiment, the pain is inflammatory pain.

In another preferred embodiment, the inflammatory pain is acute inflammatory pain or chronic inflammatory pain.

In another preferred embodiment, the headache is migraine or muscular tension pain.

In another preferred embodiment, the neuralgia is trigeminal neuralgia, diabetic pain or postherpetic neuralgia.

In another preferred embodiment, the pain includes (but is not limited to) acute pain, fibromyalgia, visceral pain, inflammatory pain, neuralgia, and a combination thereof.

In another preferred embodiment, the pain is fibromyalgia.

Use

The invention also provides a method for inhibiting transient receptor potential channel protein (TPR) and a method for treating diseases related to transient receptor potential channel protein.

The compound of Formula I or a pharmaceutically acceptable salt thereof, and the crystal form A of the hydrochloride salt, the crystal form B of the maleate salt, the crystal form C of the oxalate salt, the crystal form D of the mucate salt, the crystal form E of the fumarate salt, and the crystal form F of the D-glucuronate salt of the compound of Formula I of the present invention can be used to inhibit the transient receptor potential channel protein, thereby preventing or treating diseases related to the transient receptor potential channel protein.

In the present invention, examples of diseases related to transient receptor potential channel protein include (but are not limited to) pain, epilepsy, inflammation, respiratory disorder, pruritus, urinary tract disorder, inflammatory bowel disease. Typically, the pain includes (but is not limited to) acute inflammatory pain, chronic inflammatory pain, visceral pain, neurogenic pain, fibromyalgia, headache (such as migraine, muscular tension pain, etc.), neuralgia (such as trigeminal neuralgia, diabetic pain, postherpetic neuralgia, etc.), or pain caused by cancer.

In a preferred embodiment, the present invention provides a non-therapeutic in vitro method for inhibiting transient receptor potential channel protein activity, includes, for example in a culture system in vitro, contacting the transient receptor potential channel proteins or the cells expressing the protein with the compound of Formula I or a pharmaceutically acceptable salt thereof, or the crystal form A of the hydrochloride salt, the crystal form B of the maleate salt, the crystal form C of the oxalate salt, the crystal form D of the mucate salt, the crystal form E of the fumarate salt, or the crystal form F of the D-glucuronate salt of the compound of Formula I of the present invention, thereby inhibiting the activity of the transient receptor potential channel protein.

The invention also provides a method for inhibiting transient receptor potential channel protein, which may be therapeutic or non-therapeutic. Generally, the method comprises the steps of administering the compound of Formula I or a pharmaceutically acceptable salt thereof, or the crystal form A of the hydrochloride salt, the crystal form B of maleate salt, the crystal form C of the oxalate salt, the crystal form D of the mucate salt, the crystal form E of the fumarate salt, or the crystal form F of the D-glucuronate salt of the compound of Formula I of the present invention to a subject in need thereof.

Preferably, the subject includes humans and non-human mammals (rodents, rabbits, monkeys, livestock, dogs, cats, etc.).

Compositions and Methods of Administration

The invention provides a composition for inhibiting the activity of transient receptor potential channel protein.

The composition includes (but is not limited to) pharmaceutical composition, food composition, dietary supplement, or beverage composition, etc.

Typically, the composition is a pharmaceutical composition comprising the compound of Formula I as described in the present invention, or a pharmaceutically acceptable salt thereof; and pharmaceutically acceptable carriers.

Typically, the composition is a pharmaceutical composition comprising the compound of Formula I as described in the present invention, the crystal form A of the hydrochloride salt, the crystal form B of the maleate salt, the crystal form C of the oxalate salt, the crystal form D of the mucate salt, the crystal form E of the fumarate salt, or the crystal form F of the D-glucuronate salt of the compound of Formula I; and pharmaceutically acceptable carriers.

In the present invention, the dosage forms of pharmaceutical compositions include (but are not limited to) oral preparations, injections, or external preparations.

Typically, the dosage forms include (but are not limited to) tablets, injections, infusions, ointments, gels, solutions, microspheres and films.

The term "pharmaceutically acceptable carrier" means one or more compatible fillers in solid, semi-solid, liquid or gel form, which is suitable for human or animal use and has sufficient purity and low enough toxicity. The "compatible" means the each component in a pharmaceutical composition and the active ingredient of the drug can mixed with each other without significantly reducing the efficacy.

It should be understood that in the present invention the carrier is not particularly limited, which can be selected from materials commonly used in the art, or prepared by conventional methods, or be commercially available. Some examples of pharmaceutically acceptable carriers include cellulose and its derivatives (such as methyl cellulose, ethyl cellulose, hydroxypropyl methyl cellulose, sodium carboxymethyl cellulose, etc.), gelatin, talc, and solid lubricants (such as stearic acid, magnesium stearate), calcium sulfate, vegetable oils (such as soybean oil, sesame oil, peanut oil, olive oil, etc.), polyols (such as propylene glycol, glycerin, mannitol, sorbitol, etc.), emulsifiers (such as Tween), wetting agents (such as sodium lauryl sulfate), buffering agents, chelating agents, thickening agents, pH adjusters, penetration enhancers, coloring agents, flavoring agents, stabilizers, antioxidants, preservatives, bacteriostatic agents, pyrogen-free water, etc.

Typically, in addition to the active pharmaceutical ingredients, the liquid dosage form may contain inert diluents conventionally used in the art, such as water or other solvents, solubilizers and emulsifiers such as ethanol, isopropanol, ethyl carbonate, ethyl acetate, propylene glycol, 1,3-butanediol, dimethylformamide; oils, especially cottonseed oil, peanut oil, corn germ oil, olive oil, castor oil and sesame oil, or mixtures thereof. In addition to these inert diluents, the composition may also contain auxiliaries such as wetting agents, emulsifiers, suspending agents, and the like.

Pharmaceutical preparations should match the mode of administration. The medicament of the present invention may also be used with other synergistic therapeutic agents (including use before, during or after). When a pharmaceutical composition or formulation is used, a safe and effective amount of the drug is administered to the subject in need (e.g., a human or non-human mammal), the safe and effective amount is usually at least about 10 µg/kg of body weight, and no more than about 8 mg/kg of body weight in most cases, preferably the dose is about 10 µg/kg of body weight to about 1 mg/kg body weight. Of course, the specific dosage should also take into account the route of administration, the patient's health and other factors, which are all within the skill range of the skilled physician.

The Main Advantages of the Present Invention Include:

(1) The present invention provides a class of compounds of formula I with novel structure and excellent TRP channel inhibitory activity. The compound of the present invention has excellent in vivo efficacy such as analgesia, less toxicity, higher activity, large safety window, good druggability and excellent pharmacokinetic properties.

(2) The present invention also provides a preparation method of the compound of formula I and the compound of formula I-a. The method is simple and easy to operate, has high yield and high purity, and is suitable for industrial production.

(3) The present invention also provides a crystal form of a salt of the compound of formula Ic-1, such as the crystal form A of the hydrochloride salt, the crystal form B of the maleate salt, the crystal form C of the oxalate salt, the crystal form D of the mucate salt, the crystal form E of the fumarate salt, and the crystal form F of the D-glucuronate salt of the compound of Formula Ic-1. The crystal form of the salt of the compound of formula Ic-1 is a solid form, and compared with the free oily phase of the compound of formula Ic-1, the crystal form of the salt of the compound Ic-1 in solid form is convenient for storage, transportation, and has good druggability, and has high solubility and high stability (especially excellent thermal stability and high humidity stability).

The present invention will be further explained below in combination with specific examples. It should be understood that these examples are only used to illustrate the present invention and not to limit the scope of the present invention. In the following examples, the test methods without specific conditions are usually in accordance with conventional conditions or the conditions recommended by the manufacturer. Unless otherwise specified, percentages and parts are calculated by weight.

Example 1

Preparation of Compound of Formula Ic-1

(1) Preparation of (S)-3-(benzofuran-7-yloxy)-N,N-dimethyl-3-(thiophen-2-yl)propan-1-amine (Ic-8)

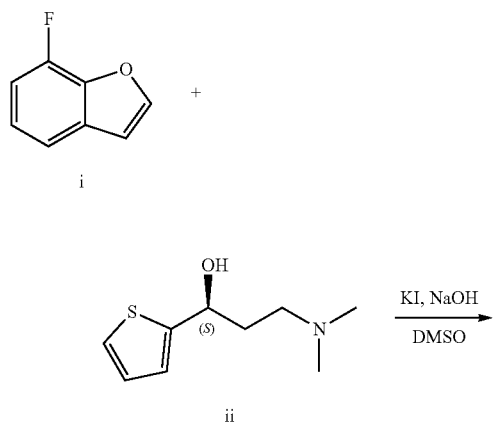

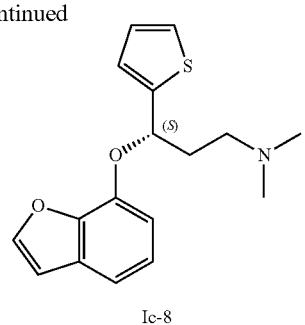

Ic-8

1 kg (7.35 mol) of 7-fluorobenzofuran (compound of formula i) was dissolved in 8 L of dimethyl sulfoxide solution at room temperature, 2.04 kg (11.02 mol) of (S)-3-(dimethylamino)-1-(thiophen-2-yl)propan-1-ol (compound of formula ii) and 0.18 kg (1.10 mol) of potassium iodide were added under stirring conditions, nitrogen was introduced into the reaction flask for protection, and the temperature was cooled to 10-20° C. in an ice-water bath. 1.47 kg (36.13 mol) of sodium hydroxide was added to the system, the reaction system was heated to 50-60° C. after the addition of materials and reacted at this temperature for 22 hours. After HPLC showed that the reaction was completed, an ice-water bath was used to cool down to 25-30° C., 5 L of water was slowly added to the system, the temperature of the system was controlled to be lower than 45° C. 5 L of ethyl acetate was added for extraction, then the aqueous layer was washed with 2 L of ethyl acetate, the organic layers were combined and washed with saturated aqueous solution of sodium chloride. 5 L of water was added to the organic layer, 0.66 kg of oxalic acid was slowly added under stirring conditions. The reaction mixture was continued to be stirred for 40 minutes and allowed to stand for stratification for 10 minutes. 1.70 kg of 10% oxalic acid aqueous solution was added again to the organic layer, the mixture was stirred for 10 minutes, and stratified. The aqueous phases were combined, 5 L of ethyl acetate was added to the aqueous phase, saturated aqueous sodium bicarbonate solution was added to the system under stirring, the pH was adjusted to 8, and the mixture was stirred for 20 minutes. The mixture was filtered, the filter cake was washed with ethyl acetate, the filtrate was separated, the organic phase was collected, the aqueous phase was washed with ethyl acetate, the organic phases were combined, dried over anhydrous sodium sulfate, and concentrated to obtain 1.12 kg of the target compound of formula Ic-8 as a brown oil with a yield of 50.6% and a purity of 95.6%.

$^1$H NMR (400 MHz, CDCl$_3$) δ 7.62 (d, J=2.0 Hz, 1H), 7.23 (d, J=5.0 Hz, 1H), 7.17 (d, J=7.8 Hz, 1H), 7.03 (t, J=7.9 Hz, 2H), 6.96-6.87 (m, 1H), 6.82 (d. J=7.9 Hz, 1H), 6.74 (d. J=2.1 Hz, 1H), 5.88-5.79 (m, 1H), 2.60 (t, J=6.9 Hz, 2H), 2.47 (dt, J=21.7, 7.4 Hz, 1H), 2.32 (s, 6H), 2.22 (dt, J=20.5, 6.8 Hz, 1H). MS (ESI, m/z): 301.88 (M+H)$^+$.

(2) Preparation of (S)-phenyl(3-(benzofuran-7-oxy)-3-(thiophen-2-yl)propyl) (methyl)carbamate (I-a-1-1)

(3) Preparation of(S)-3-(benzofuran-7-yloxy)-N-methyl-3-(thiophen-2-yl)propan-1-amine (Ic-1)

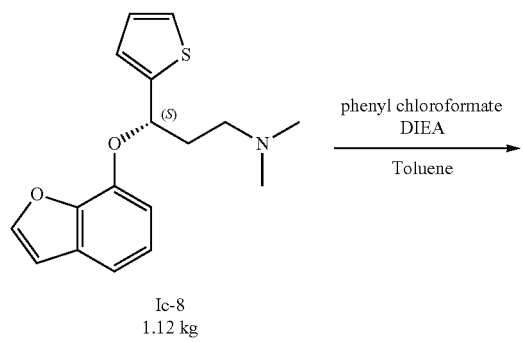

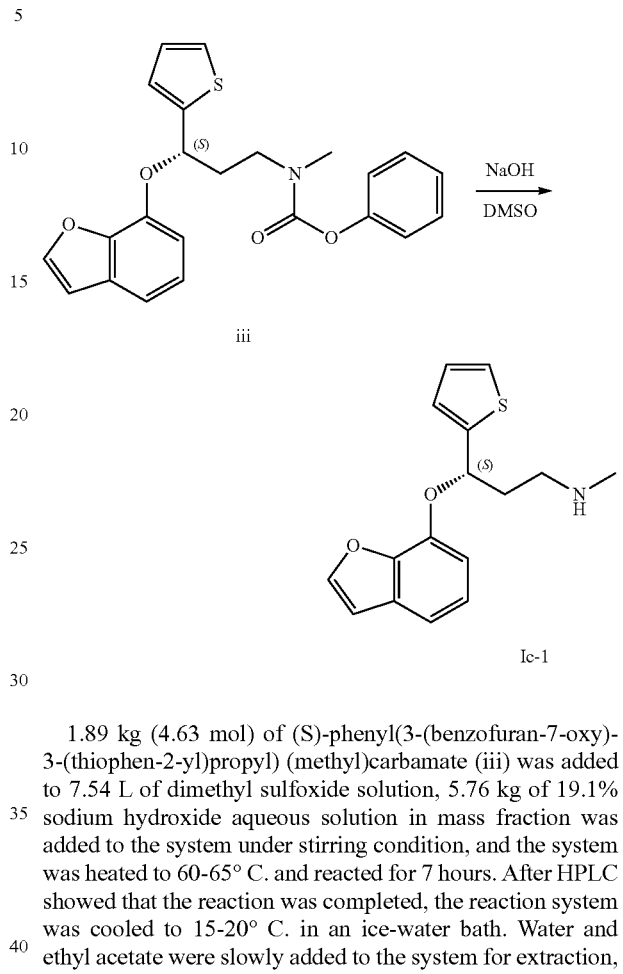

of (S)-3-(benzofuran-7-yloxy)-N,N-dimethyl-3-(thiophen-2-yl)propan-1-amine (Ic-8) was dissolved in 5.5 L of toluene solution, 0.71 kg (5.48 mol) of N,N-diisopropylethylamine was added to the system under stirring, nitrogen gas was introduced, and the reaction system was cooled down to 20-30° C. in an ice-water bath, 0.86 kg (5.48 mol) phenyl chloroformate was slowly added dropwise to the system, the temperature was controlled to be less than or equal to 35° C., after adding the material, the system was heated to 40-45° C. and reacted for 3 hours. After HPLC showed that the reaction was completed, the temperature was cooled down to 25-30° C. in an ice-water bath. 4.4 L of water was slowly added to the reaction system, 4.41 L of ethyl acetate was added for extraction. The organic phase was collected, washed with saturated aqueous sodium chloride solution, and concentrated to obtain 1.89 kg of target product compound of formula iii as a yellow oil with a yield of 127.1%, a purity of 80.5%.

$^1$H NMR (500 MHz, DMSO) δ 7.91 (t, J=24.3 Hz, 1H), 7.45 (d, J=5.0 Hz, 1H), 7.39-7.26 (m, 2H), 7.24-7.13 (m, 3H), 7.06 (dd, J=23.8, 15.4 Hz, 2H), 6.98-6.85 (m, 4H), 5.93 (d, J=40.9 Hz, 1H), 3.63 (dd, J=31.9, 6.1 Hz, 1.5H), 3.44 (t, J=23.1 Hz, 0.5H), 2.96 (t, J=35.7 Hz, 3H), 2.48-2.38 (m, 1H), 2.26 (dd, J=60.2, 26.5 Hz, 1H). MS (ESI, m/z): 407.90 (M+H)$^+$.

1.89 kg (4.63 mol) of (S)-phenyl(3-(benzofuran-7-oxy)-3-(thiophen-2-yl)propyl) (methyl)carbamate (iii) was added to 7.54 L of dimethyl sulfoxide solution, 5.76 kg of 19.1% sodium hydroxide aqueous solution in mass fraction was added to the system under stirring condition, and the system was heated to 60-65° C. and reacted for 7 hours. After HPLC showed that the reaction was completed, the reaction system was cooled to 15-20° C. in an ice-water bath. Water and ethyl acetate were slowly added to the system for extraction, the organic phase was washed with saturated aqueous sodium chloride solution, then 0.415 kg (4.63 mol) of oxalic acid was added to the organic phase. The system was stirred for 40 minutes, filtered, and the filter cake was washed with ethyl acetate twice. Water was added to the filter cake, the mixture was stirred for 5 minutes, filtered, the filter cake was washed with water once, and after repeating twice, ethyl acetate and water were added to the filter cake, 20-30% aqueous sodium hydroxide solution was added dropwise to the system under stirring conditions, the pH was adjusted to 10-11, and stirred for 10 minutes. The reaction system was filtered, the filter cake was washed twice with ethyl acetate, the layers were separated, the aqueous phase was washed once with ethyl acetate, the organic phases were combined, the organic phase was washed with saturated aqueous sodium chloride solution, dried over anhydrous sodium sulfate, and concentrated to obtain 0.73 kg of target product compound Ic-1 as an oily substance with a yield of 54.9% and a purity of 98.3%.

$^1$H NMR (400 MHz, CDCl$_3$) δ 7.63 (d, J=2.0 Hz, 1H), 7.20 (t, J=6.6 Hz, 2H), 7.08-6.99 (m, 2H), 6.88 (dd, J=4.9, 3.6 Hz, 1H), 6.80 (d, J=7.9 Hz, 1H), 6.75 (d, J=2.0 Hz, 1H), 5.93 (dd, J=8.2, 4.4 Hz, 1H), 3.30 (t, J=7.0 Hz, 2H), 2.82-2.69 (m, 4H), 2.65-2.54 (m, 1H). MS (ESI, m/z): 287.87 (M+H)$^+$.

Example 2

(S)-7-(3-Chloro-1-(thiophen-2-yl)propoxy)benzo-furan (Intermediate II-1)

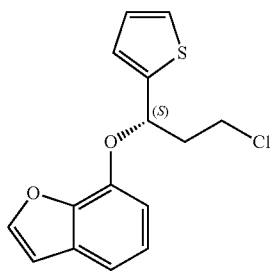

II-1

480 mg of (R)-3-chloro-1-(thiophen-2-yl)propan-1-ol, 364 mg of 7-hydroxybenzofuran and 784 mg of triphenylphosphine were dissolved in 20 mL of anhydrous tetrahydrofuran, 589 μL of diisopropyl azodicarboxylate was slowly added dropwise to the system under an ice bath conditions, after the dropwise addition, the system was transferred to room temperature and reacted for overnight. After the completion of the reaction, the system was directly rotated to dryness, and the residue was separated and purified by column chromatography to obtain the title compound as 600 mg of colorless oil with a yield of 75.4%.

$^1$H NMR (500 MHz, CDCl$_3$) δ 7.61 (t, J=3.1 Hz, 1H), 7.39 (dd, J=1.7, 0.7 Hz, 1H), 7.21 (dt, J=8.2, 1.9 Hz, 1H), 7.11-7.06 (m, 1H). 6.88 (d, J=7.9 Hz, 1H), 6.76 (dd, J=8.1, 2.1 Hz, 1H), 6.33 (d, J=3.2 Hz, 1H), 6.30 (dd, J=3.3, 1.8 Hz, 1H), 5.70 (dd, J=8.4, 5.1 Hz, 1H), 3.89 (ddd, J=11.1, 8.2, 5.4 Hz, 1H), 3.73-3.65 (m, 1H). 2.80-2.70 (m, 1H), 2.51-2.42 (in, 1H). MS (ESI, m/z): 293 (M+H)$^+$.

Example 3

(S)-3-(Benzofuran-7-yloxy)-N-methyl-3-(thiophen-2-yl)propan-1-amine (Compound Ic-1)

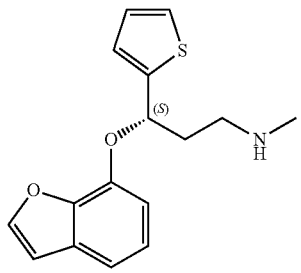

I$_C$-1

600 mg of intermediate II-1 was dissolved in saturated sodium iodide in acetone and refluxed overnight. After the reaction was completed, the solvent was spin-dried, water was added to the system, the mixture was extracted three times with ethyl acetate, washed with saturated brine, dried over anhydrous sodium sulfate, filtered, concentrated. The residue was dissolved in 20 mL of tetrahydrofuran solution, 2 mL of 40% aqueous methylamine solution was added, and the mixture was reacted overnight. After the reaction was completed, the solvent was spin-dried, sodium hydroxide aqueous solution was added to the system, the mixture was extracted three times with ethyl acetate, washed with saturated brine, dried over anhydrous sodium sulfate, filtered, concentrated, and the residue was separated by column chromatography (methanol/dichloromethane=1:15) to obtain the title compound as 200 mg of colorless oil with a yield of 34.0%.

$^1$H NMR (400 MHz, CDCl$_3$) δ 7.63 (d, J=2.0 Hz, 1H), 7.20 (t, J=6.6 Hz, 2H), 7.08-6.99 (m, 2H), 6.88 (dd, J=4.9, 3.6 Hz, 1H), 6.80 (d, J=7.9 Hz, 1H), 6.75 (d, J=2.0 Hz, 1H), 5.93 (dd, J=8.2, 4.4 Hz, 1H), 3.30 (t, J=7.0 Hz, 2H), 2.82-2.69 (m, 4H), 2.65-2.54 (m, 1H). MS (ESI, m/z): 287.87 (M+H)$^+$.

Example 4

(S)-3-(Benzofuran-7-yloxy)-N-methyl-3-(thiophen-3-yl)propan-1-amine (Compound I$_C$-2)

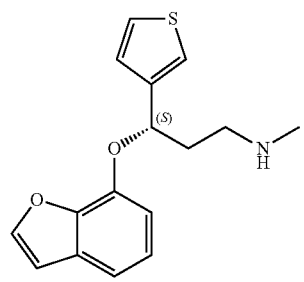

I$_C$-2

Except that (R)-3-chloro-1-(thiophen-2-yl)propan-1-ol was replaced by (R)-3-chloro-1-(thiophen-3-yl)propan-1-ol, the other required raw materials, reagents and preparation method were the same as those in Examples 2-3, and 200 mg of the title compound was obtained as a yellow oil with a yield of 33.9%.

$^1$H NMR (500 MHz, CDCl$_3$) δ 7.63 (d, J=2.1 Hz, 1H), 7.27 (dd, J=5.0, 3.0 Hz, 1H), 7.24 (d, J=2.1 Hz, 1H). 7.18-7.11 (m, 2H), 7.01 (t, J=7.9 Hz, 1H). 6.75 (d, J=2.1 Hz, 1H), 6.72 (d, J=7.8 Hz, 1H), 5.64 (dd, J=8.0, 5.0 Hz, 1H), 2.94-2.81 (m, 2H), 2.48 (s, 3H), 2.46-2.32 (m, 1H), 2.24-2.13 (m, 1H). MS (ESI, m/z): 287.76 (M+H)$^+$.

Example 5

(S)-3-(Benzofuran-7-yloxy)-N-methyl-3-(furan-3-yl)propan-1-amine (Compound I$_C$-3)

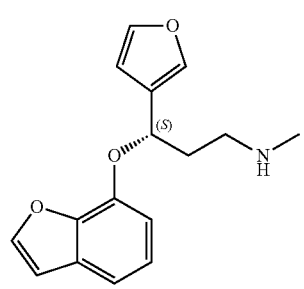

I$_C$-3

Except that (R)-3-chloro-1-(thiophen-2-yl)propan-1-ol was replaced by (R)-3-chloro-1-(furan-3-yl)propan-1-ol, the other required raw materials, reagents and preparation method were the same as those in Examples 2-3, and 100 mg of the title compound was obtained as a colorless oil with a yield of 9.9%.

$^1$H NMR (500 MHz, CDCl$_3$) δ 7.62 (d, J=2.1 Hz, 1H), 7.40 (s, 1H), 7.35 (t, J=1.7 Hz, 1H), 7.17 (dd, J=7.8, 0.8 Hz, 1H), 7.05 (t, J=7.9 Hz, 1H), 6.80 (d, J=7.7 Hz, 1H), 6.75 (d, J=2.1 Hz, 1H), 6.46 (d, J=1.1 Hz, 1H), 5.56 (dd. J=7.7, 5.4 Hz, 1H), 2.90-2.78 (m, 2H), 2.46 (s, 3H), 2.35 (td, J=13.9, 7.4 Hz, 1H), 2.13 (dtd, J=12.4, 7.0, 5.5 Hz, 1H). MS (ESI, m/z): 271.88 (M+H)$^+$.

Example 6

(S)-3-(Benzofuran-7-yloxy)-N-methyl-3-(furan-2-yl)propan-1-amine (Compound Ic-4)

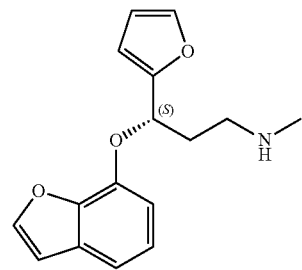

I$_C$-4

Except that (R)-3-chloro-1-(thiophen-2-yl)propan-1-ol was replaced by (R)-3-chloro-1-(furan-2-yl)propan-1-ol, the other required raw materials, reagents and preparation method were the same as those in Examples 2-3, and 30 mg of the title compound was obtained as a colorless oil with a yield of 3.2%.

$^1$H NMR (500 MHz, CDCl$_3$) δ 7.61 (d, J=2.1 Hz, 1H), 7.36 (d, J=1.1 Hz, 1H). 7.20 (d, J=7.7 Hz, 1H), 7.06 (dd, J=1±0.5, 5.3 Hz, 1H), 6.82 (d, J=7.7 Hz, 1H), 6.74 (dd, J=7.8, 2.1 Hz, 1H), 6.31 (d, J=3.2 Hz, 1H), 6.27 (dd, J=3.2, 1.8 Hz, 1H), 5.60 (dd, J=7.9, 5.3 Hz, 1H), 3.13-2.99 (m, 2H), 2.63-2.56 (m, 4H), 2.44 (ddd, J=14.1, 12.4, 7.0 Hz, 1H). MS (ESI, m/z): 271.88 (M+H)$^+$.

Example 7

(S)-3-(2,3-Dihydro-1H-inden-4-yl)oxy)-N-methyl-3-(2-thienyl)propan-1-amine (Compound Ic-10)

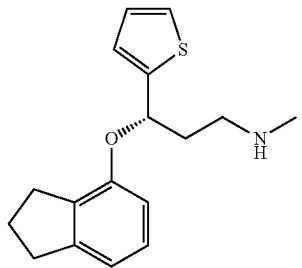 [SMILES: CNCC[C@H](Oc1cccc2c1CCC2)c1cccs1]

I$_C$-10

Except that 7-hydroxybenzofuran was replaced by 4-indenol, the other required raw materials, reagents and preparation method were the same as those in Examples 2-3, 16 mg of the title compound was obtained as a brown oil with a yield of 9.9%.

$^1$H NMR (400 MHz, CDCl$_3$) δ 7.21 (dd, J=5.0, 1.2 Hz, 1H), 7.03-6.96 (m, 2H). 6.92 (dd, J=5.0, 3.5 Hz, 1H), 6.81 (d, J=7.3 Hz, 1H), 6.65 (d, J=8.0 Hz, 1H), 5.57 (dd, J=7.8, 5.0 Hz, 1H), 2.87 (dt, J=19.9, 7.3 Hz, 6H), 2.47 (s, 3H), 2.41-2.30 (m, 1H), 2.25-2.14 (m, 1H). 2.06 (p, J=7.0 Hz, 2H). MS (ESI, m/z): 287.87 (M+H)$^-$

Example 8

(S)-2-(3-(Benzofuran-7-yloxy)-3-(thiophen-2-yl)propyl)isoindoline-1,3-dione (Intermediate III-1)

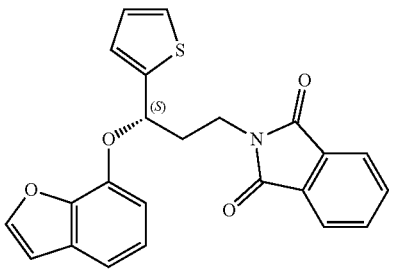

III-1

160 mg of intermediate II-1, 303 mg of potassium phthalimide and 25 mg of sodium iodide were dissolved in 5 ml of N,N-dimethylformamide, and the reaction was carried out at 90° C. overnight under nitrogen protection. After the reaction was completed, water was added to the system, the mixture was extracted three times with ethyl acetate, washed with water, washed with saturated brine, dried over anhydrous sodium sulfate, filtered, concentrated, and the residue was separated by column chromatography (ethyl acetate/petroleum ether=1:5) to obtain the title compound as 140 mg of yellow solid with a yield of 63.5%.

$^1$H NMR (500 MHz, CDCl$_3$) δ 7.81-7.78 (m, 2H), 7.68 (dd, J=5.5, 3.0 Hz, 2H), 7.45 (d, J=2.1 Hz, 1H), 7.18 (dd, J=5.0, 1.1 Hz, 1H), 7.14 (dd, J=7.8, 0.8 Hz, 1H), 7.06 (d, J=3.0 Hz, 1H), 7.04-6.97 (m, 1H), 6.86 (dt, J=10.3, 5.2 Hz, 1H), 6.78 (d, J=7.4 Hz, 1H). 6.68 (d, J=2.1 Hz, 1H), 5.82 (dd, J=7.8, 5.2 Hz, 1H), 4.07-3.89 (m, 2H), 2.66 (td, J=14.4, 7.3 Hz, 1H), 2.47-2.36 (m, 1H). MS (ESI, m/z): 404 (M+H)$^+$.

Example 9

(S)-3-(benzofuran-7-yloxy)-3-(thiophen-2-yl)propan-1-amine (Compound I_C-23)

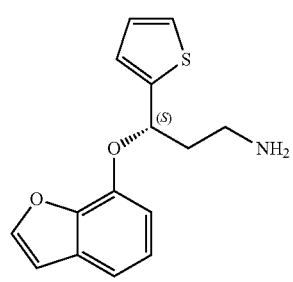

I_C-23

140 mg of intermediate III-1 and 87 mg of hydrazine hydrate were dissolved in 5 ml of methanol solution and reacted at room temperature overnight. After the reaction was completed, the solvent was spin-dried, and the residue was separated by column chromatography (methanol/dichloromethane=1:15) to obtain the title compound as 30 mg of a colorless oil with a yield of 31.6%.

$^1$H NMR (500 MHz, DMSO) δ 7.97 (d, J=2.1 Hz, 1H), 7.49 (dd, J=5.0, 1.1 Hz, 1H), 7.24-7.17 (m, 2H), 7.11-7.03 (m, 1H), 6.99 (dd, J=5.0, 3.5 Hz, 1H), 6.95 (d, J=7.5 Hz, 1H), 6.93 (d, J=2.1 Hz, 1H), 6.04 (dd, J=7.8, 5.5 Hz, 1H), 2.99-2.86 (m, 2H), 2.44-2.35 (m, 1H), 2.21 (ddt, J=11.5, 9.3, 5.8 Hz, 1H). MS (ESI, m/z): 273.77 (M+H)$^+$.

Example 10

(S)-3-(benzofuran-7-yloxy)-3-(furan-3-yl)propan-1-amine (Compound IC-24)

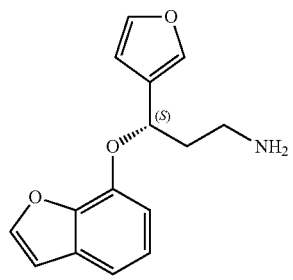

IC-24

Except that (R)-3-chloro-1-(thiophen-2-yl)propan-1-ol was replaced by (R)-3-chloro-1-(furan-3-yl)propan-1-ol, the other required raw materials, reagents and preparation methods were the same as those in Examples 2 and 8-9, and 90 mg of the title compound was obtained as a colorless oil with a yield of 12.7%.

$^1$H NMR (500 MHz, CDCl$_3$) δ 7.62 (d, J=2.1 Hz, 1H), 7.42-7.37 (m, 1H), 7.35 (t, J=1.7 Hz, 1H), 7.18 (dd, J=7.8, 0.9 Hz, 1H), 7.08-7.01 (m, 1H), 6.79 (dd, J=7.9, 0.7 Hz, 1H), 6.75 (d, J=2.2 Hz, 1H), 6.45 (dd, J=1.7, 0.7 Hz, 1H), 5.57 (dd, J=8.1, 5.0 Hz, 1H), 3.03-2.91 (m, 2H), 2.31 (ddt, J=14.1, 8.1, 6.4 Hz, 1H), 2.06 (dtd, J=9.4, 7.1, 5.1 Hz, 1H). MS (ESI, m/z): 257.77(M+H)$^+$.

Example 11

(S)-3-(benzofuran-7-yloxy)-3-(furan-2-yl)propan-1-amine (Compound Ic-25)

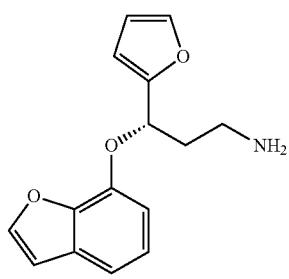 [SMILES: NCC[C@H](Oc1cccc2ccoc12)c1ccco1]

I_C-25

Except that (R)-3-chloro-1-(thiophen-2-yl)propan-1-ol was replaced by (R)-3-chloro-1-(furan-2-yl)propan-1-ol, the other required raw materials, reagents and preparation methods were the same as those in Examples 2 and 8-9, and 85 mg of the title compound was obtained as a colorless oil with a yield of 16.5%.

$^1$H NMR (500 MHz, CDCl$_3$) δ 7.62 (d, J=2.1 Hz, 1H), 7.37 (dd, J=1.6, 1.0 Hz, 1H), 7.20 (dd, J=7.8, 0.9 Hz, 1H), 7.06 (t, J=7.9 Hz, 1H), 6.87-6.80 (m, 1H), 6.75 (d, J=2.1 Hz, 1H), 6.33-6.24 (m, 2H), 5.59 (dd, J=8.0, 5.5 Hz, 1H), 3.09-2.93 (m, 2H), 2.43 (dq, J=7.9, 6.4 Hz, 1H), 2.22 (qd, J=12.5, 6.9 Hz, 1H). MS (ESI, m/z): 257.64(M+H)$^+$.

Example 12

(S)-3(benzofuran-7-yloxy)-3-(thiophen-3-yl)propan-1-amine (Compound Ic-26)

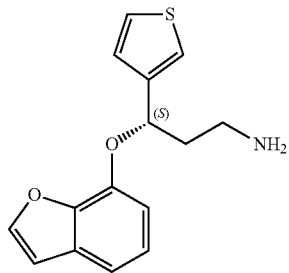

I_C-26

Except that (R)-3-chloro-1-(thiophen-2-yl)propan-1-ol was replaced by (R)-3-chloro-1-(thiophen-3-yl)propan-1-ol, the other required raw materials, reagents and preparation methods were the same as those in Examples 2 and 8-9, and 60 mg of the title compound was obtained as a yellow oil with a yield of 14.6%.

$^1$H NMR (500 MHz, CDCl$_3$) δ 7.62 (d, J=1.9 Hz, 1H), 7.25-7.22 (m, 2H), 7.13 (t, J=7.4 Hz, 1H), 7.09 (d, J=4.6 Hz, 1H), 6.97 (t, J=7.9 Hz, 1H), 6.71 (d, J=2.0 Hz, 1H), 6.67 (d, J=8.0 Hz, 1H), 5.65 (dd, J=7.9, 4.2 Hz, 1H), 3.30-3.11 (m, 2H), 2.49 (dd, J=14.1, 7.4 Hz, 1H), 2.34 (dd, J=12.9, 5.8 Hz, 1H). MS (ESI, m/z): 273.77(M+H)$^+$.

Example 13

(S)-3-(benzofuran-7-yloxy)-N-methyl-3-(oxazol-5-yl)propan-1-amine (Compound I$_C$-29)

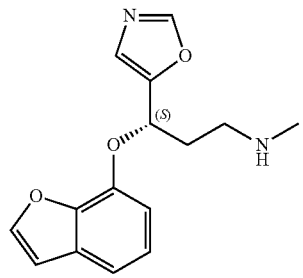

I$_C$-29

Except that (R)-3-chloro-1-(thiophen-2-yl)propan-1-ol was replaced by (R)-3-chloro-1-(oxazol-5-yl)propan-1-ol, the other required raw materials, reagents and preparation methods were the same as those in Examples 2-3, and 63 mg of the title compound was obtained as a yellow oil with a yield of 21.0%.

$^1$H NMR (500 MHz, CDCl$_3$) δ 7.83 (s, 1H), 7.62 (d, J=2.1 Hz, 1H), 7.23 (dd, J=7.8, 0.9 Hz, 1H), 7.08 (dd, J=10.4, 5.3 Hz, 1H), 7.03 (s, 1H), 6.87-6.81 (m, 1H), 6.76 (d, J=2.2 Hz, 1H), 5.74 (dd, J=8.0, 5.4 Hz, 1H), 3.00-2.87 (m, 2H), 2.53-2.49 (m, 4H), 2.36-2.26 (m, 1H). MS (ESI, m/z): 272.76(M+H)

Comparative Example 1

A Brief Preparation of the Compound of Formula C1 is Provided Below

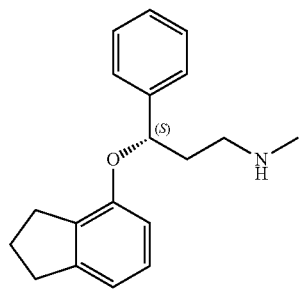

Formula C1

Except that (R)-3-chloro-1-(thiophen-2-yl)propan-1-ol was replaced by (R)-3-chloro-1-phenylpropan-1-ol, the other required raw materials, reagents and preparation method were the same as those in Example 7, and 14 mg of compound C1 were obtained with a yield of 18.1%.

$^1$H NMR (400 MHz, CDCl$_3$) δ 7.46-7.14 (m, 5H), 6.90 (t, J=7.7 Hz, 1H), 6.77 (d, J=7.4 Hz, 1H), 6.41 (d, J=8.1 Hz, 1H), 5.33 (dd, J=8.0, 4.4 Hz, 1H), 3.13 (dd, J=13.5, 6.0 Hz, 2H), 2.91 (dt, J=12.3, 7.5 Hz, 4H), 2.62 (s, 3H), 2.52-2.36 (m, 2H), 2.13-2.00 (m, 2H). MS (ESI, m/z): 282.20 (M+H)$^+$.

Example 14

Trpa1 Inhibitory Activity

The inhibitory activity of some compounds in the Examples of present invention on transient receptor potential channel protein TRPA1 was tested in this example. The compound of formula A (WO2010075353) was used as a positive control compound:

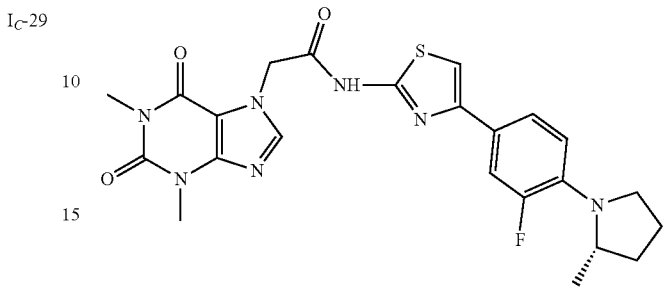

Compound of formula A

The Method was as Below:

IonWorks Barracuda (IWB) automated patch clamp detection was used as test method: HEK293 cells stably expressing TRPA1 were placed in the T175 culture flask with DMEM medium containing 15 μg/mL Blasticidin S HCl, 200 μg/mL Hygromycin B and 10% FBS, and cultured in an incubator in 5% CO$_2$ at 37° C. When the cell density reached about 80%, the culture medium was removed, the residue was rinsed once with phosphate buffered saline (PBS) without calcium and magnesium. 3 mL of Trypsin was added to digest for 2 min, 7 mL of culture medium was added to terminate the digestion. The cells were collected to 15 mL centrifuge tube and centrifuged at 800 rpm for 3 min. After the supernatant was removed, the cells were added to appropriate volume of extracellular fluid for re-suspending, and the cell density was controlled at 2-3×10$^6$/mL for IWB experiment. The formulation of extracellular fluid (in mM) was 140 NaCl, 5 KCl, 1 MgCl$_2$, 10 HEPES, 0.5 EGTA, 10 Glucose (pH 7.4); the formulation of intracellular fluid (in mM) was 140 CsCl, 10 HEPES, 5 EGTA, 0.1 CaCl$_2$), 1 MgCl$_2$ (pH 7.2). 28 mg/mL of amphotericin B was freshly prepared with DMSO on the day of experiment, and then final concentration of 0.1 mg/mL of that was prepared with intracellular fluid.

Population patch clamp (PPC) plate was used in IWB experiment. The entire detection process was automatically carried out by the instrument. That is, extracellular fluid was added into 384 wells of PPC plate, and after the intracellular fluid was added into plenum (under the PPC plate), 6 L of cell fluid was added for sealing test, and finally the intracellular fluid in plenum was replaced with amphotericin B-containing intracellular fluid, thereby establishing a whole-cell recording mode after perforating sealed cells. The sampling frequency for recording TPRAI current was 10 kHz, the cells were clamped at 0 mV, the voltage stimulation command (channel protocol) was a ramp voltage from −100 mV to +100 mV in 300 ms. This voltage stimulation was applied every 10 s, mTRPAl current was induced by 300 M AITC.

The record of data and the export of current amplitude measurement were carried out by IWB software (version 2.5.3, Molecular Devices Corporation. Union City, CA). No statistics was recorded for wells with sealing impedance lower than 20 MΩ. The original current data was corrected by software for leakage reduction. TRPA1 current amplitude was measured at ±100 mV. Each PPC plate in the experiment had a dose-effect data of HC030031 as a positive control. If IC$_{50}$ value of HC030031 exceeded 3 times the average IC$_{50}$ value previously obtained on each plate, it would be retested. The dose-effect curve of compounds and $IC_{50}$ were fitted and calculated by GraphPad Prism 5.02 (GraphPad Software, San Diego, CA).

Experimental Results

Some compounds of present invention were detected by IonWorks Barracuda (IWB) automated patch clamp detection method for $IC_{50}$ inhibitory activity. The activity data was shown in Table 2, and the dose-effect relationship of some representative compounds in inhibiting TRPA1 activity was shown in FIGS. 1A-1E.

TABLE 2

Inhibitory activity data ($IC_{50}$ (μM)) of some compounds of the present invention on TRPA1 in the automated patch clamp detection test

| NO. | $IC_{50}$ (μM) | NO. | $IC_{50}$ (μM) | NO. | $IC_{50}$ (μM) |
|---|---|---|---|---|---|
| $I_C$-1 | +++++ | $I_C$-2 | ++++ | $I_C$-3 | +++++ |
| $I_C$-4 | +++++ | $I_C$-8 | +++++ | $I_C$-10 | ++++ |
| $I_C$-23 | +++++ | $I_C$-24 | +++++ | $I_C$-25 | +++++ |
| $I_C$-26 | ++++ | $I_C$-29 | ++++ | Compound C1 | ++ |
| Compound of formula A | + | Duloxetine (S configuration) | +++ | Duloxetine (R configuration) | ++ |

Activity: $IC_{50}$ (μM):
50-100: +
20-50: ++
10-20: +++
5-10: ++++
1-5: +++++

The results showed that the compounds of present invention exhibited potent inhibitory activity on TRPA1, wherein the half effective inhibitory concentration $IC_{50}$ values of 11 compounds on TRPA1 were 1-10 μM. It could be seen from FIGS. 1A-IE that the half effective inhibitory concentration $IC_{50}$ values of compounds of $I_C$-3, $I_C$-4, $I_C$-8, $I_C$-23, and $I_C$-24 on TRPA1 were less than 5 μM. Therefore, it could be concluded that the compounds of formula I of present invention have potent inhibitory activity on TRPA1.

In addition, the activity ratio of compound Ic-10 (containing heteroaryl

)

to compound C1 (containing phenyl), i.e., the $IC_{50}$ of compound C1/the $IC_{50}$ of compound $I_C$-10, was about 2.5 times, which suggested that the compounds of present invention containing heteroaryl (such as compound Ic-10) have higher inhibitory activity on TRPA1.

In addition, compared with compounds with naphthalene ring as A group, such as duloxetine, the $IC_{50}$ values of compound $I_C$-10 with benzoalicyclic ring as A group, compound $I_C$-3, compound $I_C$-23, and compound $I_C$-1 with benzoheteroaryl as A group were significantly decreased. Specifically, the ratio of the $IC_{50}$ of S configuration of duloxetine to the $IC_{50}$ of any one of compound $I_C$-10, compound $I_C$-3, compound $I_C$-23 or compound $I_C$-1 was about 2.8-6.8. The results suggests that the compounds of present invention with benzoalicyclic ring or heteroaryl as A group have higher (about 2.8-6.8 times higher) inhibitory activity on TRPA1.

Similarly, the inventors also measured the TRPA1 inhibitory activity of S configuration of duloxetine and compound Ic-10 by manual patch clamp detection. Similar to the test results of automated patch clamp detection method, in the manual patch clamp detection, the ratio of $IC_{50}$ of the S configuration of duloxetine to the $IC_{50}$ of the compound $I_C$-10 was 4.36/1.12=3.9.

Similarly, the inventors also measured the TRPA1 inhibitory activity of compound Ic-1 by manual patch clamp detection. The method was as follows:

The stably transfected HEK293 cell line stably expressing human TRPA1 channel was placed in T75 culture flask with DMEM medium containing 15 μg/mL Blasticidin S HCl, 200 μg/mL Hygromycin B and 10% FBS, and cultured in an incubator in 5% $CO_2$ at 37° C. When the cell density reached about 80%, the culture medium was removed, the residue was rinsed once with phosphate buffered saline (PBS) without calcium and magnesium. 2 mL of Trypsin was added to digest for 2 minutes, and 8 mL of culture medium was added to terminate the digestion. The cells were collected to 15 mL centrifuge tube and centrifuged at 800 rpm for 3 min. After the supernatant was removed, the cells were added to appropriate volume of extracellular fluid for re-suspending.

In manual patch clamp detection, HEKA system (Patch Master software) was used together with EPC-10 amplifier to record the whole cell current of TRPA1 stably transfected cell line at room temperature. The formulation of intracellular fluid (in mM) for whole cell recording was 140 CsCl, 10 HEPES, 5 EGTA, 0.1 $CaCl_2$, 1 $MgCl_2$ (pH 7.2, osmotic pressure of 295-300 mOsm); extracellular fluid (in mM) for recording was $Ca^{2+}$-free: 140 NaCl, 5 KCl, 0.5 EGTA, 1 $MgCl_2$, 10 Glucose, 10 HEPES (pH 7.4, osmotic pressure of 300-310 mOsm). Glass microelectrode resistance used for patch clamp recording was 2-4 MS, the sampling frequency was 10 kHz, the filter frequency was 2.9 kHz, the cells were clamped at 0 mV, and the voltage stimulation command (channel protocol) was a linear voltage from −100 mV to ±100 mV in 300 ms, then restored to 0 mV clamping potential. The recording was performed every 2 s. The hTRPA1 current was induced by 100 μM AITC. To ensure the accuracy of current recording, the series resistance was used for 60% compensation during recording.

The record of data and the export of current amplitude measurement were carried out by Patch Master software. Cells with sealing impedance lower than 500 Mi were not included in the statistics. The original current data were corrected by software for leakage reduction, and the hTRPA1 current amplitude was measured at ±100 mV. The compound dose-effect curve and $IC_{50}$ were fitted and calculated by GraphPad Prism 5.02 (GraphPad Sofhvare, San Diego, CA).

The results of manual patch clamp detection Similar to the results of the automated patch clamp detection, the ratio of $IC_{50}$ of S configuration of duloxetine to that of compound Ic-1 was 4.36 μM/0.43 μM=10.14 in the manual patch clamp detection.

Example 15

Cytotoxicity Test

In this example, hepatotoxicity and neurotoxicity of compound $I_C$-10 and compound $I_C$-1 prepared by the examples were determined, and the method was as follows:

HepG-2 and SH-SY5Y cells were prepared and placed in a 10 cm dish and cultured in a cell incubator in 5% $CO_2$ at 37° C. Trypsin was used to digest and cells were resuspended and counted. The cells were transferred to 96-well plate with 8000 cells in a well (100 μl/well). The plate was cultured in a cell incubator for 24 h in 5% $CO_2$ at 37° C. A serial of gradient concentration dilutions of compound with 2-fold dilution were prepared, and the system was 100 μL/well. The supernatant of cell culture system on the first day in the 96-well plate was removed, and fresh-prepared drug concentration system was added into culture plate wells containing cultured cells (duplicate wells were set). The cells were cultured in a cell incubator in 5% $CO_2$ at 37° C. for 72 h. After the cell culture was completed, the supernatant of cell culture system was removed from 96-well plate, 100 μl of detection solution containing 10% CCK-8 medium was added into each well, and the cells were cultured in a cell incubator in 5% $CO_2$ at 37° C. for 1 h and then taken out after time was up. Microplate reader was used to measure the absorbance at 450 nm. Data was processed to calculate cytotoxicity, and $IC_{50}$ was calculated by GraphPad Prism. The cytotoxicity calculation formula was as follows: Cytotoxicity (%)=[A(0 Dosing)−A(Dosing)]/[A(0 Dosing)−A (Control)]×100

A (Dosing): the absorbance of wells containing cells, CCK-8 solution and drug solution.

A (Control): the absorbance of wells containing medium and CCK-8 solution and without cells.

A (0 Dosing): the absorbance of wells containing cells and CCK-8 solution and without drug solution.

Experimental Result

The results of hepatotoxicity (HepG2 cell) and neurotoxicity (SH-SY5Y) of compound $I_C$-10 and compound $I_C$-1 showed: the hepatotoxicity and neurotoxicity of duloxetine ($IC_{50}$, μM) were 33 μM and 28 μM, respectively, while the hepatotoxicity and neurotoxicity of compound $I_C$-1 and compound $I_C$-10 of the present invention ($IC_{50}$, μM) were about 60-120 μM. It suggested that the compounds of the present invention had significantly lower toxicity and side effects, and were about ½ or ⅓ of toxicity and side effects of duloxetine. The results showed the compounds of the present invention had excellent safety.

Example 16

Analgesic Activity Test Experiment

In this example, analgesic activity of compound $I_C$-10 prepared by the example of present invention was evaluated by the formalin pain model in mice. The method was as follows:

30 C57BL/6 mice (male, 9-week aged) were randomly divided into 3 groups: solvent control group (vehicle, saline), duloxetine group (duloxetine, 5-HT reuptake and NE reuptake inhibitor) and $I_C$-10 group (compound $I_C$-10 of the present invention). Before the start of experiment, the mice were allowed to adapt to the experimental environment for 72 h with free feeding and drinking water. The test drug was administrated by intraperitoneal injection at a dose of 20 mg/kg, and then the mice were placed in a transparent, ventilated plexiglass cylinder for 1 h, and then 20 μl of 4% formalin solution was injected into the left hind plantar of mice of each group by microinjector. The paw pain response of mice was real-time recorded by miniature camera. The frequency of lifting (1 score/time), shaking (2 score/time), and licking (3 score/time) the left paw and the time length of licking left paw were used as indicators of pain response, the cumulative scoring and licking time in two stages of 0-10 min (phase I, acute pain phase) and 10-60 min (phase II, inflammatory pain phase) were observed and recorded, and the statistical analysis was conducted.

Experimental Results

Figure 2:
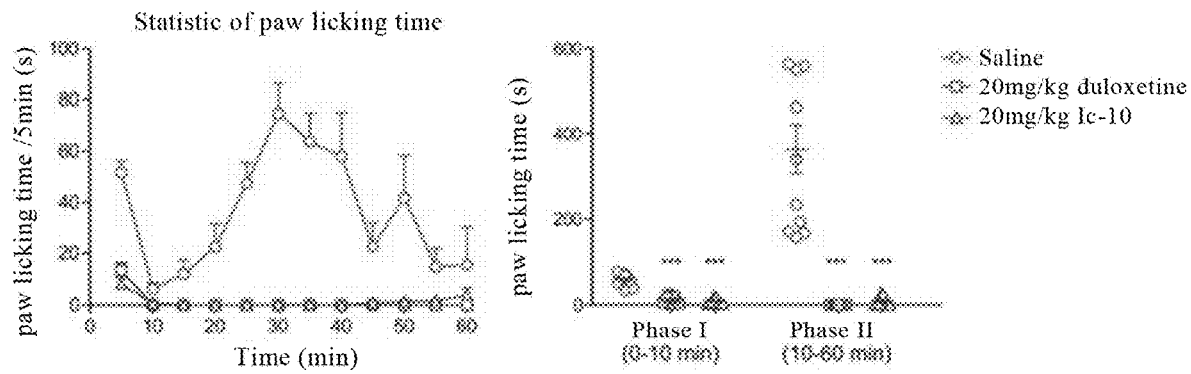
FIG. 2 shows the results of analgesic activity of the compound Ic-10 of the present invention in the formalin pain model in mice.

The results of analgesic activity of compound $I_C$-10 of the present invention in formalin pain model in mice were shown in FIG. 2. The results showed that in the statistical detection indicator of licking time, the compound $I_C$-10 of the present invention showed clear and potent analgesic activity in both phase I (0-10 min) and phase II (10-60 min) at a dose of 20 mg/kg, and almost completely inhibited licking paw behavior caused by pain as compared with saline group, and had similar analgesic activity to clinical drug duloxetine.

Example 17

Hot Plate Pain Test Experiment in Mice

In this example, the analgesic activity of compound $I_C$-23, compound $I_C$-10, compound $I_C$-1 and other compounds of the present invention were evaluated by hot plate pain model in C57 mice. The method was as follows:

1 Animal Screening

SPF-grade C57 male mice were placed at hot plate with constant 55±0.1° C. Mice with painful response such as licking paw within 10-30 s were selected (the mice which evaded and jumped were abandoned). If the pain reaction of mice was observed, the mice were taken out immediately to prevent mice from scalding.

2 Animal Grouping

The 40 selected animals were weighed and randomly divided into 4 groups: saline control group (blank control), duloxetine group (positive control group), gabapentin group (positive control group) and $I_C$-23 group (compound of the present invention).

3 Sample Preparation

The test compounds were freshly prepared on the day of administration. 0.9% NaCl physiological saline solution was prepared as solvent for later use. Appropriate amount of test compounds were added into required volume of physiological saline and fully suspended, and the concentration of the drug compound was prepared as 1 mg/ml. The standard volume of administration to mice was 10 ml/kg (or 0.1 ml/10 g).

4 Animal Administration

The administration mode was intraperitoneal administration. Animals did not need to fast for solids and liquids before administration. The administration volume was 10 ml/kg. The dosage of duloxetine and $I_C$-23 was 10 mg/kg, and the dosage of gabapentin was 100 mg/kg.

5 Hot Plate Experimental Observation

Hot plate observation indicator is the time latency of mice on the hot plate at 55±0.1° C. Measurement and recording were conducted at 3 h before administration and 15 min, 30 min, and 60 min after administration.

6. Data Statistics and Analysis

Maximum possible effect (MPE) % was used to evaluate analgesic effect of each compound, i.e., MPE %=[(Post drug latency−baseline latency)/(30−baseline latency)]×100. MPE % at different time points was recorded. The higher the value of MPE % was, the stronger the analgesic effect of the compound was.

Experimental Results

Figure 3:
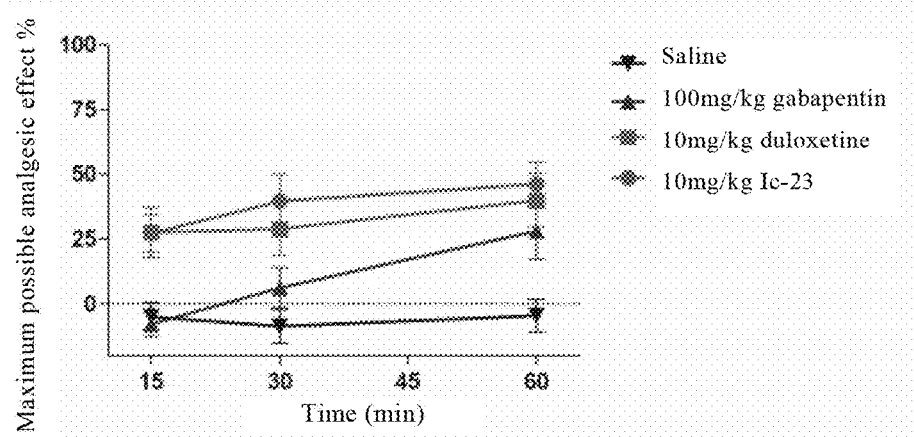
FIG. 3 shows the results of analgesic activity of the compound Ic-23 of the present invention in the hot plate induced pain model in mice.

The results of analgesic activity of compound $I_C$-23 of the present invention in the hot plate pain model in mice were shown in FIG. 3. The results showed that compared with the saline control group, the compound $I_C$-23 of the present invention showed very potent analgesic effect at a dose of 10 mg/kg with a significant difference. Compared with the positive control group, the analgesic activity of the compound $I_C$-23 of the present invention was significantly stronger than that of 100 mg/kg of gabapentin, and stronger than that of 10 mg/kg of duloxetine within 60 minutes.

Moreover, both the analgesic activity of compound $I_C$-10 and that of compound $I_C$-1 were stronger than those of gabapentin and duloxetine at the same dose (10 mg/kg).

The hot plate pain model is a classic model for evaluating the efficacy of drugs on acute pain. Therefore, the compounds of the present invention have excellent therapeutic effect on acute pain.

Example 18

Pharmacokinetic Test of Compound $I_C$-1

In this example, the pharmacokinetic properties of compounds such as duloxetine and compound $I_C$-1 were tested in rat. The method was as follows:

Test Method:

A certain amount of sample was weighed and dissolved in deionized water to prepare 1 mg/mL of solution. Male SD rats were used as test animals. The dose of single intravenous (IV) injection was 2 mg/kg, and the dose of oral (PO) administration was 10 mg/kg. Each group had three rats. The rats in oral group were fasted for 10-14 hours before administration, and were fed 4 hours after administration. Blood collection time points of animals were before administration, and 5 min, 15 min, 30 min, 1 h, 2 h, 4 h, 6 h, 8 h, and 24 h after administration for intravenous administration; before administration, and 15 min, 30 min, 1 h, 2 h, 4 h, 6 h, 8 h and 24 h after administration for oral administration. About 0.25 mL of blood was collected via the jugular vein from each animal, and heparin sodium was used for anticoagulation. After collecting the blood samples, the blood samples were placed on ice and centrifuged to separate the plasma (centrifugation conditions: 8000 rpm, 6 min, 4° C.). The collected plasma was stored at −80° C. before analysis. 50 μL of plasma sample was taken into 1.5 mL centrifuge tube, 250 μL of internal standard solution was added, and the same volume of methanol rather than internal standard solution was added in the blank group. The mixture was vortexed and mixed, centrifuged at 14,000 rpm for 5 min, 200 μL of supernatant was added into 96-well sample plate, and LC-MS/MS was used for sample analysis. In the linear regression analysis, the peak area was taken as the y-axis and the drug concentration was taken as the x-axis. The linear relationship between the peak area ratio and the concentration was expressed by the correlation coefficient (R) obtained from the regression equation of the compound. According to the blood concentration data of the drug, the pharmacokinetic calculation software WinNonlin7.0 non-compartmental model was used to calculate the pharmacokinetic parameters of the test drug, respectively.

Internal standard working solution: a certain amount of tolbutamide internal standard stock solution with a concentration of 490,000 ng/mL was pipetted into a volumetric flask with a certain volume, diluted to a desired volume with methanol and mixed well to obtain the internal standard working solution with a concentration of 200 ng/mL.

Experimental Results

According to average blood concentration data of drug in each group, the pharmacokinetic calculation software WinNonlin7.0 non-compartmental model was used to calculate pharmacokinetic parameters of each compound group, respectively. The results were shown in Table 3.

TABLE 3

Main pharmacokinetic parameters of compound $I_C$-1 and duloxetine

| Compound | Administration mode | Administration dose | $T_{max}$ (h) | $C_{max}$ (ng/ml) | $T_{1/2}$ (h) | AUC(0-∞) (h*ng/ml) | bio-availability |
|---|---|---|---|---|---|---|---|
| $I_C$-1 | IV | 2 mg/kg | 0.083 | 170 | 2.97 | 449 | 179% |
|  | PO | 10 mg/kg | 3 | 266 | 5.69 | 4016 |  |
| Duloxetine (S configuration) | IV | 2 mg/kg | 0.083 | 177 | 1.77 | 449 | 9.9% |
|  | PO | 10 mg/kg | 0.833 | 76 | 1.81 | 222 |  |

Table 3 showed that after compound $I_C$-1 was injected intravenously at a dose of 2 mg/kg, the peak concentration ($C_{max}$, 170 ng/mL) was reached at the first time point of sampling (0.083 h), the elimination half-life ($T_{1/2}$) was 2.97 h, AUC(0-∞) was 449 h*ng/mL; after compound $I_C$-1 was orally administered at a 5-fold dose (10 mg/kg), the peak concentration ($C_{max}$, 266 ng/mL) was reached at 3 h, the elimination half-life ($T_{1/2}$) was 5.69 h, and AUC(0-∞) was 4016 h*ng/mL. Calculated based on AUC (0-∞), the oral bioavailability was 179%.

After duloxetine was injected intravenously at a dose of 2 mg/kg, the peak concentration ($C_{max}$, 177 ng/mL) was reached at 0.083 h, the elimination half-life ($T_{1/2}$) was 1.77 h, and the AUC (0-∞) was 449 h*ng/mL; after duloxetine was orally administered at a 5-fold dose (10 mg/kg), the peak concentration ($C_{max}$, 76 ng/mL) was reached at 0.83 h, the elimination half-life ($T_{1/2}$) was 1.81 h, and the AUC (0-∞) was 222 h*ng/mL. Calculated based on AUC (0-30), the oral bioavailability was 9.9%.

The above results showed that, compared with duloxetine, the compounds of formula I of the present invention (such as compound $I_C$-1) had more excellent pharmacokinetic properties with a longer half-life, higher exposure in plasma, and better bioavailability, so that it is suitable for development into a medicine for oral administration, and has good prospect of medicine.

Example 19

Evaluation of Therapeutic Effect of Compound $I_C$-1 Prepared in Example 1 on Fibromyalgia by ICS Model in Mice
Experimental Method
1. Experiment Grouping The experimental groups were divided into solvent control group, 10 mg/kg duloxetine group (positive control group) and 10 mg/kg compound $I_C$-1 group (the compound prepared in Example 1).

2. Compound Preparation 10 mg/kg duloxetine: 17 mg of duloxetine was weighed, dissolved in saline and diluted to 8.5 mL. After completely dissolved, the duloxetine was administered orally. The volume of administration was 5 ml/kg.

10 mg/kg compound Ic-1: 17 mg of compound $I_C$-1 was weighed, dissolved in saline and diluted to 8.5 mL. After completely dissolved, the compound $I_C$-1 was administered orally. The volume of administration was 5 ml/kg.

3. Animals

Male C57BUJ6 mice weighing 18-22 g at the beginning of experiment were selected. Each cage had 4 mice which were allowed to feed and drink water freely. Each experimental group had 12 mice, and the experimental mice were labeled by tail labeling method.

4. Experimental Method
4.1 Model Establishment

Day 0: At 4:30 pm, the mice were put in a plexiglass box with stainless steel mesh, and then the plexiglass box was put into a cold storage (4±2° C.) overnight. The mice were allowed to feed freely and agar was used to replace water.

Day 1: At 10:00 am, the mice were delivered to room temperature (24±2° C.) environment for 30 min, and then the mice were delivered to the cold storage for 30 min. The above steps were repeated until 4:30 pm, and the mice were put into the cold storage overnight.

Day 2: the operation on day 1 was repeated.

Day 3: the mice were taken out from the cold storage at 10:00 am.

4.2 Administration

The compounds were administered orally according to the schedule of experiment, and the dosage was 10 mg/kg.

4.3 Mechanical Hyperalgesia Test

On the fourth day after modeling, the pre-administration mechanical hyperalgesia test was performed on the animals. Animals with PWT value greater than 0.5 g were excluded and were not used for experiments. On the fifth day after modeling, the animals were tested for mechanical hyperalgesia test at 0.5 h, 1 h, and 2 h after the administration of compounds.

The test method for mechanical hyperalgesia was as follows:

The mice were individually placed in a plexiglass box with a grid on the bottom of the box to ensure that the mice paw could be tested. The mice were allowed to adapt for 15 min before the test. After the adaptation was completed, the test fiber was used to test at the center of the left hind paw of mice. The test fiber comprised 8 test strengths: 2.36(0.02 g), 2.44(0.04 g), 2.83(0.07 g), 3.22(0.16 g), 3.61(0.4 g), 3.84(0.6 g), 4.08(1 g), and 4.17(1.4 g). During the test, the test fiber was pressed vertically against the skin and forced to bend for 6-8 s with a 5 s interval between each test. During the test, rapid withdrawal of animal paw was recorded as pain response. When the test fiber was removed from animal skin, the withdrawal of animal paw was also recorded as pain response. If animal moved or walked, the pain response was not recorded, and the test was repeated. In the test. 3.22(0.16 g) was used firstly. If animal responded to pain, the test fiber with lower strength was used in next test; if the animal did not respond to pain, test fiber with higher strength was used in next test (Chaplan et al. 1994). The maximum strength of tested fiber was 4.17(1.4 g).

The test results were recorded in Table 4 below, wherein pain response was recorded as X and no pain response was recorded as O.

TABLE 4

| | | | |
|---|---|---|---|
| 2.36 | | | |
| 2.44 | | | |
| 2.83 | | | |
| 3.22 | O | | |
| 3.61 | O | O | O |
| 3.84 | X | X | X |
| 4.08 | | | |
| 4.17 | | | |

Mechanical hyperalgesia was calculated by using the following formula:

$$50\% \text{ response threshold (g)} = (10^{(Xf+k)})/10{,}000;$$

Xf=the final test fiber value used in the test;

k=table value (Chaplan et al., 1994, page 62);

=mean difference

5. Data Collection and Analysis

Excel software was used to collect data, and prism software was used to analyze data. The higher the paw withdrawal threshold (PWT) was, the stronger the analgesic effect of the compound was.

Experimental Result

Figure 4:
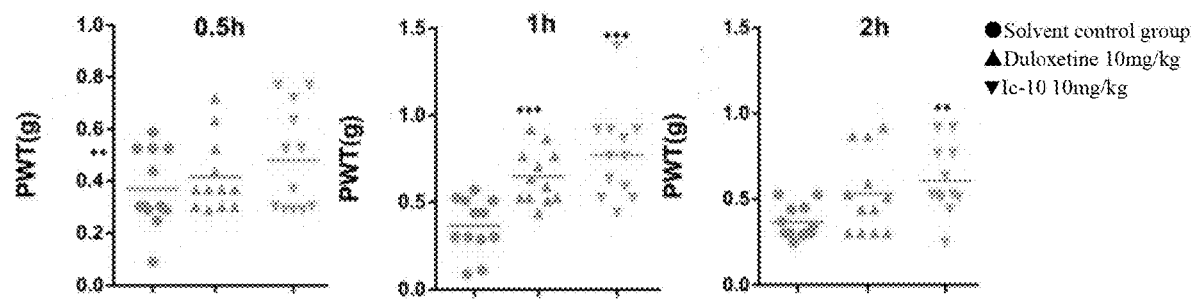
FIG. 4 shows the results of analgesic activity of compound Ic-1 and duloxetine in the fibromyalgia model in mice, Mean±SD, n=12, p<0.01, *p<0.001 compared with the solvent control group.

The results of analgesic activity of compound $I_C$-1 in the ICS model in mice were shown in Table 5 and FIG. 4.

TABLE 5

Statistical data of mechanical hyperalgesia test results (PWT) of compound Ic-1 and duloxetine at different times after administration in ICS model in mice

| | | PWT(g) Mean ± SD | | |
| --- | --- | --- | --- | --- |
| Compound | Dosage | 0.5 h | 1 h | 2 h |
| Duloxetine | 10 mg/kg | 0.416 ± 0.140 | 0.648 ± 0.155 | 0.530 ± 0.235 |
| Ic-1 | 10 mg/kg | 0.482 ± 0.199 | 0.773 ± 0.261 | 0.607 ± 0.160 |
| Solvent control group | | 0.369 ± 0.149 | 0.366 ± 0.159 | 0.367 ± 0.095 |

The Table 5 and FIG. 4 showed that compound $I_C$-1 of the present invention had very potent analgesic effect at a dose of 10 mg/kg, and could inhibit mechanical hyperalgesia induced by ICS model at 1 hour and 2 hours after oral administration. Compared with the positive control group, compound $I_C$-1 had stronger analgesic effect than that of duloxetine at 0.5 h, 1 h and 2 h. The ICS model in mice is a classic model for evaluating the efficacy of drug in the treatment of fibromyalgia. Therefore, the compound $I_C$-1 of the present invention has excellent therapeutic effect on fibromyalgia.

Example 20

Figure 5:
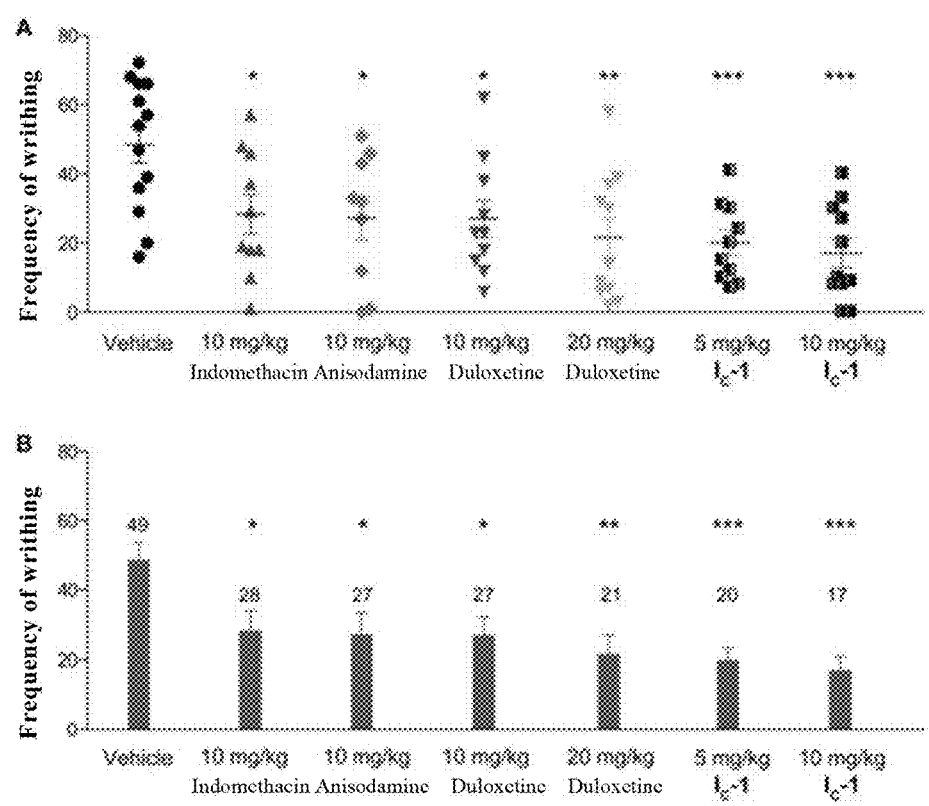
FIG. 5 shows the results of analgesic activity of compound Ic-1, duloxetine, indomethacin and anisodamine in the acetic acid writhing pain model in mice.

Evaluation of therapeutic effect of compound $I_C$-1 prepared in Example 1 on visceral pain and inflammatory pain by acetic acid writhing pain model in mice
Experimental Method Male ICR mice, weighed 22-25 g, were fasted but allowed to drink water freely for 2 h before administration. All ICR mice were weighed and grouped randomly, and the number of animals in each group was greater than 10. The negative control group was saline group (vehicle, blank control), and the positive control group was administered with 10 mg/kg indomethacin (a non-steroidal anti-inflammatory drug), 10 mg/kg anisodamine (an antispasmodic drug with clinically analgesic activity), 10 mg/kg duloxetine or 20 mg/kg duloxetine. The test compound was $I_C$-1 (the compound prepared in Example 1), and the administration dosage was 5 mg/kg or 10 mg/kg. The drug was administrated intragastrically based on the weight of mice. 1.5% acetic acid solution (0.1 ml/10 g) was injected intraperitoneally 1 hour after administration, and the frequency of visceral pain in each group of mice within 30 min was observed. When concave abdomen, stretched trunk and hind paw, and high buttocks appeared, one number point was recorded. Finally, the number of appearance of the above phenomenon was counted within 30 minutes. After administration, the fewer the frequency of visceral pain in mice was, the stronger the analgesic effect of the compound was.
Experimental Result The acetic acid writhing pain model test in mice were shown in FIG. 5. FIG. 5 showed that the compound $I_C$-1 (5 mg/kg and 10 mg/kg) of the present invention could significantly reduce the frequency of writhing response in mice caused by acetic acid after a single intragastric administration, which showed significant difference compared with that (49 times) in the saline group (vehicle, blank control). At a dosage of 5 mg/kg of compound $I_C$-1, the frequency of writhing response in mice was 20 times, which was lower than 50% of 49 times in the saline control group, suggesting that the half effective dose (EDso) of compound $I_C$-1 was less than 5 mg/kg in the model. The analgesic effect of compound $I_C$-1 at a dosage of 10 mg/kg (17 times) was stronger than that of positive drug indomethacin (28 times), anisodamine (27 times) and duloxetine (27 times) at the same dosage. The analgesic effect of compound $I_C$-1 at a dosage of 5 mg/kg (20 times) was comparable to that of duloxetine at a dosage of 20 mg/kg (21 times). This experiment showed that the analgesic activity of compound $I_C$-1 of the present invention was significantly stronger than those of the positive control drugs in the acetic acid writhing pain model in mice. The acetic acid writhing pain model in mice is a classical model for evaluating the efficacy of drug in treating visceral pain and inflammatory pain. Therefore, the compound $I_C$-1 of the present invention has excellent therapeutic effect on visceral pain and inflammatory pain.

Example 21

Evaluation of Therapeutic Effect of Compound $I_C$-1 Prepared in Example 1 on Nerve Pain in the SNL Model in Rats
Experimental Method Male SPF grade SD rats, weighed 150-180 g, were selected. Aseptic operation during surgery was performed. The animals were anesthetized with sodium pentobarbital (50 mg/kg, intraperitoneal injection). The surgical area of animal waist was shaved and the skin was disinfected three times with iodophor and 70% ethanol. After the skin was dried, the operation was started. Surgical knife was used to make a longitudinal incision at the back of the sacrum of the animal waist to expose the left paraspinal muscles, and distractor was used to separate muscle tissue to expose the spine. The left spinal nerves L5 and L6 were separated and ligated with a 6-0 silk thread, and the wound was sutured. After the operation, the animals were placed on electrothermal pad, and 5 mL of saline was injected subcutaneously to prevent dehydration. After the animals were fully awake and could move around freely, the animals were put back in the cage.

After the operation, the animals were adapted in the experimental environment for 15 min/day for 3 days. One day before the administration, the rats were subjected to mechanical hyperalgesia baseline test, and the animals that did not exhibit mechanical hyperalgesia (the paw withdrawal threshold was greater than 5 g) were excluded and the remaining rats were randomly divided into one control group and two experimental groups.

The animals were weighed to calculate the dosage. The rats in two experimental groups were administrated with 100 mg/kg gabapentin (gabapentin was currently the first-line drug for the treatment of neuralgia) or 10 mg/kg compound $I_C$-1 (the compound prepared in Example 1) by gavage, respectively, and the rats in control group were administrated with equal volume of saline orally. 1 h after administration, mechanical hyperalgesia test was performed. The rat was individually placed in a plexiglass box with a grid on the bottom of the box to ensure that the rat paw could be tested. The rats were allowed to adapt the environment for 15 min before test. After the adaptation was completed, the test fiber was used to test at the center of the left hind paw of the rat. The test fiber comprises 8 test strengths: 3.61 (0.4 g), 3.84 (0.6 g), 4.08 (1 g), 4.31 (2 g), 4.56 (4 g), 4.74 (6 g), 4.93 (8 g), 5.18 (15 g). During the test, the test fiber was pressed vertically against the skin and forced to bend the fiber for 6-8 s with a 5 s interval between each test. During the test, rapid paw withdrawal of animal was recorded as pain response. When the test fiber was removed from animal skin, the paw withdrawal of animal was also recorded as pain response. If animal moved or walked, the pain response was not recorded and the test was repeated. In the test, 4.31 (2 g) was used firstly. If animal responded to pain, the test fiber with lower strength was used in next test; if the animal did not respond to pain, test fiber with higher strength was used in next test. The maximum strength of tested fiber was 5.18 (15 g).

Mechanical hyperalgesia was expressed as paw withdrawal threshold (PWT) in rat behavioral test, which was calculated with the following formula:

50% response threshold (g)=$(10^{(Xf+k)})$/10,000;

Xf=the final test fiber value used in the test;
k=table value;
=mean difference

Excel software was used to collect data, and Prism 6.01(Graph pad software, Inc.) software was used to analyze data. The higher the paw withdrawal threshold (PWT) was, the stronger the analgesic effect of the compound was.

Experimental Result

Figure 6:
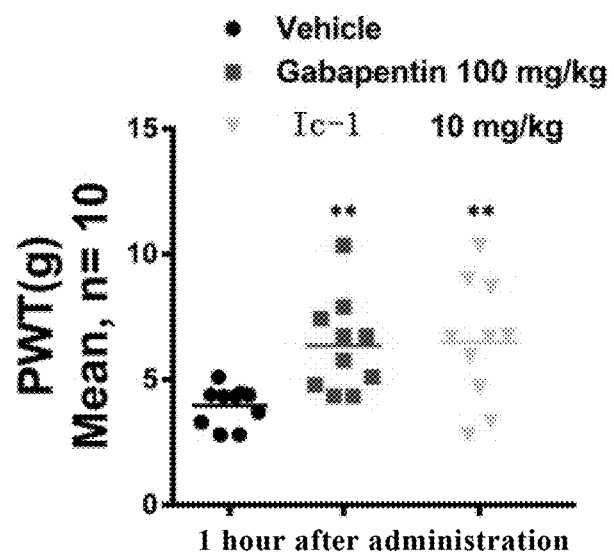
FIG. 6 shows the results of analgesic activity of compound Ic-1 and gabapentin in the SNL model in rats.

The results of analgesic activity in the SNL model in rat were shown in Table 6 and FIG. 6.

TABLE 6

Statistical data of paw withdrawal threshold (PWT) of the compound Ic-1 and gabapentin 1 hour after administration in the SNL model in rats

| Compound | Dose | PWT(g) |
|---|---|---|
| Control group | | 3.967 ± 0.775 |
| Compound Ic-1 | 10 mg/kg | 7.869 ± 2.846 |
| Gabapentin | 100 mg/kg | 6.352 ± 1.897 |

Table 6 and FIG. 6 showed that, compared with the saline control group, the compound $I_C$-1 of the present invention had very potent analgesic effect at a dosage of 10 mg/kg with a significant difference. Compared with the positive control group, the analgesic activity of compound Ic-1 of the present invention was comparable to that of 100 mg/kg gabapentin 1 h after administration. The SNL model in rats is a classical model for evaluating the efficacy of drug in the treatment of nerve pain. Therefore, the compound $I_C$-1 of the present invention has excellent therapeutic effect on nerve pain.

Example 22

Evaluation of Therapeutic Effect of Compound $I_C$-1 Prepared in Example 1 on Acute Pain and Inflammatory Pain in Formalin Pain Model in Mice Experimental Method 100 male C57BL/6 mice (9-week aged) were randomly divided into 10 groups to evaluate analgesic activity of two compounds in the formalin pain model in mice, and each group had 10 mice. The experimental groups were duloxetine group and the compound $I_C$-1 group (the compound prepared in Example 1), respectively. Before the start of experiment, the mice were allowed to adapt experimental environment for 72 h with free feeding and drinking water. The test drugs were administrated intraperitoneally, and the dosage was as follows:

Duloxetine groups: blank vehicle (blank saline control), 1 mg/kg, 5 mg/kg, 10 mg/kg and 20 mg/kg;
Compound $I_C$-1 groups: blank vehicle (blank saline control, same as that in Duloxetine group), 0.1 mg/kg, 0.5 mg/kg, 1 mg/kg, 5 mg/kg and 10 mg/kg.

After administration, the mice were placed in a transparent, ventilated plexiglass cylinder, and 1 h later, 20 μl of 4% formalin solution was injected into the left hind plantar of mice in each group by micro-injector, and paw pain response in mice was recorded in real time by a mini-camera. The time length of licking left paw was used as an indicator of pain response, licking time in 0-10 min (phase I) and 10-60 min (phase II) was observed and recorded, and the statistical analysis was conducted. The half effective dose (EDso) of three compounds was calculated: EDso referred to the dose of the drug that decreased licking time by half as compared with the blank control group. The less the $ED_{50}$ value was, the lower the effective analgesic dose of the compound was and the stronger the analgesic effect was.

Experimental Results

Figure 7:
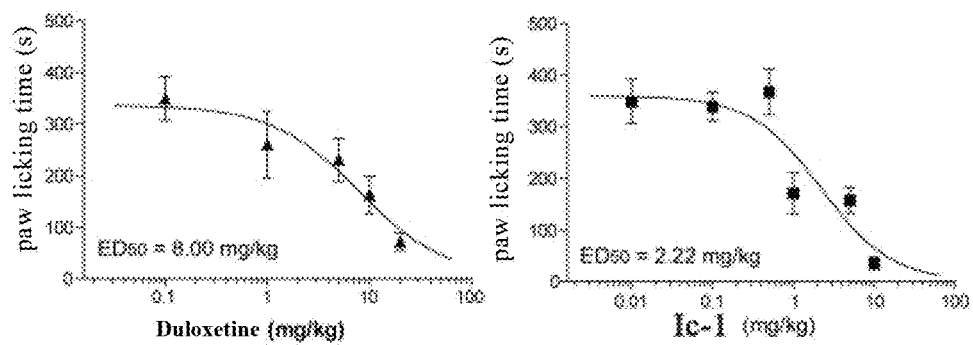
FIG. 7 shows the statistical results of the time of licking claw in the phase II (10-60 min) of compound Ic-1 and duloxetine with different administration doses in the formalin model in mice.

The paw licking time statistical results of compound $I_C$-1 and duloxetine in the formalin model in mice at different dosages in 10-60 min were shown in Table 7 and FIG. 7.

TABLE 7 paw licking time statistical results of compound Ic-1 and duloxetine at different dosages in the formalin model in mice (Phase II, 10-60 min)

| | paw licking time(s) | |
|---|---|---|
| Dose | Duloxetine | Compound Ic-1 |
| Blank Vehicle | 349.55 ± 43.09 | 349.55 ± 43.09 |
| 0.1 mg/kg | — | 339.35 ± 27.90 |
| 0.5 mg/kg | — | 368.16 ± 44.46 |
| 1 mg/kg | 259.97 ± 64.44 | 171.57 ± 39.69 |
| 5 mg/kg | 230.49 ± 41.31 | 158.02 ± 25.18 |
| 10 mg/kg | 162.83 ± 36.27 | 35.68 ± 11.77 |
| 20 mg/kg | 72.27 ± 17.29 | — |

Table 7 and FIG. 7 showed that the paw licking time of compound $I_C$-1 of the present invention in phase II (10-60 min) at a dosage of 1 mg/kg had decreased by more than 50% as compared with that of blank vehicle. The analgesic effect (EDso) in phase II pain was 2.22 mg/kg, while the EDso of duloxetine in phase II pain was 8.00 mg/kg. The analgesic activity of compound $I_C$-1 of the present invention was significantly stronger than that of duloxetine at the same dosage. From the above data, it could be seen that the compound $I_C$-1 of the present invention showed very strong analgesic activity in the formalin pain model in mice. The formalin model in mice is a classical model for evaluating drug effect on acute pain and inflammatory pain. Therefore, the compound $I_C$-1 of the present invention has excellent therapeutic effect on acute pain and inflammatory pain.

Example 23

Crystal Forms of Salt of the Compound of Formula $I_C$-1 Prepared in Example 1

XRPD: X-ray powder diffraction: DSC: Differential scanning calorimetry; TGA: Thermogravimetric analysis; DVS: Dynamic moisture adsorption;

X-ray powder diffraction analysis: PANalytical X-ray powder diffraction analyzer, working voltage: 45 kV, working current: 40 mA, X-ray powder diffraction patterns were obtained using a Cu target.

Differential scanning calorimetry (DSC) analysis: the instrument is a TA Q2000/Discovery DSC2500; scanning speed: 10° C./min; protective gas, nitrogen.

Thermogravimetric analysis (TGA) analysis: the instrument is a TA Q5000/Discovery TGA5500; scanning speed: 10° C./min; protective gas, nitrogen.

Dynamic moisture adsorption (DVS) analysis: the instrument is a DVS Intrinsic produced by SMS company (Surface Measurement Systems); temperature, 25° C.; carrier gas, flow rate: nitrogen, 200 ml/min; mass change per unit time: 0.002%/min: relative humidity range: 0/oRH-95% RH.

Nuclear magnetic resonance analysis: the instrument is a Bruker 400M nuclear magnetic resonance spectrometer.

The purity of High performance liquid chromatography (HPLC) was collected on an Agilent 1260 high performance liquid chromatograph.

Ion Chromatography (IC) testing of counter ions to determine molar ratios was collected on a Thermo ICS1100.

The compound of formula $I_C$-1 prepared in Example 1 is an oily substance. In order to obtain the solid form of the compound of formula $I_C$-1 and overcome the difficulty in pharmaceutical processing caused by the oily substance of the compound formula $I_C$-1, the inventors tested the salt formation of the compound of formula $I_C$-1 with hydrochloric acid, sulfuric acid, L-aspartic acid, maleic acid. L-pyroglutamic acid, phosphoric acid. L-glutamic acid, mucic acid, L-(+)-tartaric acid, fumaric acid, citric acid, D-glucuronic acid, L-(−)-malic acid, hippuric acid, D-gluconic acid, glycolic acid, lactic acid, L-ascorbic acid, succinic acid, adipic acid, lauric acid, methanesulfonic acid, oxalic acid, malonic acid, benzoic acid. S—(+)-mandelic acid by means of suspension and stirring. The results showed that most of the salts formed by acid ligands are oily or colloidal, while hydrochloric acid, maleic acid, oxalic acid, mucic acid, fumaric acid and D-glucuronic acid formed solid crystals, and the six crystalline salts obtained by screening were further characterized by TGA, DSC, HPLC, IC or $^1$H NMR. Characterization of the Free Base of the Compound of Formula $I_C$-1:

The free base of the compound of formula Ic-1 was used as the starting material to obtain other salt forms. The free base of the compound of formula Ic-1 was an oily substance, and the solubility of the free base of the compound of formula Ic-1 in 11 common solvents was tested at room temperature. In the experiment, about 2 mg of compound Ic-1 oily sample was weighed into a 3-ml vial, and then the corresponding solvent was gradually added (50, 50, 200, 700 μLL) and shaken until the solution was clear. If the sample was still not dissolved after adding the solvent to 1 ml, the solvent was not added any more. The rough solubility range calculated according to the mass of the solid sample, the volume of the added solvent and the observed dissolution phenomenon was shown in Table 8. This data provides a reference for the selection of the solvent in the screening experiment.

TABLE 8

Solubility of free compound Ic-1 in different solvents

| Solvent | Solubility (mg/mL) | Solvent (v:v) | Solubility (mg/mL) |
| --- | --- | --- | --- |
| Water | S < 2.0 | Ethyl acetate | S > 36.0 |
| n-Heptane | 7.6 < S < 23.0 | Tetrahydrofuran | S > 40.0 |
| Methanol | S > 38.0 | Dimethyl sulfoxide | S > 38.0 |
| Ethanol | S > 42.0 | Methyl isobutyl ketone | S > 42.0 |
| Acetone | S > 46.0 | Methanol:Water (1:1) | S > 38.0 |
| Acetonitrile | S > 54.0 | | |

The Preparation Method of the Crystal Form a of the Hydrochloride Salt of the Compound of Formula $I_C$-1:

292 g of the free base of compound of formula $I_C$-1 was weighed and added into 4.4 liters of ethyl acetate solution, the mixture was stirred, cooled down to 5-15° C. in an ice-water bath. Concentrated hydrochloric acid (37%) was slowly dripped, the pH of the system was adjusted to 7, the mixture was stirred and reacted for 5 minutes, and the solid was precipitated, filtered. The filter cake was washed with ethyl acetate, placed in an oven (40-45° C.) and dried to constant weight to obtain 193 g of hydrochloride crystal with a yield of 58.88%.

The X-ray powder diffraction data of the crystal form A of the hydrochloride salt of the compound of formula $I_C$-1 obtained in this example is shown in Table 9, the XRPD pattern is shown in FIG. 8, and the TGA/DSC overlay patterns are shown in FIG. 9.

TABLE 9

| 2θ | d value | Relative intensity % |
| --- | --- | --- |
| 10.09 | 8.76 | 52.42 |
| 11.25 | 7.87 | 12.51 |
| 16.85 | 5.26 | 75.73 |
| 18.27 | 4.86 | 100.00 |
| 21.27 | 4.18 | 82.46 |
| 21.84 | 4.07 | 31.52 |
| 22.20 | 4.00 | 71.08 |
| 22.89 | 3.88 | 83.32 |
| 23.86 | 3.73 | 57.43 |
| 25.40 | 3.51 | 39.30 |
| 26.76 | 3.33 | 25.94 |
| 28.18 | 3.17 | 36.31 |
| 28.75 | 3.11 | 25.68 |
| 32.57 | 2.75 | 10.18 |

As can be seen from FIG. 9, the differential scanning calorimetry analysis pattern shows that the crystal form A of the hydrochloride salt of the compound of formula $I_C$-1 begins to appear endothermic peak upon being heated to around 141.8° C., and the thermogravimetric analysis pattern shows that the crystal form A has a weight loss of about 1.1% upon being heated to 120° C.

Figure 10:
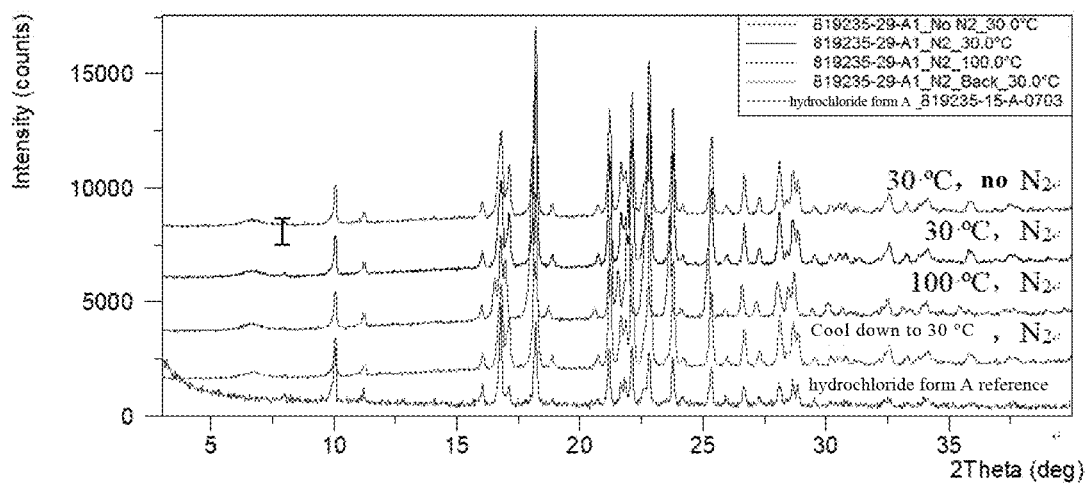
FIG. 10 is comparison patterns of the variable temperature XRPD of the crystal form A of hydrochloride salt of the compound of formula Ic-1.

The variable temperature XRPD test results of the crystal form A of the hydrochloride salt are shown in FIG. 10. The crystal form A of the hydrochloride salt was purged with nitrogen and heated to a high temperature and cooled to 30° C. under nitrogen protection, and no change of crystal form was observed, indicating that the crystal form A of the hydrochloride salt is an anhydrous crystal form. Further HPLC/IC results showed that the molar ratio of free base/acid is 1:1.

The Preparation Method of the Crystal Form B of the Maleate Salt of the Compound of Formula Ic-1:

1) 298.7 mg of compound $I_C$-1 free base and 124.7 mg of maleic acid were weighed and added into a 20 mL glass vial.

2) 15 ml of ethyl acetate was added to form a suspension, which was placed on a magnetic stirrer at room temperature and stirred at a rate of 750 rpm for 6 days.

3) The suspension was suction-filtered, and vacuum-dried at room temperature to collect about 224.2 mg of solid with a yield of 53.0%.

The X-ray powder diffraction data of crystal form B of the maleate salt of the compound of formula $I_C$-1 obtained in this example is shown in Table 10, the XRPD pattern is shown in FIG. 11, and the TGA/DSC overlay patterns are shown in FIG. 12.

TABLE 10

| 2θ | d value | Relative intensity % |
|---|---|---|
| 9.70 | 9.12 | 15.51 |
| 11.83 | 7.48 | 18.79 |
| 15.22 | 5.82 | 10.21 |
| 16.30 | 5.44 | 13.25 |
| 18.23 | 4.87 | 14.69 |
| 18.82 | 4.72 | 11.41 |
| 19.23 | 4.61 | 72.02 |
| 19.56 | 4.54 | 37.68 |
| 21.15 | 4.20 | 8.57 |
| 21.83 | 4.07 | 1.84 |
| 23.60 | 3.77 | 12.70 |
| 24.04 | 3.70 | 100.00 |
| 24.70 | 3.60 | 42.79 |
| 24.93 | 3.57 | 15.64 |
| 26.35 | 3.38 | 12.47 |
| 28.15 | 3.17 | 24.14 |
| 28.94 | 3.09 | 9.61 |
| 32.59 | 2.75 | 3.74 |
| 33.31 | 2.69 | 3.29 |
| 34.74 | 2.58 | 2.77 |
| 35.94 | 2.50 | 1.13 |
| 38.18 | 2.36 | 1.62 |

Figure 13:
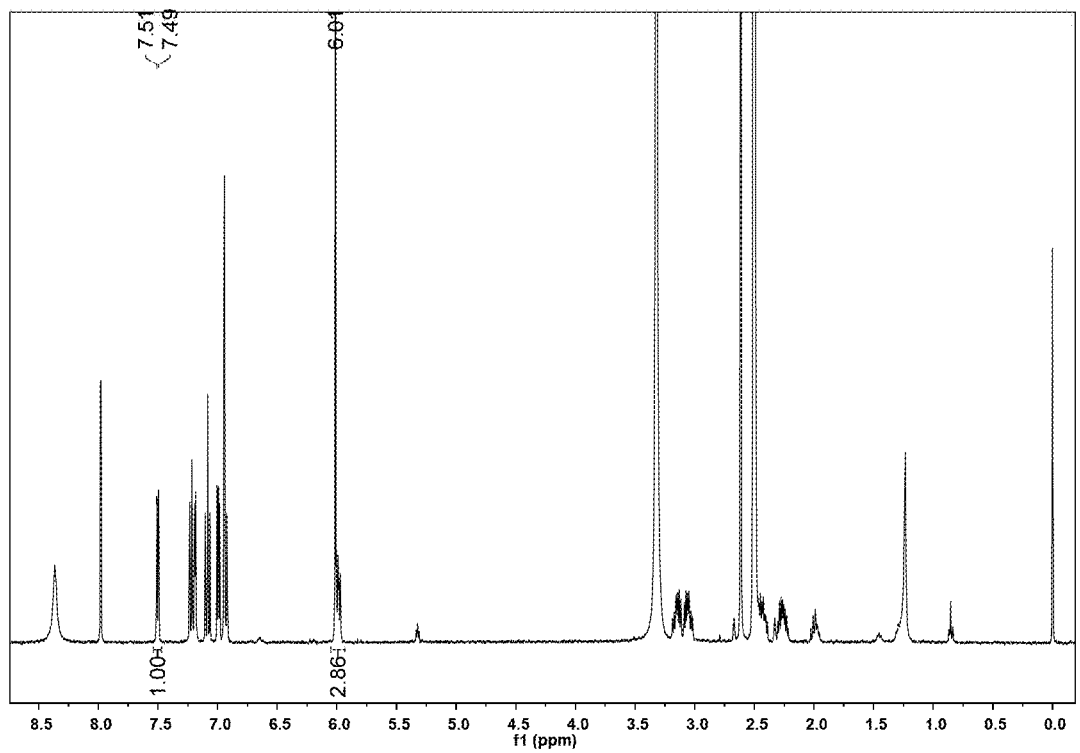
FIG. 13 is a $^1$H NMR spectrum of the crystal form B of maleate salt of the compound of formula Ic-1.
Figure 14:
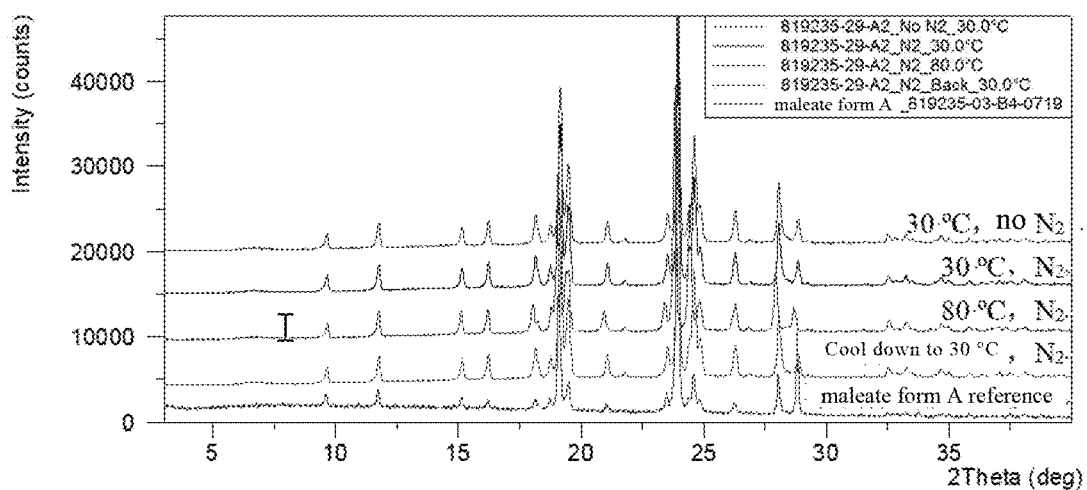
FIG. 14 is comparison patterns of the variable temperature XRPD of the crystal form B of maleate salt of the compound of formula Ic-1.

As can be seen from FIG. 12, the differential scanning calorimetry analysis pattern shows that the crystal form B of the maleate salt of the compound of formula $I_C$-1 begins to appear endothermic peak upon being heated to around 105.8° C., and the thermogravimetric analysis pattern shows that the crystal form B has a weight loss of about 0.8% upon being heated to 80° C. The $^1$H NMR spectrum of the crystal form B of the maleate salt of the compound of formula $I_C$-1 is shown in FIG. 13, and the result shows that the molar ratio of free base/acid is 1:1. The variable temperature XRPD test results of the crystal form B of the maleate salt are shown in FIG. 14. No change of crystal form was observed after the crystal form B of the maleate salt was purged with nitrogen and heated to 80° C. under nitrogen protection, indicating that the crystal form B of the maleate is an anhydrous crystal form.

The Preparation Method of Crystal Form C of the Oxalate Salt of the Compound of Formula Ic-1:

1) 30±0.2 mg of free base of the compound of formula $I_C$-1 and 94.2 mg of oxalic acid were weighed and added into a 20-mL glass vial.
2) 15 ml of ethyl acetate was added to form a suspension, which was placed on a magnetic stirrer at room temperature and stirred at a rate of 750 rpm for 6 days.
3) The suspension was suction-filtered, vacuum-dried at room temperature and collected to obtain about 309.5 mg of solid with a yield of 78.5%.

The X-ray powder diffraction data of crystal form C of the oxalate salt of the compound of formula $I_C$-1 obtained in this example is shown in Table 11, the XRPD pattern is shown in FIG. 15, and the TGA/DSC overlay patterns are shown in FIG. 16.

TABLE 11

| 2θ | d value | Relative intensity % |
|---|---|---|
| 14.64 | 6.05 | 24.38 |
| 15.27 | 5.80 | 10.02 |
| 16.07 | 5.52 | 11.65 |
| 16.36 | 5.42 | 19.89 |
| 17.63 | 5.03 | 2.55 |
| 19.52 | 4.55 | 10.17 |
| 20.90 | 4.25 | 12.83 |
| 22.05 | 4.03 | 100.00 |
| 23.43 | 3.80 | 16.77 |
| 25.61 | 3.48 | 23.51 |

As can be seen from FIG. 16, the differential scanning calorimetry analysis pattern shows that the crystal form C of the compound of formula $I_C$-1 begins to appear endothermic peak upon being heated to around 152.2° C., and the thermogravimetric analysis pattern shows that the crystal form C has a weight loss of about 1.0% upon being heated to 100° C.

Figure 17:
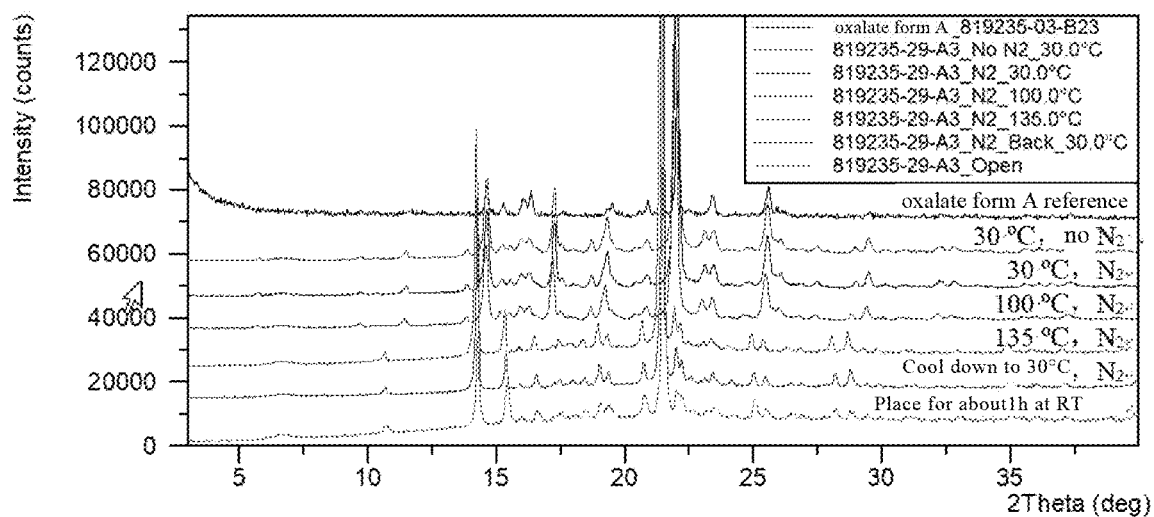
FIG. 17 is comparison patterns of the variable temperature XRPD of the crystal form C of the oxalate salt of the compound of formula Ic-1.

The HPLC/IC results showed that the molar ratio of free base/acid in this sample was 1:1. The variable temperature XRPD test results of crystal form C of the oxalate salt are shown in FIG. 17. No change of crystal form was observed after the crystal form C of the oxalate salt was purged with nitrogen and heated to 100° C. under nitrogen protection.

The Preparation Method of the Crystal Form D of Mucate Salt of the Compound of Formula Ic-1:

1). About 7.4 mg of mucic acid was weighed and added into an HPLC vial, after 0.5 mL of EtOAc stock solution (40 mg/mL) of the free compound sample of formula Ic-1 was added, the mixture was stirred magnetically at 50° C. for 2 days, After the solid was precipitated, it was separated by centrifugation and vacuum-dried at room temperature to obtain the crystal form D of mucate salt of the compound of formula $I_C$-1.

The X-ray powder diffraction data of the crystal form D of the mucate salt of the compound of formula $I_C$-1 obtained in this example is shown in Table 12, the XRPD pattern is shown in FIG. 18, and the TGA/DSC overlay patterns are shown in FIG. 19.

TABLE 12

| 2θ | d value | Relative intensity % |
|---|---|---|
| 3.79 | 23.30 | 40.31 |
| 11.28 | 7.84 | 100.00 |
| 14.21 | 6.23 | 3.82 |
| 15.81 | 5.61 | 39.14 |
| 16.97 | 5.23 | 14.93 |
| 17.71 | 5.01 | 8.72 |
| 19.48 | 4.56 | 87.36 |
| 20.98 | 4.23 | 18.69 |
| 23.91 | 3.72 | 21.51 |
| 25.88 | 3.44 | 10.60 |
| 27.16 | 3.28 | 3.35 |
| 28.40 | 3.14 | 10.06 |
| 29.49 | 3.03 | 5.70 |
| 30.74 | 2.91 | 6.11 |
| 32.33 | 2.77 | 3.19 |
| 34.50 | 2.60 | 3.87 |
| 35.42 | 2.53 | 3.41 |
| 36.16 | 2.48 | 2.23 |

As can be seen from FIG. 19, the differential scanning calorimetry analysis pattern shows that the crystal form D of the compound of formula $I_C$-1 begins to appear endothermic peak upon being heated to around 140.9° C., and the thermogravimetric analysis pattern shows that the crystal form D has a weight loss of about 1.45% upon being heated to 100° C.

Figure 20:
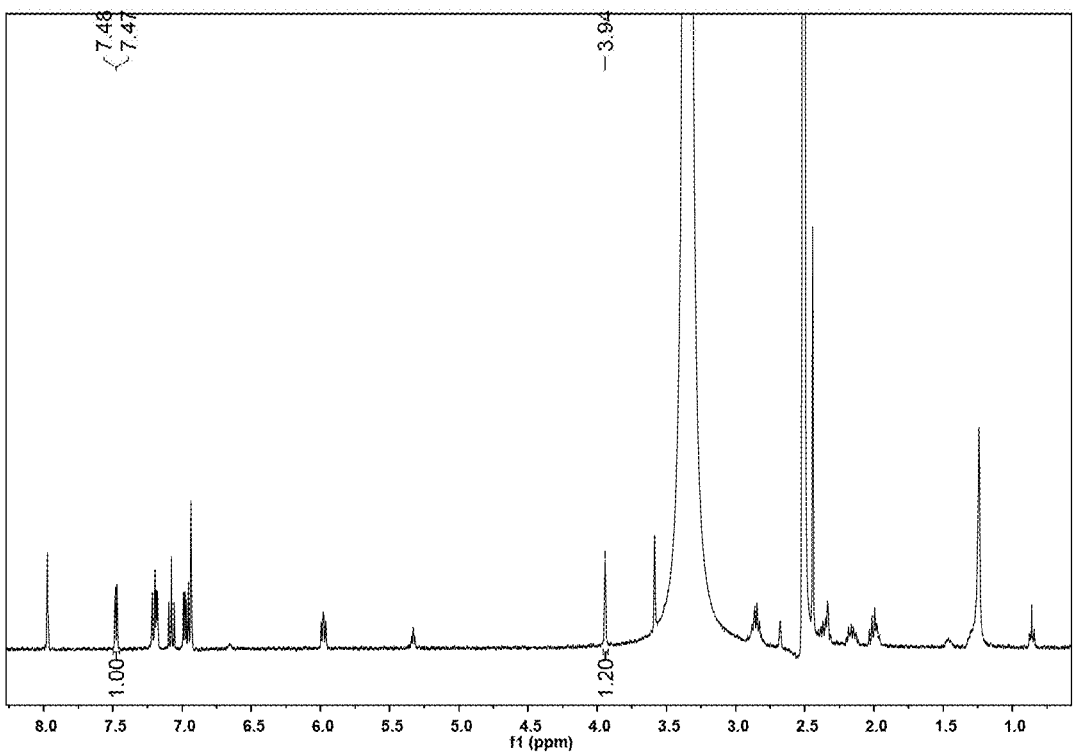
FIG. 20 is a $^1$H NMR spectrum of the crystal form D of the mucate salt of the compound of formula Ic-1.

The $^1$H NMR spectrum of the crystal form D of the mucate salt of the compound of formula $I_C$-1 is shown in FIG. 20, and the results show that the molar ratio of the free state to mucic acid in the sample is 2:1.

The Preparation Method of Crystal Form E of the Fumarate Salt of the Compound of Formula Ic-1:

1. About 8.3 mg of fumaric acid was weighed and added into an HPLC vial, after 0.5 mL of EtOAc stock solution (40 mg/mL) of the free compound sample of formula Ic-1 was added, the mixture was stirred magnetically at room temperature for about 4 days.

2. The solid was separated by centrifugation and then vacuum-dried at room temperature.

The X-ray powder diffraction data of the crystal form E obtained in this example are shown in Table 13, the XRPD pattern is shown in FIG. 21, and the TGA/DSC overlay patterns are shown in FIG. 22.

TABLE 13

| 2θ | d value | Relative intensity % |
| --- | --- | --- |
| 4.70 | 18.82 | 9.14 |
| 9.41 | 9.40 | 5.61 |
| 13.34 | 6.64 | 7.80 |
| 14.17 | 6.25 | 28.48 |
| 15.63 | 5.67 | 6.40 |
| 17.62 | 5.03 | 2.92 |
| 18.95 | 4.68 | 44.00 |
| 22.75 | 3.91 | 10.62 |
| 23.76 | 3.74 | 100.00 |
| 25.66 | 3.47 | 5.88 |
| 26.93 | 3.31 | 14.03 |
| 28.69 | 3.11 | 6.48 |
| 31.34 | 2.85 | 2.76 |

As can be seen from FIG. 22, the differential scanning calorimetry analysis pattern shows that the crystal form E of the compound of formula $I_C$-1 begins to appear endothermic peak upon being heated to around 76.5° C., and the thermogravimetric analysis pattern shows that the crystal form E has a weight loss of about 2.17% upon being heated to 80° C.

Figure 23:
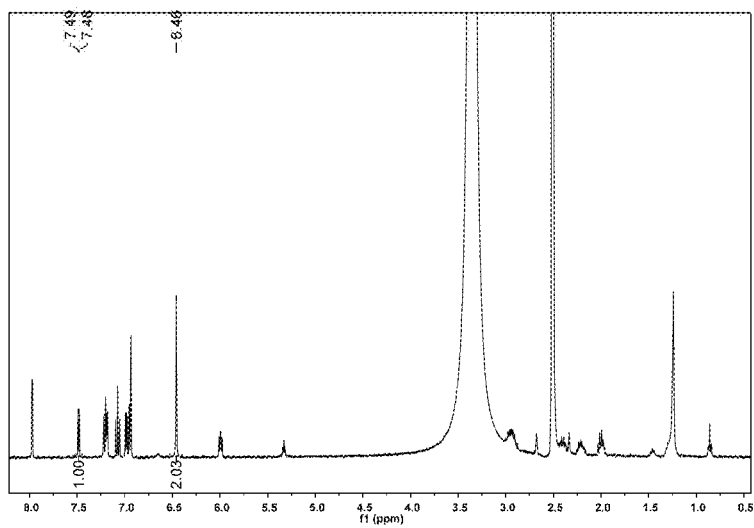
FIG. 23 is a $^1$H NMR spectrum of the crystal form E of the fumarate salt of the compound of formula Ic-1.

The $^1$H NMR spectrum of the crystal form E of the fumarate salt of the compound of formula Ic-1 is shown in FIG. 23, and the result shows that the molar ratio of the free state to fumaric acid in the sample is 1:1.

The Preparation Method of the Crystal Form F of the D-Glucuronate Salt the Compound of Formula Ic-1:

About 13.5 mg of D-glucuronic acid was weighed and added into an HPLC vial, after 0.5 mL of the acetonitrile stock solution (40 mg/mL) of the free compound Ic-1 was added, the mixture was stirred magnetically at room temperature for about 4 days, then the solid was separated by centrifugation and then vacuum-dried at room temperature.

The X-ray powder diffraction data of the crystal form F obtained in this example are shown in Table 14, the XRPD pattern is shown in FIG. 24, and the TGA/DSC overlay patterns are shown in FIG. 25.

TABLE 14

| 2θ | d value | Relative intensity % |
| --- | --- | --- |
| 4.77 | 18.52 | 100.00 |
| 8.34 | 10.60 | 54.57 |
| 10.87 | 8.14 | 46.79 |
| 16.13 | 5.49 | 97.98 |
| 17.54 | 5.06 | 55.33 |
| 19.53 | 4.55 | 74.17 |
| 20.06 | 4.43 | 60.75 |
| 21.25 | 4.18 | 44.80 |
| 23.42 | 3.80 | 29.68 |
| 25.93 | 3.44 | 31.65 |

As can be seen from FIG. 25, the differential scanning calorimetry analysis pattern shows that the crystal form F of the compound of formula $I_C$-1 begins to appear endothermic peak upon being heated to around 119.1° C., and the thermogravimetric analysis pattern shows that the crystal form F has a weight loss of about 2.71% upon being heated to 100° C.

Example 24

This example investigates the properties of the crystal forms of salt of the compound of formula $I_C$-1 prepared in Example 23.

Figure 26:
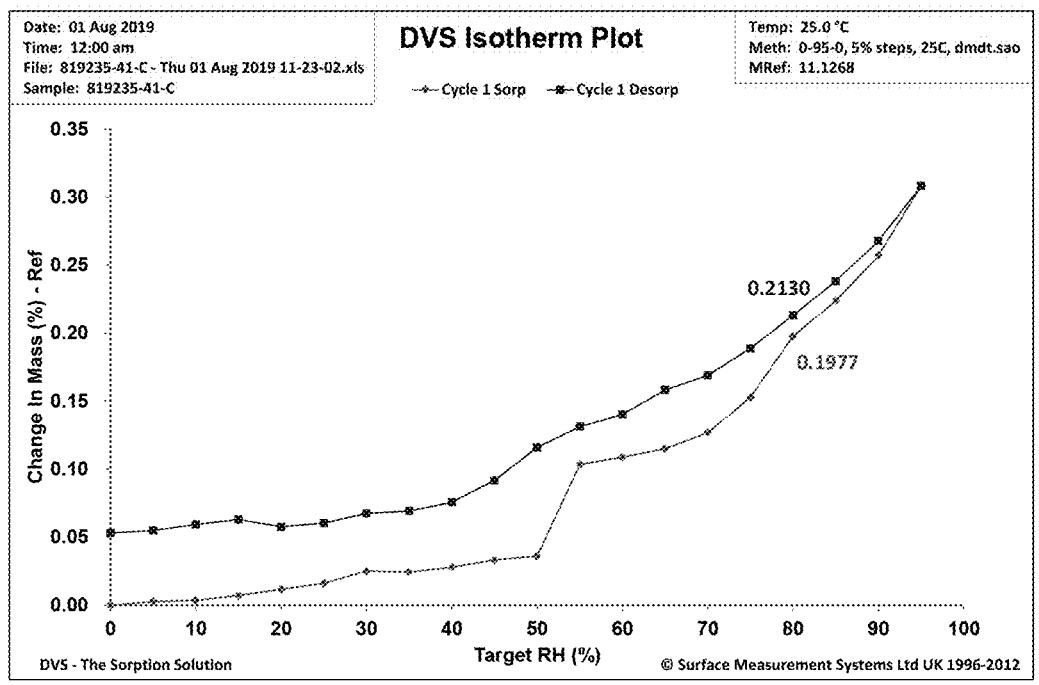
FIG. 26 is DVS pattern of the crystal form A of hydrochloride salt of the compound of formula Ic-1.
Figure 27:
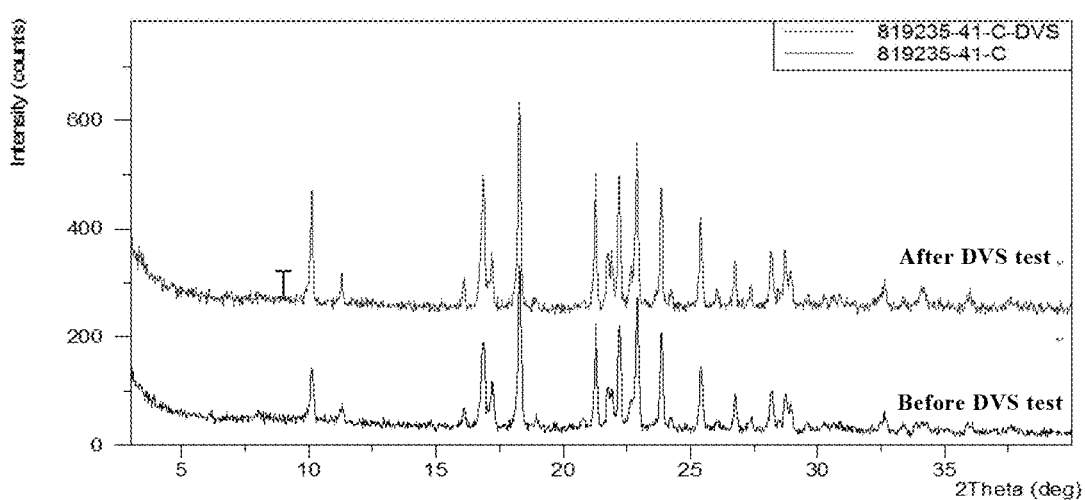
FIG. 27 is the comparison patterns of XRPD of the crystal form A of hydrochloride salt of the compound of formula Ic-1 before and after the DVS test.
Figure 28:
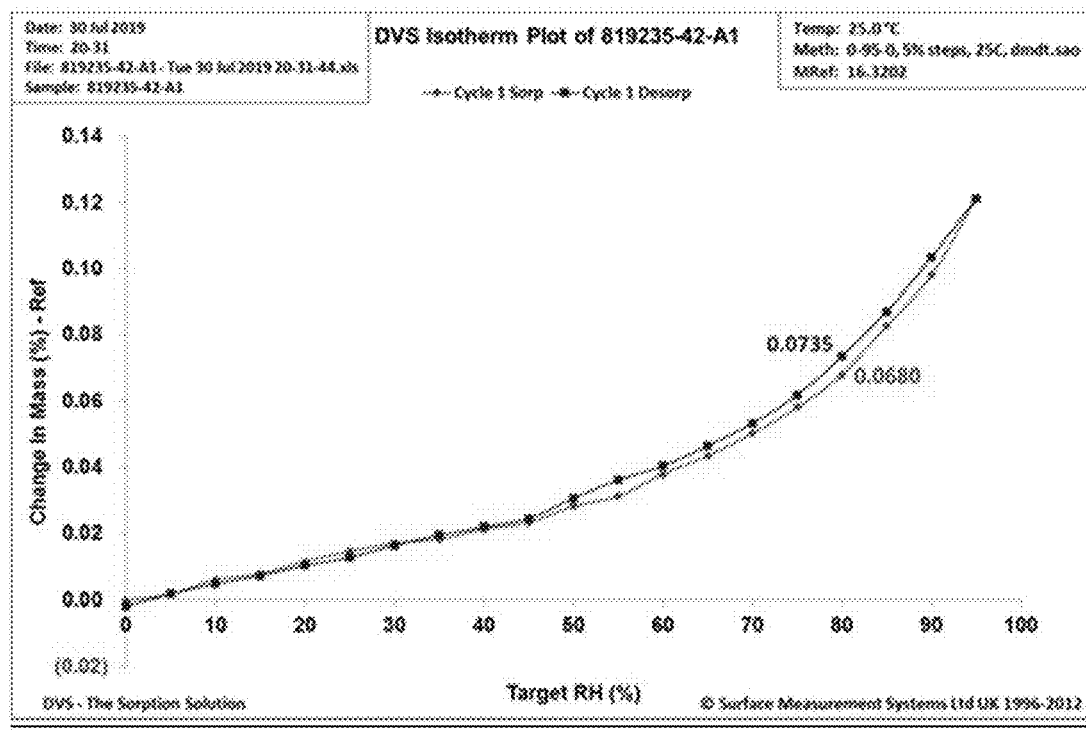
FIG. 28 is DVS pattern of the crystal form B of maleate salt of the compound of formula Ic-1.
Figure 29:
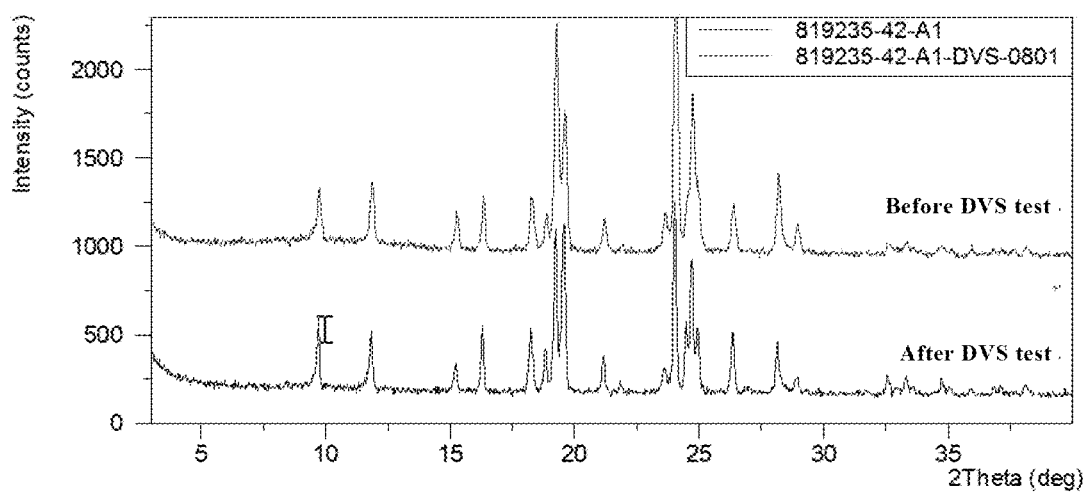
FIG. 29 is the comparison patterns of XRPD of the crystal form B of maleate salt of the compound of formula Ic-1 before and after the DVS test.

Hygroscopicity Test of the Crystal Form A of the Hydrochloride Salt and Crystal Form B of the Maleate Salt of the Compound of Formula Ic-1:

Dynamic moisture absorption (DVS) was used to test their hygroscopicity. The results are shown in FIG. 26 and FIG. 28. The weight change of the crystal form A of the hydrochloride salt and crystal form B of the maleate salt at 25° C./80RH is less than 0.2%, indicating that none of them is hygroscopic, the salt forms are easy for storage, and they do not need to be stored in dry conditions (see 2015 edition of the Chinese Pharmacopoeia (Guidelines for Drug Hygroscopicity Test)). Further XPRD test showed that, as shown in FIG. 27 and FIG. 29, no change in crystal form was observed before and after the DVS test for the crystal form A of the hydrochloride salt and crystal form B of the maleate salt, indicating that the crystal form A of the hydrochloride salt and the crystal form B of the maleate salt of the compound of formula $I_C$-1 are stable in high humidity environment.

Dynamic Solubility of the Crystal Form a of the Hydrochloride Salt and the Crystal Form B of the Maleate Salt of the Compound of Formula Ic-1:

The crystal form A of the hydrochloride salt and the crystal form B of the maleate salt of the compound of formula $I_C$-1 were prepared into saturated solution with pH 1.9 SGF (simulated gastric fluid), pH 6.5 FaSSIF (simulated artificial intestinal fluid in fasting state), or pH 5.0 FeSSIF (simulated artificial intestinal fluid in feeding state) and water respectively, and then the dynamic solubility at 37° C. was tested. In the experiment, the initial dosage of crystal form A of the hydrochloride salt in $H_2O$, SGF, and FaSSIF was about 20 mg/mL, and the initial dosage in FeSSIF was about 40 mg/mL. The initial dosage of crystal form B of the maleate salt in $H_2O$, SGF, FaSSIF and FeSSIF was about 10 mg/mL. The samples were sealed and mounted on a rotating disk rotating at 25 rpm, and the rotating disk was placed in a 37° C. incubator. Samples were taken at time points 1, 4 and 24 hours of equilibration, and the filtrate was separated and tested concentration by HPLC. The results are shown in Table 15.

TABLE 15

| | Placing time | Water Form A | Water Form B | SGF Form A | SGF Form B | FaSSIF Form A | FaSSIF Form B | FeSSIF Form A | FeSSIF Form B |
|---|---|---|---|---|---|---|---|---|---|
| solubility (mg/mL) | 1 hour | 16.7 | 7.2 | 16.5 | 6.9 | 20.2 | 7.1 | 32.8 | 4.7 |
| | 4 hours | 17.7 | 7.1 | 14.8 | 4.6 | 20.7 | 6.9 | 36.8 | 5.2 |
| | 24 hours | 17.3 | 8.0 | 11.1 | 4.9 | 20.8 | 7.2 | 39.4 | 5.3 |

It can be seen that the crystal form A of the hydrochloride salt and the crystal form B of the maleate salt of the compound of formula $I_C$-1 have excellent solubility, and meanwhile, the solubility in water is significantly higher than that of free compound $I_C$-1, which is beneficial to improve the absorption and druggability of drug.

Figure 30:
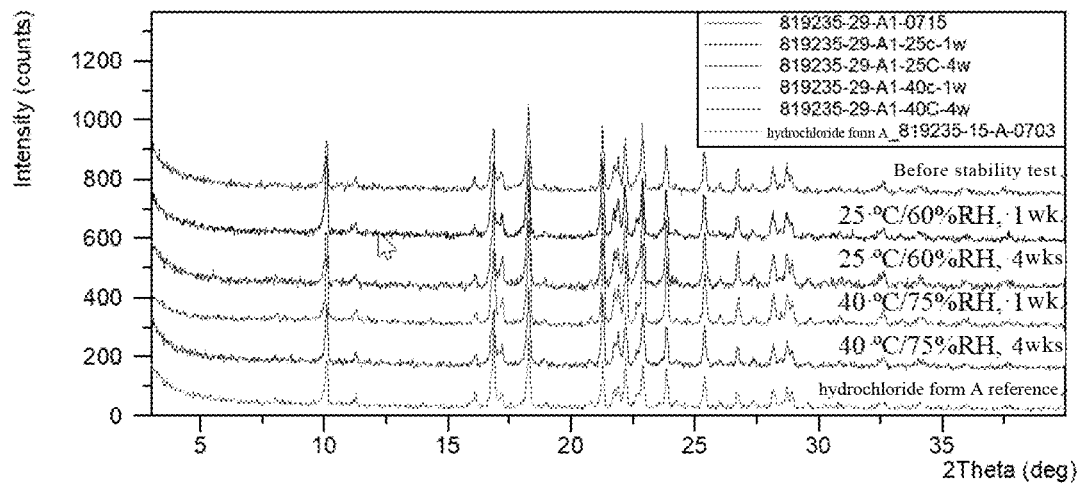
FIG. 30 is the comparison patterns of XRPD of the crystal form A of hydrochloride salt of the compound of formula Ic-1 before and after the stability test.
Figure 31:
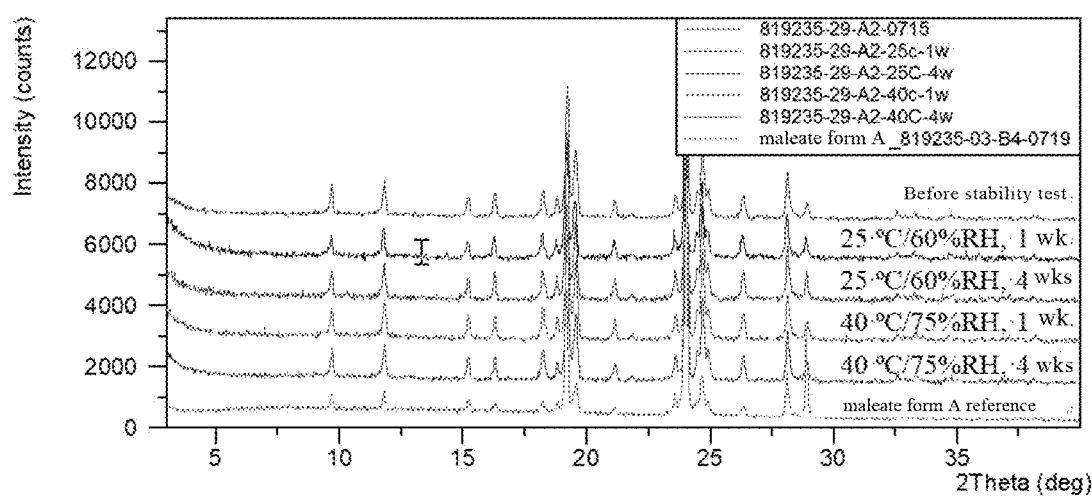
FIG. 31 is the comparison patterns of XRPD of the crystal form B of maleate salt of the compound of formula Ic-1 before and after the stability test.

Solid-State Stability Study of the Crystal Form A of the Hydrochloride Salt and the Crystal Form B of the Maleate Salt of the Compound of Formula Ic-1:

About 10 mg of the crystal form A of the hydrochloride salt of the compound of formula $I_C$-1 and the crystal form B of the maleate salt of the compound of formula $I_C$-1 were weighed and added to the HPLC vial, respectively, the bottleneck was sealed with a sealing film, and 10 small holes were made on the film. The vial was placed in 25° C./60% RH and 40° C./75% RH environment for 4 weeks, samples were taken in the 1st week and the 4th week respectively, the purity (by HPLC analysis) and crystal form (by X ray powder diffraction analysis) of the sample were investigated. After the crystals of the two salt forms were placed for 1 week and 4 weeks, the HPLC (high performance liquid chromatography) purity did not decrease significantly, and no change in the crystal form was observed, and the physical and chemical stability was good. Comparative XRPD patterns of the stability samples before and after placement are shown in FIGS. 30 to 31.

TABLE 16

| Crystal form | Initial purity (area %) | Experiment time | 25° C./60% RH Purity (area %) | 25° C./60% RH Crystalline change | 40° C./75% RH Purity (area %) | 40° C./75% RH Crystalline change |
|---|---|---|---|---|---|---|
| crystal form A of the hydrochloride salt | 100 | 1 week | 100 | None | 100 | None |
| | | 4 weeks | 100 | | 100 | |
| crystal form B of the maleate salt | 100 | 1 week | 100 | | 100 | |
| | | 4 weeks | 100 | | 100 | |

Equilibrium Solubility Test of the Crystal Form a of the Hydrochloride Salt of the Compound of Formula Ic-1 in Water The crystal form A of the hydrochloride salt of the compound of formula Ic-1 was tested for equilibrium solubility in water for 24 hours at room temperature. The form A was dosed with about 300 mg/mL solid feed, and magnetic stirred (750 rpm) in water for 24 hours to obtain a suspension. After centrifugation, the supernatant was filtered through a 0.22-μm PTFE membrane and then tested by HPLC, and the obtained solid was tested by XRPD. The results showed that the solid crystal form did not change after the equilibrium solubility test. The solubility of crystal form A of the hydrochloride salt in water is 21±0.5 mg/mL (which is concentration of free state, converted to hydrochloride concentration is 237.3 mg/mL).

Example 25

This Example Investigates the Absolute Configuration of the Crystal Form a of the Hydrochloride Salt of the Compound of Formula $I_C$-1 Prepared in Example 23

Figure 32:
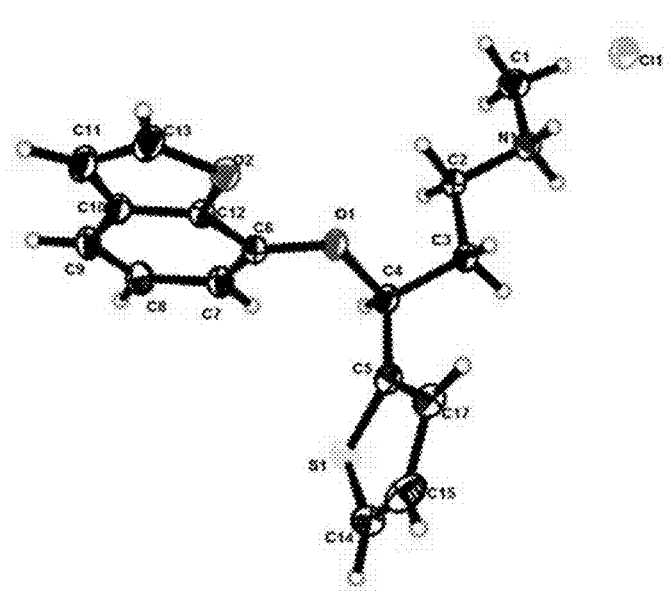
FIG. 32 is a single crystal diffraction pattern of the crystal form A of hydrochloride salt of the compound of formula Ic-1.

Testing instrument: D8 Venture
Instrument model: D8 Venture
Instrument parameters:
Light source: Mo target X-ray: Mo-Kα(=0.71073 Å)
Detector: CMOS area detector Resolution: 0.80 Å
Current voltage: 50 kV, 1.4 Å Exposure time: 3 s
Distance from area detector to sample: 40 mm Test temperature: 173(2)K
Process of structure analysis and refinement:

After the diffraction data were integrated and reduced by the SAINT program, the data were subjected to empirical absorption correction by the SADABS program; the single crystal structure was analyzed by the direct method using SHELXT2014, and the structure was refined by the least square method, the hydrogen atom refinement process was obtained by isotropic calculation, hydrogen atoms on N were obtained by residual electron density, and hydrogen atoms on C—H were obtained by computational hydrogenation and were refined by riding model. The Flack constant is −0.09 (5), and the chiral center C4 of crystal form A of the hydrochloride salt of the compound of formula $I_C$-1 prepared in Example 23 can be confirmed to be S configuration (as shown in FIG. 32).

Example 26

Manual Patch Clamp Detection of the Effect of the Compound of Formula Ic-1 Prepared in Example 1 on TRPM8, TRPV1 and TRPV4 Channels
(1) Culture and Process of Cells TRPM8 cells were cultured in a cell culture dish with a diameter of 35 mm, placed in an incubator in 5% $CO_2$ at 37° C., and passaged at a ratio of 1:5 every 48 hours. The formula of medium was 90% DMEM (Invitrogen), 10% fetal bovine serum (Gibco), 2 mM L-glutamine, 50 μg/mL Hygromycin B (Invitrogen) and 5 μg/mL Blasticidine HCl (Invitrogen). Before electrophysiological patch clamp experiment, the cell culture medium was replaced with medium containing 1 µg/mL doxycycline for at least 16 hours to induce TRPM8 expression.

TRPV1 cells were cultured in a cell culture dish with a diameter of 35 mm, placed in a 37° C., 5% $CO_2$ incubator, and passaged at a ratio of 1:5 every 48 hours. Medium formula: 90% DMEM (Invitrogen), 10% Fetal bovine serum (Gibco). 2 mM L-glutamine, 50 µg/mL Hygromycin B (Invitrogen) and 5 µg/mL Blasticidine HCl (Invitrogen). Before electrophysiological patch clamp experiments, the cell culture medium was replaced with medium containing 1 µg/mL Doxycycline for at least 16 hours to induce the expression of TRPV1.

TRPV4 cells were cultured in a cell culture dish with a diameter of 35 mm, placed in an incubator in 5% $CO_2$ at 37° C., and passaged at a ratio of 1:5 every 48 hours. The formula of medium was 90% DMEM (Invitrogen), 10% fetal bovine serum (Gibco), 2 mM L-glutamine, 50 µg/mL Hygromycin B (Invitrogen) and 5 µg/mL Blasticidine HCl (Invitrogen). Before electrophysiological patch clamp experiment, the cell culture medium was replaced with medium containing 1 µg/mL doxycycline for at least 16 hours to induce the expression of TRPV4.

On the day of the experiment, the cell culture medium was aspirated, the cell were rinsed once with extracellular fluid, and then 0.25% Trypsin-EDTA (Invitrogen) solution was added, and digested at room temperature for 1-2 minutes. The digestion solution was aspirated, the cell were resuspended with extracellular fluid, and transferred to the experimental dish for electrophysiological recording for further experiment.

(2) Preparation of Compounds

Preparation of menthol: 100.00 mM of DMSO stock solution of menthol was added to the extracellular solution, diluting 1000-fold to 100.00 µM of menthol solution.

Preparation of AMTB: 5 µL of DMSO stock solution (20.00 mM) of AMTB was added to 4995 µL of menthol solution (100.00 uM), diluting 1000-fold to obtain the final concentration of 20.00 µM AMTB to be tested.

Preparation of Capsaicin: 1.00 mM of DMSO stock solution of Capsaicin was added to extracellular solution, diluting 1000-fold to 1.00 µM of Capsaicin solution.

Preparation of Capsazepine: 5 µL of DMSO stock solution of Capsazepine (10.00 mM) was added to 4995 µL of Capsaicin solution (1.00 µM), diluting 1000-fold to obtain the final concentration of 10.00 µM of Capsazepine solution to be tested.

Preparation of GSK1016790A: 30.00 µM of DMSO stock solution of GSK1016790A was added to extracellular solution, diluting 1000-fold to 30.00 nM of GSK1016790A solution.

Preparation of RR (Ruthenium Red): 20 µL of $ddH_2O$ stock solution of RR (10.00 mM) was taken and added to 4980 µL of GSK1016790A solution (30.00 nM), diluting 250-fold to obtain a final concentration of 40.00 µM of RR solution to be tested.

Preparation of $I_C$-1: 20.00 mM or 10.00 mM of stock solution of $I_C$-1 was taken and added to the agonist solution of the corresponding channel, diluting 1000 or 2000-fold to the final concentration of 10.00 µM of LDS solution to be tested.

The content of DMSO in the final test concentration did not exceed 0.2%, and this DMSO concentration had no effect on the channel current.

(3) Electrophysiological Recording Process

HEK293 cells stably expressing TRP channels, the corresponding agonist-induced channel current was recorded by whole-cell patch clamp technique at room temperature. The glass microelectrode was drawn from a glass electrode blank (BF150-86-10, Sutter) by a puller (P97, Sutter). The tip resistance after filling the electrode liquid was about 2-5 MΩ. The glass microelectrode was plugged in the amplifier probe to connect to the patch clamp amplifier. Clamp voltages and data recording were controlled and recorded by a computer using pClamp 11 software with the sampling frequency of 10 kHz and the filtering frequency of 2 kHz. After obtaining whole-cell recordings, the cells were clamped at 0 mV with a 300 ms ramp from −100 mV to ±100 mV. This voltage stimulation was applied every 2 s and the agonist-induced channel current was applied. After the current was evoked for more than 40 s and no attenuation was determined, the dosing process started. Each concentration tested was administrated for at least 20 s and at least 3 cells were tested per concentration (n≥3).

(4) Data Processing

Data analysis and processing used pClamp 11, GraphPad Prism 5 and Excel software. The degree of inhibition of TRP channel currents (current amplitudes evoked at ±100 mV) by different compound concentrations was calculated using the following formula:

$$\text{Inhibition \%} = [1 - (I/Io)] \times 100\%$$

Among them, Inhibition % represents the percentage of inhibition of the current by the compound, and I and Io represent the current amplitude after and before dosing, respectively.

(5) Test Results

In HEK293 cells stably expressing the TRPM8, TRPV1 and TRPV4 channels, the compound of formula $I_C$-1 at the concentration of 10.00 µM inhibited the currents of the three channels by 41.07%, 22.48% and 4.68%, respectively (less than 50% of inhibition percentage indicated that $IC_{50}$ of the compound to TRPM8 was greater than 10 µM), and the inhibition percentages of the corresponding positive compounds AMTB, Capsazepine and RR were all over 90%. From the above results, it can be found that compound Ic-1 is a TRPA1-specific inhibitor.

All documents mentioned herein are incorporated by reference in this application as if each document were individually incorporated by reference. In addition, it should be understood that after reading the above teaching content of the present invention, those skilled in the art can make various changes or modifications to the present invention, and these equivalent forms also fall within the scope defined by the appended claims of the present application.

The invention claimed is:

1. A crystal form of a salt of the compound of formula Ic-1

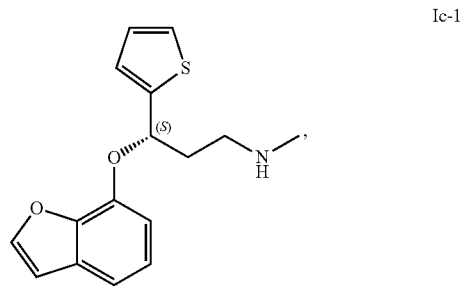

Ic-1 wherein the crystal form of the salt is selected from the group consisting of:

(a) a crystal form A of the hydrochloride salt of a compound of formula Ic-1,
wherein the X-ray powder diffraction pattern of the crystal form A of the hydrochloride salt has characteristic peaks at 2θ angles of 18.27±0.2°, 21.27±0.2°, and 22.89±0.2°;

(b) a crystal form B of the maleate salt of a compound of formula Ic-1,
wherein the X-ray powder diffraction pattern of the crystal form B of the maleate salt has characteristic peaks at 2θ angles of 19.23±0.2°, 24.04±0.2°, and 24.70±0.2°;

(c) a crystal form C of the oxalate salt of a compound of formula Ic-1,
wherein the X-ray powder diffraction pattern of the crystal form C of the oxalate salt has characteristic peaks at 2θ angles of 14.64±0.2°, 22.05±0.2°, and 25.61±0.2°;

(d) a crystal form D of the mucate salt of a compound of formula Ic-1,
wherein the X-ray powder diffraction pattern of the crystal form D of the mucate salt has characteristic peaks at 2θ angles of 3.79±0.2°, 11.28±0.2°, and 19.48±0.2°;

(e) a crystal form E of the fumarate salt of a compound of formula Ic-1,
wherein the X-ray powder diffraction pattern of the crystal form E of the fumarate salt has characteristic peaks at 2θ angles of 14.17±0.2°, 18.95±0.2°, and 23.76±0.2°;

(f) a crystal form F of the D-glucuronate salt of a compound of formula Ic-1,
wherein the X-ray powder diffraction pattern of the crystal form F of the D-glucuronate salt has characteristic peaks at 2θ angles of 4.77±0.2°, 16.13±0.2°, and 19.53±0.2°.

2. The crystal form of the salt according to claim 1, wherein the crystal form A of the hydrochloride salt has characteristic peaks at one or more 2θ values selected from the group consisting of 10.09±0.2°, 11.25±0.2°, 16.85±0.2°, 18.27±0.2°, 21.27±0.2°, 21.84±0.2°, 22.20±0.2°, 22.89±0.2°, 23.86±0.2°, 25.40±0.2°, 26.76±0.2°, 28.18±0.2°, 28.75±0.2°, and 32.57±0.2°.

3. The crystal form of the salt according to claim 1, wherein
the X-ray powder diffraction pattern of the crystal form A of the hydrochloride salt has characteristic peaks and peak intensities at 2θ values selected from the group consisting of:

| 2θ value | d value | relative intensity % |
|---|---|---|
| 10.09 | 8.76 | 52.42 |
| 11.25 | 7.87 | 12.51 |
| 16.85 | 5.26 | 75.73 |
| 18.27 | 4.86 | 100.00 |
| 21.27 | 4.18 | 82.46 |
| 21.84 | 4.07 | 31.52 |
| 22.20 | 4.00 | 71.08 |
| 22.89 | 3.88 | 83.32 |
| 23.86 | 3.73 | 57.43 |
| 25.40 | 3.51 | 39.30 |
| 26.76 | 3.33 | 25.94 |
| 28.18 | 3.17 | 36.31 |
| 28.75 | 3.11 | 25.68 |
| 32.57 | 2.75 | 10.18. |

4. The crystal form of the salt according to claim 1, wherein the crystal form A of the hydrochloride salt has characteristic peaks of X-ray powder diffraction substantially as shown in FIG. 8.

5. The crystal form of the salt according to claim 1, wherein the crystal form A of the hydrochloride salt of the compound Ic-1 has one or more features selected from the group consisting of:
the differential scanning calorimetry (DSC) pattern of the crystal form A of the hydrochloride salt begins to appear endothermic peak upon being heated to 141.8±5° C.;
the differential scanning calorimetry (DSC) pattern of the crystal form A of the hydrochloride salt is substantially as shown in FIG. 9;
the thermogravimetric analysis (TGA) pattern of the crystal form A of the hydrochloride salt has a weight loss of about 1.1±0.5% upon being heated to 120° C.; and/or
the thermogravimetric analysis (TGA) pattern of the crystal form A of the hydrochloride salt is substantially as shown in FIG. 9.

6. The crystal form of the salt according to claim 1, wherein the crystal form B of the maleate salt has characteristic peaks at one or more 2θ values selected from the group consisting of 15.22±0.2°, 16.30±0.2°, 18.82±0.2°, 21.15±0.2°, 21.83±0.2°, 23.60±0.2°, 26.35±0.2°, 28.94±0.2°, 32.59±0.2°, 33.31±0.2°, 34.74±0.2°, 35.94±0.2°, and 38.18.

7. The crystal form of the salt according to claim 1, wherein the crystal form B of the maleate salt of the compound Ic-1 has one or more features selected from the group consisting of:
the crystal form B of the maleate salt has characteristic peaks of X-ray powder diffraction substantially as shown in FIG. 11;
the differential scanning calorimetry (DSC) pattern of the crystal form B of the maleate salt begins to appear endothermic peak upon being heated to 105.8±5° C.;
the thermogravimetric analysis (TGA) pattern of the crystal form B of the maleate salt has a weight loss of about 0.8±0.5% upon being heated to 80° C.

8. The crystal form of the salt according to claim 1, wherein the crystal form C of the oxalate salt has characteristic peaks at one or more 2θ values selected from the group consisting of 14.64±0.2°, 15.27±0.2°, 16.07±0.2°, 16.36±0.2°, 17.63±0.2°, 19.52±0.2°, 20.90±0.2°, 22.05±0.2°, 23.43±0.2°, and 25.61±0.2°.

9. The crystal form of the salt according to claim 1, wherein the crystal form C of the oxalate salt of the compound Ic-1 has one or more features selected from the group consisting of:
the crystal form C of the oxalate salt has characteristic peaks of X-ray powder diffraction substantially as shown in FIG. 15;
the differential scanning calorimetry (DSC) pattern of the crystal form C of the oxalate salt begins to appear endothermic peak upon being heated to 152.2±5° C.;
the thermogravimetric analysis (TGA) pattern of the crystal form C of the oxalate salt has a weight loss of about 1.00.5% upon being heated to 100° C.

10. The crystal form of the salt according to claim 1, wherein the crystal form D of the mucate salt has characteristic peaks at one or more 2θ values selected from the group consisting of 14.21±0.2°, 17.71±0.2°, 27.16±0.2°, 29.49±0.2°, 30.74±0.2°, 32.33±0.2°, 34.50±0.2°, 35.42±0.2°, and 36.16±0.2°.

11. The crystal form of the salt according to claim 1, wherein the crystal form D of the mucate salt of the compound Ic-1 has one or more features selected from the group consisting of:

the crystal form D of the mucate salt has X-ray powder diffraction characteristic peaks substantially as shown in FIG. 18;

the differential scanning calorimetry (DSC) pattern of the crystal form D of the mucate salt begins to appear endothermic peak upon being heated to 140.9±5° C.

the thermogravimetric analysis (TGA) pattern of the crystal form D of the mucate salt has a weight loss of about 1.45±0.5% upon being heated to 100° C.

12. The crystal form of the salt according to claim 1, wherein the crystal form E of the fumarate salt has characteristic peaks at one or more 2θ values selected from the group consisting of 4.7±0.2°, 9.41±0.2°, 13.34±0.2°, 14.17±0.2°, 15.63±0.2°, 17.62, 18.95±0.2°, 22.75±0.2°, 23.76±0.2°, 25.66±0.2°, 26.93±0.2°, 28.69±0.2°, and 31.34±0.2°.

13. The crystal form of the salt according to claim 1, wherein the crystal form E of the fumarate salt of the compound Ic-1 has one or more features selected from the group consisting of:

the crystal form E of the fumarate salt has characteristic peaks of X-ray powder diffraction substantially as shown in FIG. 21;

the differential scanning calorimetry (DSC) pattern of the crystal form E of the fumarate salt begins to appear endothermic peak upon being heated to 76.5±5° C.;

the thermogravimetric analysis (TGA) pattern of the crystal form E of the fumarate salt has a weight loss of about 2.17±0.5% upon being heated to 80° C.

14. The crystal form of the salt according to claim 1, wherein the crystal form F of the D-glucuronate salt has characteristic peaks at one or more 2θ values selected from the group consisting of 4.77±0.2°, 8.34±0.2°, 10.87±0.2°, 16.13±0.2°, 17.54±0.2°, 19.53±0.2°, 20.06±0.2°, 21.25±0.2°, 23.42±0.2°, and 25.93±0.2°.

15. The crystal form of the salt according to claim 1, wherein the crystal form F of the D-glucuronate salt of the compound Ic-1 has one or more features selected from the group consisting of:

the crystal form F of the D-glucuronate salt has characteristic peaks of X-ray powder diffraction substantially as shown in FIG. 24;

the differential scanning calorimetry (DSC) pattern of the crystal form F of the D-glucuronate salt begins to appear endothermic peak upon being heated to 119.1±5° C.;

the thermogravimetric analysis (TGA) pattern of the crystal form F of the D-glucuronate salt has a weight loss of about 2.71±0.5%, upon being heated to 100° C.

* * * * *